United States Patent
Mizuta et al.

(10) Patent No.: US 11,258,066 B2
(45) Date of Patent: Feb. 22, 2022

(54) BINDER AGENT COMPOSITION FOR LITHIUM BATTERY

(71) Applicant: FUJIFILM Wako Pure Chemical Corporation, Osaka (JP)

(72) Inventors: Hironori Mizuta, Saitama (JP); Kazuki Takimoto, Saitama (JP); Hiromi Watahiki, Saitama (JP); Kaho Sugimoto, Saitama (JP); Takatoshi Matsuura, Saitama (JP); Kuniaki Okamoto, Saitama (JP); Nobutaka Shimamura, Saitama (JP)

(73) Assignee: FUJIFILM Wako Pure Chemical Corporation, Osaka (JP)

( * ) Notice: Subject to any disclaimer, the term of this patent is extended or adjusted under 35 U.S.C. 154(b) by 154 days.

(21) Appl. No.: 16/482,973

(22) PCT Filed: Feb. 2, 2018

(86) PCT No.: PCT/JP2018/003513
§ 371 (c)(1),
(2) Date: Aug. 1, 2019

(87) PCT Pub. No.: WO2018/143382
PCT Pub. Date: Aug. 9, 2018

(65) Prior Publication Data
US 2020/0235396 A1 Jul. 23, 2020

(30) Foreign Application Priority Data
Feb. 3, 2017 (JP) .............................. JP2017-019092

(51) Int. Cl.
| | |
|---|---|
| *H01M 4/62* | (2006.01) |
| *H01M 4/04* | (2006.01) |
| *H01M 4/134* | (2010.01) |
| *H01M 4/38* | (2006.01) |
| *H01M 4/60* | (2006.01) |
| *H01M 4/66* | (2006.01) |
| *H01M 10/052* | (2010.01) |
| *H01M 10/0525* | (2010.01) |
| *C08F 290/06* | (2006.01) |
| *C08K 5/053* | (2006.01) |
| *C08L 33/02* | (2006.01) |
| *H01M 10/0565* | (2010.01) |

(52) U.S. Cl.
CPC ........... *H01M 4/622* (2013.01); *C08F 290/06* (2013.01); *C08K 5/053* (2013.01); *C08L 33/02* (2013.01); *H01M 4/0404* (2013.01); *H01M 4/134* (2013.01); *H01M 4/386* (2013.01); *H01M 4/608* (2013.01); *H01M 4/663* (2013.01); *H01M 10/052* (2013.01); *H01M 10/0565* (2013.01)

(58) Field of Classification Search
CPC ...... C08F 290/06; C08F 220/06; C08K 5/053; C08L 33/02; H01M 10/052; H01M 10/0565; H01M 2004/027; H01M 4/0404; H01M 4/133; H01M 4/134; H01M 4/1393; H01M 4/1395; H01M 4/366; H01M 4/386; H01M 4/608; H01M 4/622; H01M 4/661; H01M 4/663
See application file for complete search history.

(56) References Cited

U.S. PATENT DOCUMENTS

| | | | |
|---|---|---|---|
| 2005/0003012 A1* | 1/2005 | Woller | ................. A61K 9/7053 424/487 |
| 2008/0152816 A1* | 6/2008 | Clamen | ..................... D04H 1/64 427/385.5 |
| 2015/0340698 A1 | 11/2015 | Take et al. | |
| 2016/0164099 A1 | 6/2016 | Wang et al. | |

(Continued)

FOREIGN PATENT DOCUMENTS

| | | |
|---|---|---|
| JP | 2007-220439 | 8/2007 |
| JP | 2008-311067 | 12/2008 |

(Continued)

OTHER PUBLICATIONS

International Search Report issued in International Application No. PCT/JP2018/003513, dated Mar. 13, 2018, 3 pages.

(Continued)

*Primary Examiner* — Carlos Barcena
(74) *Attorney, Agent, or Firm* — Hamre, Schumann, Mueller & Larson, P.C.

(57) ABSTRACT

An object of the present invention is to provide an excellent binder agent composition solving problems such as the decrease in a charge/discharge capacity that occurs in a case where a silicon-containing active material is used, a slurry composition and an electrode in which the binder agent composition is used, and a method for preparing the electrode. The present invention relates to "a binder agent composition containing (A) one or more kinds of polymers containing polyacrylic acid, (B) a bivalent to decavalent alcohol, and (C) water", "a slurry composition for lithium batteries, containing 1) a silicon-containing active material, 2) a conductive assistant, and 3) the binder agent composition", "an electrode for lithium batteries that has 1) a silicon-containing active material, 2) a conductive assistant, 3) a binder agent derived from the binder agent composition, and 4) a current collector", and "a method for preparing an electrode for lithium batteries, including coating a current collector with the slurry composition and drying the slurry composition after the coating".

14 Claims, No Drawings

(56) References Cited

U.S. PATENT DOCUMENTS

2017/0040612 A1 2/2017 Komaba et al.
2018/0250433 A1* 9/2018 Ericson ............... A61L 24/0021

FOREIGN PATENT DOCUMENTS

| | | |
|---|---|---|
| JP | 2009-080971 | 4/2009 |
| JP | 4851092 | 1/2012 |
| JP | 2014-130752 | 7/2014 |
| JP | 2014-192064 | 10/2014 |
| JP | 2015-115109 | 6/2015 |
| KR | 10-2015-0087864 | 7/2015 |
| WO | 2004/049475 | 6/2004 |
| WO | 2015/163302 | 10/2015 |

OTHER PUBLICATIONS

Extended European Search Report issued in corresponding European Application No. 18747843.3, dated Dec. 11, 2019, 8 pages.

* cited by examiner

BINDER AGENT COMPOSITION FOR LITHIUM BATTERY

TECHNICAL FIELD

The present invention relates to a binder agent composition, a slurry composition, and an electrode which are used in lithium batteries and relates to a method for preparing the electrode.

BACKGROUND ART

As secondary batteries, lithium batteries are used as power sources of various portable devices such as cellular phones. In recent years, research and development have been actively conducted regarding large batteries expected to be used in automobiles and the like. Therefore, it is essential to further increase the energy density of current lithium batteries. In order to increase the capacity of the lithium batteries, the use of silicon materials instead of carbonaceous materials as active materials is drawing attention. Silicon can electrochemically cause an alloying reaction with lithium at room temperature. As this reason, it is considered that, in a case where silicon materials are used in lithium batteries, the electric capacity is further increased than in a case where carbon is used.

However, it is known that in a case where silicon is used as an active material, the silicon causes a great volume change (equal to or greater than triples the original volume) at the time of charge and discharge. Furthermore, unfortunately, the volume change results in the destruction of the electrode structure at the time of charge and discharge, and consequently, a charge/discharge capacity is reduced.

On the other hand, there have been various attempts to increase the capacity of batteries and improve the stability of batteries by using a binder agent (Patent Literature 1 and 2). However, these attempts focused mainly on carbon materials as active materials, and did not aim to solve the problems which arise in a case where silicon is used.

In addition, there has been an attempt to inhibit the reduction in a charge/discharge capacity by coating a silicon active material with a thermosetting resin (Patent Literature 3). However, because a heating treatment at 400° C. is required for coating, the attempt is not a method which makes it possible to simply manufacture an electrode using silicon as an active material.

CITATION LIST

Patent Literature

Patent Literature 1 JP2009-080971 A
Patent Literature 2 JP4851092B2
Patent Literature 3 JP2014-192064A

SUMMARY OF INVENTION

Technical Problem

An object of the present invention is to provide an excellent binder agent composition solving the problems, a slurry composition and an electrode using the binder agent composition, and a method for preparing the electrode.

Solution to Problem

In order to solve the problems that arise in a case where silicon is used as an active material, the inventors of the present invention examined various binder agents. As a result, the inventors have found that in a case where a composition, which contains polymers, a bivalent to decavalent alcohol for binding the polymers, and water, is used as a binder agent, even though a silicon-containing active material is used, an excellent charge/discharge capacity is obtained. Based on the finding, the inventors have accomplished the present invention.

That is, the present invention includes the following inventions [i] to [xiii].

[i] A binder agent composition comprising (A) one or more kinds of polymers containing polyacrylic acid, (B) a bivalent to decavalent alcohol, and (C) water (hereinafter, the binder agent composition will be simply described as a binder agent composition of the present invention in some cases).

[ii] The binder agent composition described in the invention [i], wherein (B) the bivalent to decavalent alcohol is a compound represented by the following general formula (B1);

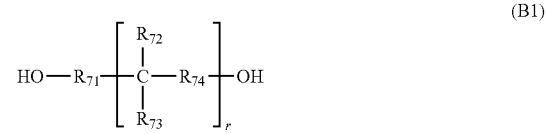

(in the formula, $R_{71}$ represents an alkylene group having 1 to 6 carbon atoms, $R_{72}$ represents a hydroxy group or a hydroxyalkyl group having 1 to 6 carbon atoms, $R_{73}$ represents a hydrogen atom, an alkyl group having 1 to 6 carbon atoms, or a hydroxyalkyl group having 1 to 6 carbon atoms, $R_{74}$ represents an alkylene group having 1 to 6 carbon atoms that may have —O— in a chain, r represents an integer of 0 to 4, and a plurality of $R_{72}$'s, a plurality of $R_{73}$'s, and a plurality of $R_{74}$'s may be the same as or different from each other respectively.)

[iii] The binder agent composition described in the invention [i] or [ii], wherein (A) are polyacrylic acid and a copolymer which contains a monomer unit derived from acrylic acid and one or two kinds of monomer units derived from a compound represented by the following general formula (I) or general formula (II) as constituent components;

[in the formula, $R_1$ represents a hydrogen atom or a methyl group, in a case where $R_2$ is a hydrogen atom, $R_1$ represents a methyl group, $R_2$ represents a hydrogen atom; an alkyl group having 1 to 20 carbon atoms; an alkyl group having 1 to 20 carbon atoms substituted with a fluorine atom or a hydroxy group; an aryl group having 6 to 10 carbon atoms; an arylalkyl group having 7 to 13 carbon atoms; an alkoxyalkyl group having 2 to 9 carbon atoms; an alkoxyalkoxyalkyl group having 3 to 9 carbon atoms; an aryloxyalkyl group having 7 to 13 carbon atoms; a morpholinoalkyl group having 5 to 7 carbon atoms; a trialkylsilyl group having 3 to 9 carbon atoms; an alicyclic hydrocarbon group having 6 to 12 carbon atoms that has or does not have an oxygen atom; a dialkylaminoalkyl group having 3 to 9 carbon atoms; a hexahydrophthalimide-N-alkyl group having 9 to 14 carbon atoms; a group represented by the following general formula (IV)

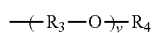
(IV)

(in the formula, $R_3$ represents an alkylene group having 1 to 6 carbon atoms that has a hydroxy group as a substituent or is unsubstituted, $R_4$ represents a hydrogen atom, an alkyl group having 1 to 6 carbon atoms, or a phenyl group, and v represents an integer of 2 to 20); or a group represented by the following general formula (V)

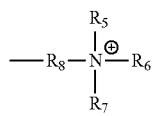
(V)

(in the formula, $R_5$ to $R_7$ each independently represent an alkyl group having 1 to 3 carbon atoms, and $R_8$ represents an alkylene group having 1 to 3 carbon atoms.).],

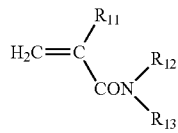
(II)

(in the formula, $R_{11}$ represents a hydrogen atom or a methyl group, $R_{12}$ represents a hydrogen atom or an alkyl group having 1 to 6 carbon atoms, $R_{13}$ represents a hydrogen atom, an alkyl group having 1 to 6 carbon atoms, a dialkylaminoalkyl group having 3 to 9 carbon atoms, or a hydroxyalkyl group having 1 to 6 carbon atoms.).

[iv] The binder agent composition described in the invention [i] or [ii], wherein the polyacrylic acid is crosslinked by a crosslinking agent selected from compounds described in the following general formulae [1] to [13] and a polymer described in the following general formula [14];

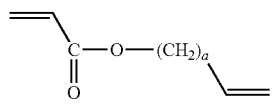
[1]

(in the formula, a represents an integer of 1 to 6.),

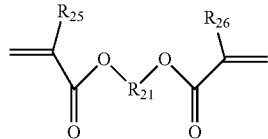
[2]

[in the formula, $R_{25}$ and $R_{26}$ each independently represent a hydrogen atom or a methyl group, and $R_{21}$ represents an alkylene group having 1 to 20 carbon atoms, a group represented by the following general formula [2-1]

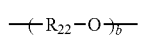
[2-1]

(in the formula, $R_{22}$ represents an alkylene group having 1 to 6 carbon atoms, and b represents an integer of 1 to 6.), or a group represented by the following general formula [2-2]

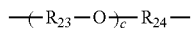
[2-2]

(in the formula, $R_{23}$ and $R_{24}$ each independently represent an alkylene group having 1 to 6 carbon atoms, and c represents an integer of 1 to 22.).],

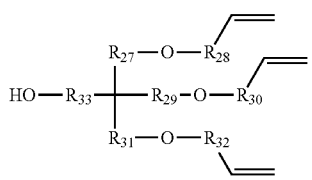
[3]

(in the formula, $R_{27}$ to $R_{33}$ each independently represent an alkylene group having 1 to 3 carbon atoms.),

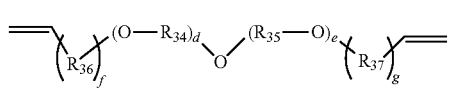
[4]

(in the formula, $R_{34}$ to $R_{37}$ each independently represent an alkylene group having 1 to 6 carbon atoms, d represents an integer of 1 to 6, e represents an integer of 0 to 6, and f and g each independently represent an integer of 0 or 1.),

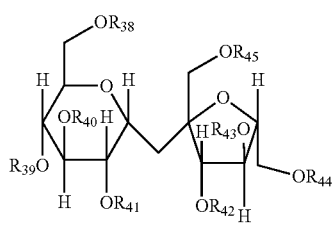
[5]

(in the formula, $R_{38}$ to $R_{45}$ each independently represent a hydrogen atom, a vinyl group, or a vinyl ketone group, and at least two or more groups among $R_{38}$ to $R_{45}$ are vinyl groups or vinyl ketone groups.),

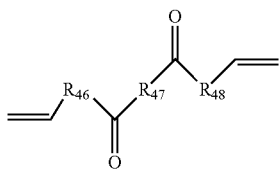

(in the formula, $R_{46}$ to $R_{48}$ each independently represent an alkylene group having 1 to 6 carbon atoms.),

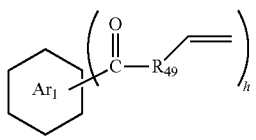

(in the formula, a ring Ar₁ represents a benzene ring or a naphthalene ring, $R_{49}$ represents an alkylene group having 1 to 6 carbon atoms, and h represents an integer of 2 to 4.),

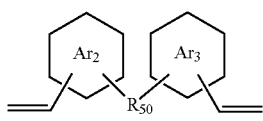

(in the formula, a ring $Ar_2$ and a ring $Ar_3$ each independently represent a benzene ring or a naphthalene ring, and $R_{50}$ represents an alkylene group having 1 to 6 carbon atoms.),

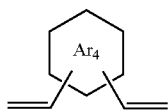

(in the formula, a ring $Ar_4$ represents a benzene ring or a naphthalene ring.),

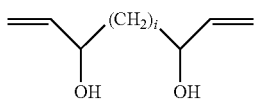

(in the formula, i represents an integer of 0 to 6.),

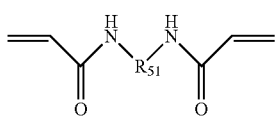

(in the formula, $R_{51}$ represents an alkylene group having 1 to 6 carbon atoms.),

[in the formula, $R_{52}$ represents an alkylene group having 1 to 6 carbon atoms that has a substituent or is unsubstituted, an arylene group having 6 to 10 carbon atoms that has a substituent or is unsubstituted, a group represented by the following general formula [12-1]

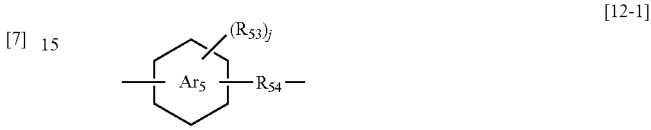

(in the formula, $R_{53}$ represents an alkyl group having 1 to 6 carbon atoms, $R_{54}$ represents an alkylene group having 1 to 6 carbon atoms, a ring $Ar_5$ represents a benzene ring or a naphthalene ring, and j represents an integer of 0 to 4), or a group represented by the following general formula [12-2]

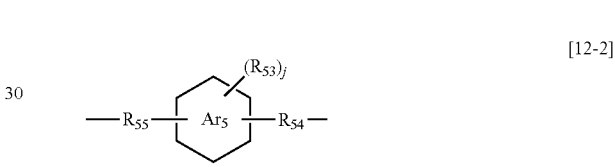

(in the formula, $R_{55}$ represents an alkylene group having 1 to 6 carbon atoms, and $R_{53}$, $R_{54}$, a ring $Ar_5$, and j are the same as $R_{53}$, $R_{54}$, the ring $Ar_5$, and j described above.).],

[in the formula, $R_{56}$ and $R_{57}$ each independently represent an alkyl group having 1 to 6 carbon atoms that has a substituent or is unsubstituted, an aryl group having 6 to 10 carbon atoms that has a substituent or is unsubstituted, or a group represented by the following general formula [13-1]

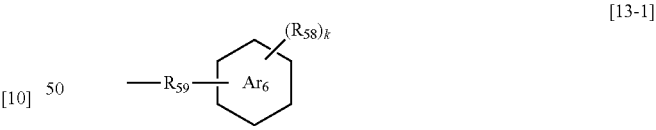

(in the formula, $R_{58}$ represents an alkyl group having 1 to 6 carbon atoms, $R_{59}$ represents an alkylene group having 1 to 6 carbon atoms, a ring $Ar_6$ represents a benzene ring or a naphthalene ring, and k represents an integer of 0 to 5.).],

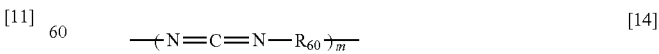

[in the formula, $R_{60}$ represents an alkylene group having 1 to 6 carbon atoms that has a substituent or is unsubstituted, an arylene group having 6 to 10 carbon atoms that has a substituent or is unsubstituted, a group represented by the following general formula [14-1] or [14-2]

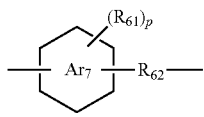
[14-1]

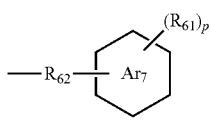
[14-2]

(in the formulae, $R_{61}$ represents an alkyl group having 1 to 6 carbon atoms, $R_{62}$ represents an alkylene group having 1 to 6 carbon atoms, a ring $Ar_7$ represents a benzene ring or a naphthalene ring, and p represents an integer of 0 to 4.), or a group represented by the following general formula [14-3]

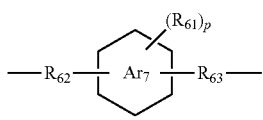
[14-3]

(in the formula, $R_{63}$ represents an alkylene group having 1 to 6 carbon atoms, and $R_{61}$, $R_{62}$, a ring $Ar_7$, and p are the same as $R_{61}$, $R_{62}$, the ring $Ar_7$, and p described above.), and m represents an integer of 10 to 10,000.].

[v] The binder agent composition described in the invention [iii], wherein either or both of the polyacrylic acid and the copolymer are crosslinked by a crosslinking agent selected from compounds described in the following general formulae [1] to [13] and a polymer described in the following general formula [14];

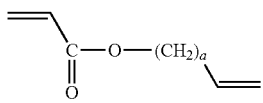
[1]

(in the formula, a represents an integer of 1 to 6.),

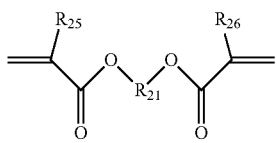
[2]

[in the formula, $R_{25}$ and $R_{26}$ each independently represent a hydrogen atom or a methyl group, and $R_{21}$ represents an alkylene group having 1 to 20 carbon atoms, a group represented by the following general formula [2-1]

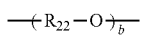
[2-1]

(in the formula, $R_{22}$ represents an alkylene group having 1 to 6 carbon atoms, and b represents an integer of 1 to 6.), or a group represented by the following general formula [2-2]

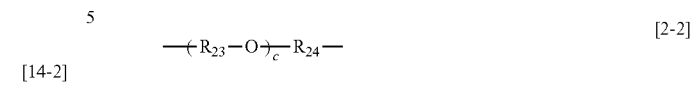
[2-2]

(in the formula, $R_{23}$ and $R_{24}$ each independently represent an alkylene group having 1 to 6 carbon atoms, and c represents an integer of 1 to 22.).],

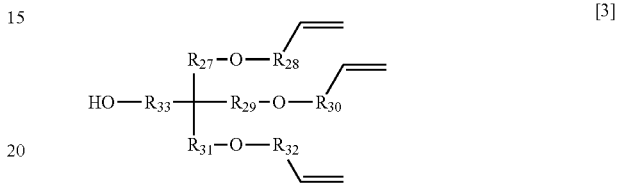
[3]

(in the formula, $R_{27}$ to $R_{33}$ each independently represent an alkylene group having 1 to 3 carbon atoms.),

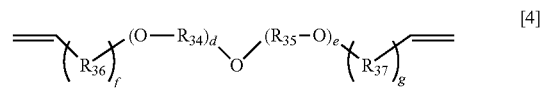
[4]

(in the formula, $R_{34}$ to $R_{37}$ each independently represent an alkylene group having 1 to 6 carbon atoms, d represents an integer of 1 to 6, e represents an integer of 0 to 6, and f and g each independently represent an integer of 0 or 1.),

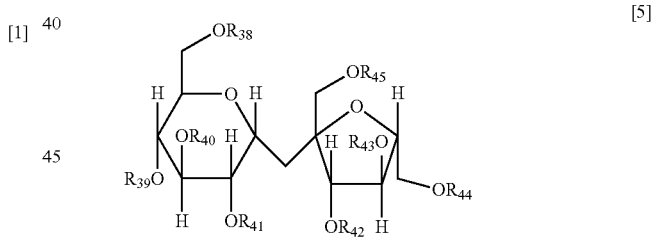
[5]

(in the formula, $R_{38}$ to $R_{45}$ each independently represent a hydrogen atom, a vinyl group, or a vinyl ketone group, and at least two or more groups among $R_{38}$ to $R_{45}$ are vinyl groups or vinyl ketone groups.),

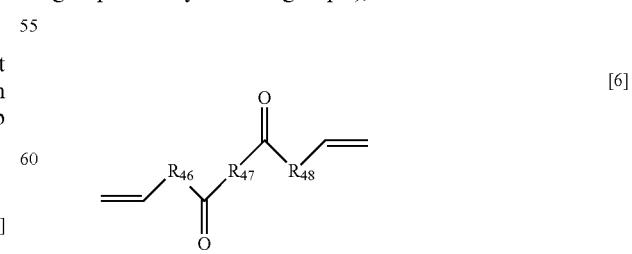
[6]

(in the formula, $R_{46}$ to $R_{48}$ each independently represent an alkylene group having 1 to 6 carbon atoms.),

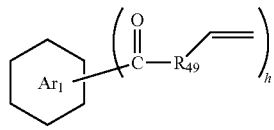
[7]

(in the formula, a ring $Ar_1$ represents a benzene ring or a naphthalene ring, $R_{49}$ represents an alkylene group having 1 to 6 carbon atoms, and h represents an integer of 2 to 4.),

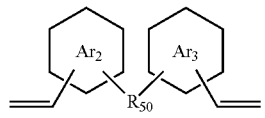
[8]

(in the formula, a ring $Ar_2$ and a ring $Ar_3$ each independently represent a benzene ring or a naphthalene ring, and $R_{50}$ represents an alkylene group having 1 to 6 carbon atoms.),

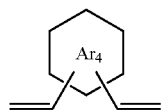
[9]

(in the formula, a ring $Ar_4$ represents a benzene ring or a naphthalene ring.),

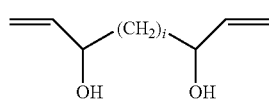
[10]

(in the formula, i represents an integer of 0 to 6.),

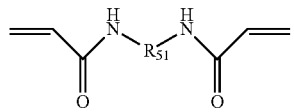
[11]

(in the formula, $R_{51}$ represents an alkylene group having 1 to 6 carbon atoms.),

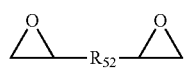
[12]

[in the formula, $R_{52}$ represents an alkylene group having 1 to 6 carbon atoms that has a substituent or is unsubstituted, an arylene group having 6 to 10 carbon atoms that has a substituent or is unsubstituted, a group represented by the following general formula [12-1]

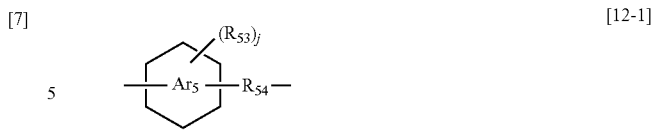
[12-1]

(in the formula, $R_{53}$ represents an alkyl group having 1 to 6 carbon atoms, $R_{54}$ represents an alkylene group having 1 to 6 carbon atoms, a ring $Ar_5$ represents a benzene ring or a naphthalene ring, and j represents an integer of 0 to 4.), or a group represented by the following general formula [12-2]

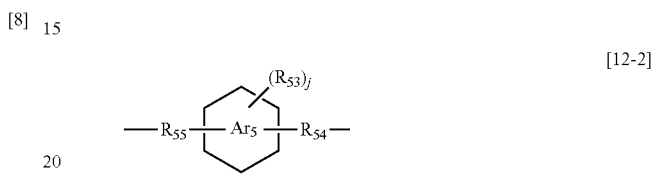
[12-2]

(in the formula, $R_{55}$ represents an alkylene group having 1 to 6 carbon atoms, and $R_{53}$, $R_{54}$, a ring $Ar_5$, and j are the same as $R_{53}$, $R_{54}$, the ring $Ar_5$, and j described above.).], $R_{56}$—N=C=N—$R_{57}$ [13]

[in the formula, $R_{56}$ and $R_{57}$ each independently represent an alkyl group having 1 to 6 carbon atoms that has a substituent or is unsubstituted, an aryl group having 6 to 10 carbon atoms that has a substituent or is unsubstituted, or a group represented by the following general formula [13-1]

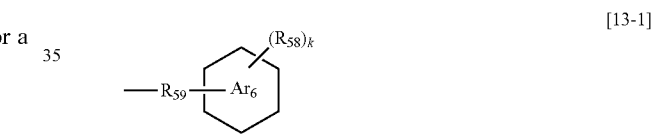
[13-1]

(in the formula, $R_{58}$ represents an alkyl group having 1 to 6 carbon atoms, $R_{59}$ represents an alkylene group having 1 to 6 carbon atoms, a ring $Ar_6$ represents a benzene ring or a naphthalene ring, and k represents an integer of 0 to 5.).], —(N=C=N—$R_{60}$)$_m$— [14]

[in the formula, $R_{60}$ represents an alkylene group having 1 to 6 carbon atoms that has a substituent or is unsubstituted, an arylene group having 6 to 10 carbon atoms that has a substituent or is unsubstituted, a group represented by the following general formula [14-1] or [14-2]

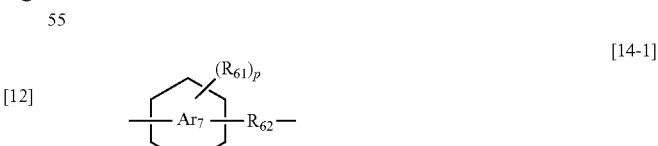
[14-1]

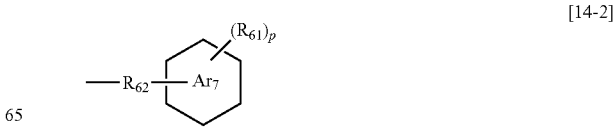
[14-2]

(in the formulae, $R_{61}$ represents an alkyl group having 1 to 6 carbon atoms, $R_{62}$ represents an alkylene group having 1 to 6 carbon atoms, a ring $Ar_7$ represents a benzene ring or a naphthalene ring, and p represents an integer of 0 to 4.), or a group represented by the following general formula [14-3]

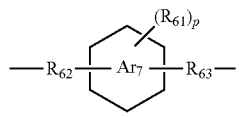

[14-3]

(in the formula, $R_{63}$ represents an alkylene group having 1 to 6 carbon atoms, and $R_{61}$, $R_{62}$, a ring $Ar_7$, and p are the same as $R_{61}$, $R_{62}$, the ring $Ar_7$, and p described above.), and m represents an integer of 10 to 10,000.].

[vi] The binder agent composition described in the invention [v], wherein the polyacrylic acid and the copolymer are crosslinked by a crosslinking agent selected from the compounds described in the general formulae [1] to [13] and the polymer described in the general formula [14].

[vii] A slurry composition for lithium batteries, comprising 1) a silicon-containing active material, 2) a conductive assistant, and 3) the binder agent composition described in any one of the inventions [i] to [vi] (hereinafter, the slurry composition will be simply described as a slurry composition of the present invention in some cases).

[viii] The slurry composition described in the invention [vii], wherein the silicon-containing active material contains silicon; a silicon oxide; a metal-bonded silicon; or a mixture obtained by mixing together at least two or more kinds of components among carbon, silicon, a silicon oxide, or a metal-bonded silicon.

[ix] The slurry composition described in the invention [vii] or [viii], wherein the slurry composition is for preparing a negative electrode.

[x] An electrode for lithium batteries, comprising 1) a silicon-containing active material, 2) a conductive assistant, 3) a binder agent derived from the binder agent composition described in any one of the inventions [i] to [vi], and 4) a current collector (hereinafter, the electrode will be simply described as an electrode of the present invention in some cases).

[xi] The electrode described in the invention [x], wherein the silicon-containing active material contains silicon; a silicon oxide; a metal-bonded silicon; or a mixture obtained by mixing together at least two or more kinds of components among carbon, silicon, a silicon oxide, or a metal-bonded silicon.

[xii] The electrode described in the invention [x] or [xi], wherein the electrode is a negative electrode.

[xiii] A method for preparing an electrode for lithium batteries, comprising coating a current collector with the slurry composition described in any one of the inventions [vii] to [ix] and drying the slurry composition after the coating.

Advantageous Effects of Invention

In a case where a lithium electrode is prepared using the binder agent composition of the present invention, it is possible to provide an electrode which retains a high charge/discharge capacity even though a silicon-containing active material is used. Furthermore, in a case where the electrode is used, it is possible to provide a battery which can retain a high capacity for a long period of time.

DESCRIPTION OF EMBODIMENTS

In the present specification, "binder solution" is a term referring to an aqueous solution obtained by mixing one or more kinds of polymers and other compounds (additives such as a crosslinking agent) with water. "Binder" is a term referring to a state where moisture has been removed from the binder solution by drying. The binder agent composition of the present invention is a sort of binder solution, and a binder agent derived from the binder agent composition of the present invention is a sort of binder.

In the present specification, "(meth)acrylic acid" is a generic term for acrylic acid, a methacrylic acid, and a mixture of these. The same is true for other similar expressions.

Furthermore, in the present specification, "n-" represents a normal-isomer, and "i-" represents an iso-isomer.

(A) One or More Kinds of Polymers Containing Polyacrylic Acid

The binder agent composition of the present invention contains at least polyacrylic acid and if necessary a polymer other than the polyacrylic acid. In the present specification, (A) one or more kinds of polymers containing polyacrylic acid mean (A1) polyacrylic acid only or (A2) polymer group including polyacrylic acid and one or more kinds of polymers other than the polyacrylic acid.

The polymer other than the polyacrylic acid may be a conventionally known polymer that has been commonly used in the field of the related art. The polymer may be a homopolymer or a copolymer. Furthermore, the polymer other than the polyacrylic acid may be one kind of polymer or two or more kinds of polymers, and the polymer is preferably one kind of polymer. As such a polymer, a polymer containing a monomer unit having a carboxy group as a constituent component is preferable, a copolymer containing a monomer unit having a carboxy group as a constituent component is more preferable, and a copolymer containing a monomer unit derived from acrylic acid as a constituent component is even more preferable.

Specifically, examples of the copolymer containing a monomer unit derived from acrylic acid as a constituent component include a copolymer containing a monomer unit derived from acrylic acid and one or two kinds of monomer units derived from a compound represented by the following general formula (I) or general formula (II) as constituent components (hereinafter, the copolymer will be simply described as a copolymer according to the present invention in some cases).

(I)

(In the formula, $R_1$ and $R_2$ are as described above.)

(II)

(In the formula, $R_{11}$ to $R_{13}$ are as described above.)

The alkyl group having 1 to 20 carbon atoms represented by $R_2$ in the general formula (I) preferably has 1 to 10 carbon atoms, and more preferably has 1 to 6 carbon atoms. Furthermore, the alkyl group may be any of a linear, branched, or cyclic alkyl group, and is preferably a linear alkyl group. Specifically, examples thereof include a methyl group, an ethyl group, a n-propyl group, an isopropyl group, a n-butyl group, an isobutyl group, a sec-butyl group, a tert-butyl group, a cyclobutyl group, a n-pentyl group, an isopentyl group, a sec-pentyl group, a tert-pentyl group, a neopentyl group, a 2-methylbutyl group, a 1,2-dimethylpropyl group, a cyclopentyl group, a n-hexyl group, an isohexyl group, a sec-hexyl group, a tert-hexyl group, a neohexyl group, a 2-methylpentyl group, a 1,2-dimethylbutyl group, a 2,3-dimethylbutyl group, a cyclohexyl group, a n-heptyl group, an isoheptyl group, a sec-heptyl group, a tert-heptyl group, a neoheptyl group, a cycloheptyl group, a n-octyl group, an isooctyl group, a sec-octyl group, a tert-octyl group, a neooctyl group, a cyclooctyl group, a n-nonyl group, an isononyl group, a sec-nonyl group, a tert-nonyl group, a neononyl group, a cyclononyl group, a n-decyl group, an isodecyl group, a sec-decyl group, a tert-decyl group, a neodecyl group, a cyclodecyl group, a n-undecyl group, a n-dodecyl group, a n-tridecyl group, a n-tetradecyl group, a n-pentadecyl group, a n-hexadecyl group, a n-heptadecyl group, a n-octadecyl group, a n-nonadecyl group, a n-eicosyl group, and the like. Among these, the methyl group, the ethyl group, the n-propyl group, the isopropyl group, the n-butyl group, the isobutyl group, the sec-butyl group, the tert-butyl group, the n-pentyl group, the isopentyl group, the sec-pentyl group, the tert-pentyl group, the neopentyl group, the 2-methylbutyl group, the 1,2-dimethylpropyl group, the n-hexyl group, the isohexyl group, the sec-hexyl group, the tert-hexyl group, the neohexyl group, the 2-methylpentyl group, the 1,2-dimethylbutyl group, and the 2,3-dimethylbutyl group are preferable, the methyl group, the ethyl group, the n-propyl group, the n-butyl group, the n-pentyl group, and the n-hexyl group are more preferable, and the n-butyl group, the n-pentyl group, and the n-hexyl group are particularly preferable.

It is preferable that in the alkyl group having 1 to 20 carbon atoms substituted with a fluorine atom represented by $R_2$ in the general formula (I), a terminal portion is fluorinated. As such an alkyl group, a perfluoroalkyl group or a (perfluoroalkyl)alkyl group is preferable, and the (perfluoroalkyl)alkyl group is more preferable. Furthermore, the alkyl group preferably has 1 to 10 carbon atoms and is preferably a linear alkyl group. Specifically, examples thereof include a fluoroethyl group, a fluoropropyl group, a fluorobutyl group, a fluoropentyl group, a fluorohexyl group, a fluoroheptyl group, a fluorooctyl group, a fluorononyl group, a fluorodecyl group, a fluoroundecyl group, a fluorododecyl group, a fluorotridecyl group, a fluorotetradecyl group, a fluoropentadecyl group, a fluorohexadecyl group, a fluoroheptadecyl group, a fluorooctadecyl group, a fluorononadecyl group, a fluoroeicosyl group, a trifluoromethyl group, a trifluoroethyl group, a trifluoropropyl group, a trifluorobutyl group, a trifluoropentyl group, a trifluorohexyl group, a perfluoroethyl group, a perfluoropropyl group, a perfluorobutyl group, a perfluoropentyl group, a perfluorohexyl group, a (perfluorobutyl)methyl group, a (perfluorobutyl)ethyl group, a (perfluorobutyl)propyl group, a (perfluorohexyl)methyl group, a (perfluorohexyl)ethyl group, a (perfluorohexyl)propyl group, and the like. Among these, the trifluoromethyl group, the trifluoroethyl group, the trifluoropropyl group, the trifluorobutyl group, the trifluoropentyl group, the trifluorohexyl group, the perfluoroethyl group, the perfluoropropyl group, the perfluorobutyl group, the perfluoropentyl group, the perfluorohexyl group, the (perfluorobutyl)methyl group, the (perfluorobutyl)ethyl group, the (perfluorobutyl)propyl group, the (perfluorohexyl)methyl group, the (perfluorohexyl)ethyl group, and the (perfluorohexyl)propyl group are preferable, the trifluoromethyl group, the trifluoroethyl group, the (perfluorobutyl)methyl group, the (perfluorobutyl)ethyl group, the (perfluorohexyl)methyl group, and the (perfluorohexyl)ethyl group are more preferable, and the (perfluorobutyl)ethyl group and the (perfluorohexyl)ethyl group are particularly preferable.

It is preferable that in the alkyl group having 1 to 20 carbon atoms substituted with a hydroxy group represented by $R_2$ in the general formula (I), a terminal portion is substituted with a hydroxy group. As such an alkyl group, an alkyl group in which one or two hydrogen atoms are substituted with a hydroxy group is preferable, and an alkyl group in which one hydrogen atom is substituted with a hydroxy group is more preferable. Furthermore, the alkyl group preferably has 1 to 6 carbon atoms and is preferably a linear alkyl group. Specifically, examples thereof include a hydroxymethyl group, a hydroxyethyl group, a dihydroxyethyl group, a hydroxypropyl group, a dihydroxypropyl group, a hydroxybutyl group, a dihydroxybutyl group, a hydroxypentyl group, a dihydroxypentyl group, a hydroxyhexyl group, a dihydroxyhexyl group, a hydroxyheptyl group, a hydroxyoctyl group, a hydroxynonyl group, a hydroxydecyl group, a hydroxyundecyl group, a hydroxydodecyl group, a hydroxytridecyl group, a hydroxytetradecyl group, a hydroxypentadecyl group, a hydroxyhexadecyl group, a hydroxyheptadecyl group, a hydroxyoctadecyl group, a hydroxynonadecyl group, a hydroxyeicosyl group, and the like. Among these, the hydroxymethyl group, the hydroxyethyl group, the dihydroxyethyl group, the hydroxypropyl group, the dihydroxypropyl group, the hydroxybutyl group, the dihydroxybutyl group, the hydroxypentyl group, the dihydroxypentyl group, the hydroxyhexyl group, and the dihydroxyhexyl group are preferable, the hydroxymethyl group, the hydroxyethyl group, the hydroxypropyl group, the hydroxybutyl group, the hydroxypentyl group, and the hydroxyhexyl group are more preferable, and the hydroxymethyl group, the hydroxyethyl group, the hydroxypropyl group, and the hydroxybutyl group are even more preferable, and the hydroxyethyl group is particularly preferable.

Examples of the aryl group having 6 to 10 carbon atoms represented by $R_2$ in the general formula (I) include a phenyl group, a naphthyl group, and the like. Among these, the phenyl group is preferable.

The arylalkyl group having 7 to 13 carbon atoms represented by $R_2$ in the general formula (I) preferably has 7 to 9 carbon atoms. Specifically, examples thereof include a benzyl group, a phenyl ethyl group, a phenyl propyl group, a naphthyl methyl group, a naphthyl ethyl group, a naphthyl propyl group, and the like. Among these, the benzyl group, the phenyl ethyl group, and the phenyl propyl group are preferable, and the benzyl group is more preferable.

Examples of the alkoxyalkyl group having 2 to 9 carbon atoms represented by $R_2$ in the general formula (I) include a methoxymethyl group, a methoxyethyl group, a methoxypropyl group, a methoxybutyl group, a methoxypentyl group, a methoxyhexyl group, a methoxyheptyl group, a methoxyoctyl group, an ethoxymethyl group, an ethoxyethyl group, an ethoxypropyl group, an ethoxybutyl group, an ethoxypentyl group, an ethoxyhexyl group, an ethoxyheptyl group, a propoxymethyl group, a propoxyethyl group, a propoxypropyl group, a propoxybutyl group, a propoxypentyl group, a propoxyhexyl group, and the like.

Examples of the alkoxyalkoxyalkyl group having 3 to 9 carbon atoms represented by $R_2$ in the general formula (I) include a methoxymethoxymethyl group, a methoxymethoxyethyl group, a methoxymethoxypropyl group, an ethoxymethoxymethyl group, an ethoxymethoxyethyl group, an ethoxymethoxypropyl group, a propoxymethoxymethyl group, a propoxymethoxyethyl group, a propoxymethoxypropyl group, a methoxyethoxymethyl group, a methoxyethoxyethyl group, a methoxyethoxypropyl group, an ethoxyethoxymethyl group, an ethoxyethoxyethyl group, an ethoxyethoxypropyl group, a propoxyethoxymethyl group, a propoxyethoxyethyl group, a propoxyethoxypropyl group, a methoxypropoxymethyl group, a methoxypropoxyethyl group, a methoxypropoxypropyl group, an ethoxypropoxymethyl group, an ethoxypropoxyethyl group, an ethoxypropoxypropyl group, a propoxypropoxymethyl group, a propoxypropoxyethyl group, a propoxypropoxypropyl group, and the like.

The aryloxyalkyl group having 7 to 13 carbon atoms represented by $R_2$ in the general formula (I) preferably has an aryloxyalkyl group having 7 to 9 carbon atoms. Specifically, examples thereof include a phenoxymethyl group, a phenoxyethyl group, a phenoxypropyl group, a naphthyloxymethyl group, a naphthyloxyethyl group, a naphthyloxypropyl group, and the like. Among these, the phenoxymethyl group, the phenoxyethyl group, and the phenoxypropyl group are preferable, and the phenoxyethyl group is more preferable.

Examples of the morpholinoalkyl group having 5 to 7 carbon atoms represented by $R_2$ in the general formula (I) include a morpholinomethyl group, a morpholinoethyl group, a morpholinopropyl group, and the like.

Examples of the trialkylsilyl group having 3 to 9 carbon atoms represented by $R_2$ in the general formula (I) include a trimethylsilyl group, a triethylsilyl group, a tripropylsilyl group, a dimethylethylsilyl group, a diethylmethylsilyl group, and the like.

Examples of the alicyclic hydrocarbon group having 6 to 12 carbon atoms that has an oxygen atom represented by $R_2$ in the general formula (I) include a dicyclopentenyloxyethyl group and the like.

Examples of the alicyclic hydrocarbon group having 6 to 12 carbon atoms that does not have an oxygen atom represented by $R_2$ in the general formula (I) include a cyclohexyl group, an isobornyl group, a dicyclopentanyl group, and the like.

Examples of the dialkylaminoalkyl group having 3 to 9 carbon atoms represented by $R_2$ in the general formula (I) include a dimethylaminomethyl group, a dimethylaminoethyl group, a dimethylaminopropyl group, a diethylaminomethyl group, a diethylaminoethyl group, a diethylaminopropyl group, a dipropylaminomethyl group, a dipropylaminoethyl group, a dipropylaminopropyl group, and the like.

In the hexahydrophthalimide-N-alkyl group having 9 to 14 carbon atoms represented by $R_2$ in the general formula (I), the alkyl group generally has 1 to 6 carbon atoms. The alkyl group preferably has 1 to 3 carbon atoms and is preferably a linear alkyl group. Specifically, examples of the hexahydrophthalimide-N-alkyl group having 9 to 14 carbon atoms include a 2-hexahydrophthalimidemethyl group, a 2-hexahydrophthalimideethyl group, a 2-hexahydrophthalimidepropyl group, a 2-hexahydrophthalimidebutyl group, a 2-hexahydrophthalimidepentyl group, a 2-hexahydrophthalimidehexyl group, and the like.

As the alkylene group having 1 to 6 carbon atoms that has a hydroxy group as a substituent represented by $R_3$ in the general formula (IV), an alkylene group in which one hydrogen atom is substituted with a hydroxy group is preferable. The alkylene group preferably has 1 to 3 carbon atoms. Specifically, examples thereof include a hydroxymethylene group, a hydroxyethylene group, a hydroxytrimethylene group, a hydroxytetramethylene group, a hydroxypentamethylene group, a hydroxyhexamethylene group, and the like. Among these, the hydroxymethylene group, the hydroxyethylene group, and the hydroxytrimethylene group are preferable, and the hydroxytrimethylene group is more preferable.

The unsubstituted alkylene group having 1 to 6 carbon atoms represented by $R_3$ in the general formula (IV) preferably has an alkylene group having 2 to 4 carbon atoms. Specifically, examples thereof include a methylene group, an ethylene group, a trimethylene group, a propylene group, a tetramethylene group, a pentamethylene group, a hexamethylene group, and the like. Among these, the ethylene group, the trimethylene group, the propylene group, and the tetramethylene group are preferable, the ethylene group and the propylene group are more preferable, and the ethylene group is particularly preferable.

The alkyl group having 1 to 6 carbon atoms represented by $R_4$ in the general formula (IV) preferably has an alkyl group having 1 to 3 carbon atoms. The alkyl group may be any of a linear, branched, or cyclic alkyl group, and is preferably a linear alkyl group. Specifically, exampled thereof include a methyl group, an ethyl group, a n-propyl group, an isopropyl group, a n-butyl group, an isobutyl group, a sec-butyl group, a tert-butyl group, a cyclobutyl group, a n-pentyl group, an isopentyl group, a sec-pentyl group, a tert-pentyl group, a neopentyl group, a 2-methylbutyl group, a 1,2-dimethylpropyl group, a cyclopentyl group, a n-hexyl group, an isohexyl group, a sec-hexyl group, a tert-hexyl group, a neohexyl group, a 2-methylpentyl group, a 1,2-dimethylbutyl group, a 2,3-dimethylbutyl group, a cyclohexyl group, and the like. Among these, the methyl group, the ethyl group, the n-propyl group, and the isopropyl group are preferable, and the methyl group is more preferable.

As $R_3$ in the general formula (IV), an unsubstituted alkylene group having 2 to 6 carbon atoms is preferable, and an unsubstituted alkylene group having 2 to 4 carbon atoms is more preferable. Among these, an ethylene group, a trimethylene group, a propylene group, and a tetramethylene group are preferable, the ethylene group and the propylene group are more preferable, and the ethylene group is particularly preferable.

As $R_4$ in the general formula (IV), a hydrogen atom and an alkyl group having 1 to 6 carbon atoms are preferable, the hydrogen atom and an alkyl group having 1 to 3 carbon atoms are more preferable, and the hydrogen atom and a methyl group are particularly preferable.

As v in the general formula (IV), an integer of 2 to 10 is preferable, and an integer of 4 to 10 is more preferable. Particularly, v pieces of —($R_3$—O)— group may be the same as or different from each other.

Specific examples of the group represented by the general formula (IV) include a polyethylene glycol group, a methyl polyethylene glycol group, an ethyl polyethylene glycol group, a n-propyl polyethylene glycol group, an isopropyl polyethylene glycol group, a phenyl polyethylene glycol group, a polytrimethylene glycol group, a polypropylene glycol group, a methyl polypropylene glycol group, an ethyl polypropylene glycol group, a n-propyl polypropylene glycol group, an isopropyl polypropylene glycol group, a phenyl polypropylene glycol group, a polytetramethylene glycol group, a polypentamethylene glycol group, a polyhexamethylene glycol group, and the like. Among these, the polyethylene glycol group, the methyl polyethylene glycol group, the polypropylene glycol group, and the methyl polypropylene glycol group are preferable, and the polyethylene glycol group and the methyl polyethylene glycol group are more preferable.

Examples of the alkyl group having 1 to 3 carbon atoms represented by $R_5$ to $R_7$ in the general formula (V) include a methyl group, an ethyl group, a n-propyl group, an isopropyl group, and the like. Among these, the methyl group is preferable.

Examples of the alkylene group having 1 to 3 carbon atoms represented by $R_8$ in the general formula (V) include a methylene group, an ethylene group, a trimethylene group, and the like.

Specific examples of the group represented by the general formula (V) include a trimethylammonium methyl group, a trimethylammonium ethyl group, a trimethylammonium propyl group, a triethylammonium methyl group, a triethylammonium ethyl group, a triethylammonium propyl group, and the like.

$R_1$ in the general formula (I) may be a hydrogen atom or a methyl group. In a case where $R_2$ represents a hydrogen atom, $R_1$ represents a methyl group.

As $R_2$ in the general formula (I), a hydrogen atom; an alkyl group having 1 to 20 carbon atoms; an alkyl group having 1 to 20 carbon atoms substituted with a fluorine atom or a hydroxy group; an arylalkyl group having 7 to 13 carbon atoms; an aryloxyalkyl group having 7 to 13 carbon atoms; a hexahydrophthalimide-N-alkyl group having 9 to 14 carbon atoms; or the group represented by the general formula (IV) is preferable, the hydrogen atom; the alkyl group having 1 to 20 carbon atoms; the alkyl group having 1 to 20 carbon atoms substituted with a fluorine atom or a hydroxy group; the aryloxyalkyl group having 7 to 13 carbon atoms; or the group represented by the general formula (IV) is more preferable, the hydrogen atom or the alkyl group having 1 to 20 carbon atoms substituted with a fluorine atom or a hydroxy group is even more preferable, and the alkyl group having 1 to 20 carbon atoms substituted with a hydroxy group is particularly preferable.

Preferred specific examples of the compound represented by the general formula (I) include a compound represented by the following general formula (I-I).

(I-I)

[In the formula, $R_{101}$ represents a hydrogen atom or a methyl group (here, in a case where $R_{102}$ represents a hydrogen atom, $R_{101}$ represents a methyl group), $R_{102}$ represents a hydrogen atom; an alkyl group having 1 to 20 carbon atoms; an alkyl group having 1 to 20 carbon atoms substituted with a fluorine atom or a hydroxy group; an arylalkyl group having 7 to 13 carbon atoms; an aryloxyalkyl group having 7 to 13 carbon atoms; a hexahydrophthalimide-N-alkyl group having 9 to 14 carbon atoms; or a group represented by the following general formula (IV-I)

(IV-I)

(in the formula, $R_{103}$ represents an unsubstituted alkylene group having 2 to 6 carbon atoms, $R_{104}$ represents a hydrogen atom or an alkyl group having 1 to 6 carbon atoms, and v is the same as v described above.).]

Examples of the alkyl group having 1 to 20 carbon atoms; the alkyl group having 1 to 20 carbon atoms substituted with a fluorine atom or a hydroxy group; the arylalkyl group having 7 to 13 carbon atoms; the aryloxyalkyl group having 7 to 13 carbon atoms; and the hexahydrophthalimide-N-alkyl group having 9 to 14 carbon atoms represented by $R_{102}$ in the general formula (I-I) are the same as the examples of the alkyl group, the arylalkyl group, the aryloxyalkyl group, and the hexahydrophthalimide-N-alkyl group represented by $R_2$ in the general formula (I). Furthermore, those preferred as the alkyl group, the arylalkyl group, the aryloxyalkyl group, and the hexahydrophthalimide-N-alkyl group represented by $R_2$ are also preferred as the alkyl group, the arylalkyl group, the aryloxyalkyl group, and the hexahydrophthalimide-N-alkyl group represented by $R_{102}$.

The unsubstituted alkylene group having 2 to 6 carbon atoms represented by $R_{103}$ in the general formula (IV-I) preferably has an alkylene group having 2 to 4 carbon atoms. Specifically, examples thereof include an ethylene group, a trimethylene group, a propylene group, a tetramethylene group, a pentamethylene group, a hexamethylene group, and the like. Among these, the ethylene group, the trimethylene group, the propylene group, and the tetramethylene group are preferable, the ethylene group and the propylene group are more preferable, and the ethylene group is particularly preferable.

Examples of the alkyl group having 1 to 6 carbon atoms represented by $R_{104}$ in the general formula (IV-I) are the same as the examples of the alkyl group having 1 to 6 carbon atoms represented by $R_4$ in the general formula (IV). Furthermore, those preferred as the alkyl group represented by $R_4$ are also preferred as the alkyl group represented by $R_{104}$.

As $R_{104}$ in the general formula (IV-I), a hydrogen atom and an alkyl group having 1 to 3 carbon atoms are preferable, and the hydrogen atom and a methyl group are more preferable.

Specific examples of the group represented by the general formula (IV-I) include a polyethylene glycol group, a methyl polyethylene glycol group, an ethyl polyethylene glycol group, a n-propyl polyethylene glycol group, an isopropyl polyethylene glycol group, a polytrimethylene glycol group, a polypropylene glycol group, a methyl polypropylene glycol group, an ethyl polypropylene glycol group, a n-propyl polypropylene glycol group, an isopropyl polypropylene glycol group, a polytetramethylene glycol group, a polypentamethylene glycol group, a polyhexamethylene glycol group, and the like. Among these, the polyethylene glycol group, the methyl polyethylene glycol group, the polypropylene glycol group, and the methyl polypropylene glycol group are preferable, and the polyethylene glycol group and the methyl polyethylene glycol group are more preferable.

$R_{101}$ in the general formula (I-I) may be a hydrogen atom or a methyl group. In a case where $R_{102}$ is a hydrogen atom, $R_{101}$ represents a methyl group.

As $R_{102}$ in the general formula (I-I), a hydrogen atom; an alkyl group having 1 to 20 carbon atoms; an alkyl group having 1 to 20 carbon atoms substituted with a fluorine atom or a hydroxy group; an aryloxyalkyl group having 7 to 13 carbon atoms; or the group represented by the general formula (IV-I) is preferable, the hydrogen atom or the alkyl group having 1 to 20 carbon atoms substituted with a fluorine atom or a hydroxy group is more preferable, and the alkyl group having 1 to 20 carbon atoms substituted with a hydroxy group is particularly preferable.

More preferred specific examples of the compound represented by the general formula (I) include a compound represented by the following general formula (I-II).

(I-II)

[In the formula, $R_{201}$ represents a hydrogen atom or a methyl group (here, in a case where $R_{202}$ is a hydrogen atom, $R_{201}$ represents a methyl group), and $R_{202}$ represents a hydrogen atom; an alkyl group having 1 to 20 carbon atoms; an alkyl group having 1 to 20 carbon atoms substituted with a fluorine atom or a hydroxy group; an aryloxyalkyl group having 7 to 13 carbon atoms; or a group represented by a general formula (IV-II)

(IV-II)

(in the formula, $R_{203}$ represents an unsubstituted alkylene group having 2 to 4 carbon atoms, $R_{204}$ represents a hydrogen atom or an alkyl group having 1 to 3 carbon atoms, and v is the same as v described above.).]

Examples of the alkyl group having 1 to 20 carbon atoms; the alkyl group having 1 to 20 carbon atoms substituted with a fluorine atom or a hydroxy group; and the aryloxyalkyl group having 7 to 13 carbon atoms represented by $R_{202}$ in the general formula (I-II) are the same as the examples of the alkyl group and the aryloxyalkyl group represented by $R_2$ in the general formula (I). Furthermore, those preferred as the alkyl group and the aryloxyalkyl group represented by $R_2$ are also preferred as the alkyl group and the aryloxyalkyl group represented by $R_{202}$.

Examples of the unsubstituted alkylene group having 2 to 4 carbon atoms represented by $R_{203}$ in the general formula (IV-II) include an ethylene group, a trimethylene group, a propylene group, a tetramethylene group, and the like. Among these, the ethylene group and the propylene group are preferable, and the ethylene group is more preferable.

Examples of the alkyl group having 1 to 3 carbon atoms represented by $R_{204}$ in the general formula (IV-II) include a methyl group, an ethyl group, a n-propyl group, an isopropyl group, and the like. Among these, the methyl group is preferable.

As $R_{204}$ in the general formula (IV-II), a hydrogen atom and a methyl group are preferable.

Specific examples of the group represented by the general formula (IV-II) include a polyethylene glycol group, a methyl polyethylene glycol group, an ethyl polyethylene glycol group, a n-propyl polyethylene glycol group, an isopropyl polyethylene glycol group, a polytrimethylene glycol group, a polypropylene glycol group, a methyl polypropylene glycol group, an ethyl polypropylene glycol group, a n-propyl polypropylene glycol group, an isopropyl polypropylene glycol group, and a polytetramethylene glycol group. Among these, the polyethylene glycol group, the methyl polyethylene glycol group, the polypropylene glycol group, and the methyl polypropylene glycol group are preferable, and the polyethylene glycol group and the methyl polyethylene glycol group are more preferable.

$R_{201}$ in the general formula (I-II) may be a hydrogen atom or a methyl group. In a case where $R_{202}$ is a hydrogen atom, $R_{201}$ represents a methyl group.

As $R_{202}$ in the general formula (I-II), a hydrogen atom or an alkyl group having 1 to 20 carbon atoms substituted with a fluorine atom or a hydroxy group is preferable, and the alkyl group having 1 to 20 carbon atoms substituted with a hydroxy group is more preferable.

Particularly preferred specific examples of the compound represented by the general formula (I) include a methacrylic acid, n-butyl (meth)acrylate, n-pentyl (meth)acrylate, n-hexyl (meth)acrylate, trifluoromethyl (meth)acrylate, trifluoroethyl (meth)acrylate, (perfluorobutyl)methyl (meth)acrylate, 2-(perfluorobutyl)ethyl (meth)acrylate, (perfluorohexyl)methyl (meth)acrylate, 2-(perfluorohexyl)ethyl (meth)acrylate, hydroxymethyl (meth)acrylate, hydroxyethyl (meth)acrylate, hydroxypropyl (meth)acrylate, hydroxybutyl (meth)acrylate, hydroxypentyl (meth)acrylate, hydroxyhexyl (meth)acrylate, phenoxymethyl (meth)acrylate, phenoxyethyl (meth)acrylate, phenoxypropyl (meth)acrylate, polyethylene glycol (meth)acrylate, polyethylene glycol monomethyl ether (meth)acrylate, and the like. Among these, the methacrylic acid, the 2-(perfluorobutyl)ethyl (meth)acrylate, the 2-(perfluorohexyl)ethyl (meth)acrylate, the hydroxymethyl (meth)acrylate, the hydroxyethyl (meth)acrylate, the hydroxypropyl (meth)acrylate, the hydroxybutyl (meth)acrylate, the hydroxypentyl (meth)acrylate, and the hydroxyhexyl (meth)acrylate are preferable, the hydroxymethyl (meth)acrylate, the hydroxyethyl (meth)acrylate, the hydroxypropyl (meth)acrylate, and the hydroxybutyl (meth)acrylate are more preferable, and the hydroxyethyl (meth)acrylate is particularly preferable. The compound represented by the general formula (I) may be a commercial compound or a compound appropriately synthesized by a known method.

Examples of the alkyl group having 1 to 6 carbon atoms represented by $R_{12}$ and $R_{13}$ in the general formula (II) are the same as the examples of the alkyl group having 1 to 6 carbon atoms represented by $R_4$ in the general formula (IV). Among these, a methyl group, an ethyl group, a n-propyl group, and an isopropyl group are preferable, and the isopropyl group is more preferable.

Examples of the dialkylaminoalkyl group having 3 to 9 carbon atoms represented by $R_{13}$ in the general formula (II) include a dimethylaminomethyl group, a dimethylaminoethyl group, a dimethylaminopropyl group, a diethylaminomethyl group, a diethylaminoethyl group, a diethylaminopropyl group, a dipropylaminomethyl group, a dipropylaminoethyl group, a dipropylaminopropyl group, and the like.

It is preferable that in the hydroxyalkyl group having 1 to 6 carbon atoms represented by $R_{13}$ in the general formula (II), a terminal portion is substituted with a hydroxy group is preferable. As such a hydroxyalkyl group, a hydroxyalkyl group in which one or two hydrogen atoms are substituted with a hydroxy group is preferable, and a hydroxyalkyl group in which one hydrogen atom is substituted with a hydroxy group is more preferable. In addition, the hydroxyalkyl group preferably has 1 to 3 carbon atoms and is preferably a linear hydroxyalkyl group. Specifically, examples thereof include a hydroxymethyl group, a hydroxyethyl group, a dihydroxyethyl group, a hydroxypropyl group, a dihydroxypropyl group, a hydroxybutyl group, a dihydroxybutyl group, a hydroxypentyl group, a dihydroxypentyl group, a hydroxyhexyl group, and a dihydroxyhexyl group. Among these, the hydroxymethyl group, the hydroxyethyl group, the hydroxypropyl group, the hydroxybutyl group, the hydroxypentyl group, and the hydroxyhexyl group are preferable, and the hydroxyethyl group is more preferable.

As $R_{11}$ in the general formula (II), a hydrogen atom is preferable.

As $R_{12}$ in the general formula (II), a hydrogen atom and an alkyl group having 1 to 3 carbon atoms are preferable, and the hydrogen atom is more preferable.

As $R_{13}$ in the general formula (II), a hydrogen atom, an alkyl group having 1 to 6 carbon atoms, and a hydroxyalkyl group having 1 to 6 carbon atoms are preferable, the hydrogen atom and the alkyl group having 1 to 6 carbon atoms are more preferable, the hydrogen atom and an alkyl group having 1 to 3 carbon atoms are even more preferable, and the hydrogen atom is particularly preferable.

Preferred specific examples of the compound represented by the general formula (II) include a compound represented by the following general formula (II-I).

(In the formula, $R_{113}$ represents a hydrogen atom, an alkyl group having 1 to 6 carbon atoms, or a hydroxyalkyl group having 1 to 6 carbon atoms, and $R_{11}$ and $R_{12}$ are the same as $R_{11}$ and $R_{12}$ described above.)

Examples of the alkyl group having 1 to 6 carbon atoms and the hydroxyalkyl group having 1 to 6 carbon atoms represented by $R_{113}$ in the general formula (II-I) are the same as the examples of the alkyl group and the hydroxyalkyl group represented by $R_{13}$ in the general formula (II). Furthermore, those preferred as the alkyl group and the hydroxyalkyl group represented by $R_{13}$ are also preferred as the alkyl group and the hydroxyalkyl group represented by $R_{113}$.

As $R_{113}$ in the general formula (II-I), a hydrogen atom and an alkyl group having 1 to 6 carbon atoms are preferable, the hydrogen atom and an alkyl group having 1 to 3 carbon atoms are more preferable, and the hydrogen atom is particularly preferable.

More preferred specific examples of the compound represented by the general formula (II) include a compound represented by the following general formula (II-II).

(In the formula, $R_{212}$ and $R_{213}$ each independently represent a hydrogen atom or an alkyl group having 1 to 3 carbon atoms, and $R_{11}$ is the same as $R_{11}$ described above.)

Examples of the alkyl group having 1 to 3 carbon atoms represented by $R_{212}$ and $R_{213}$ in the general formula (II-II) include a methyl group, an ethyl group, a n-propyl group, an isopropyl group, and the like. Among these, the isopropyl group is preferable.

As $R_{212}$ and $R_{213}$ in the general formula (II-II), a hydrogen atom is preferable.

Particularly preferred specific examples of the compound represented by the general formula (II) include (meth)acrylamide, N-methyl (meth)acrylamide, N-ethyl (meth)acrylamide, N-n-propyl (meth)acrylamide, N-isopropyl (meth)acrylamide, N,N-dimethyl (meth)acrylamide, N,N-diethyl (meth)acrylamide, N,N-di-n-propyl (meth)acrylamide, N,N-diisopropyl (meth)acrylamide, and the like. Among these, the (meth)acrylamide, the N-methyl (meth)acrylamide, the N-ethyl (meth)acrylamide, the N-n-propyl (meth)acrylamide, the N-isopropyl (meth)acrylamide, and the N,N-dimethyl (meth)acrylamide are preferable, the (meth)acrylamide is more preferable, and the acrylamide is particularly preferable. The compound represented by the general formula (II) may be a commercial compound or a compound appropriately synthesized by a known method.

Examples of the combination of the constituent components of the copolymer according to the present invention include combinations described in the following table. Among these, combinations 1 to 4 are preferable, the combinations 1, 3, and 4 are more preferable, and the combination 1 is particularly preferable. As the combination 1, a combination of a monomer unit derived from acrylic acid and one kind of monomer unit derived from the compound represented by the general formula (I-I) is preferable, and a combination of a monomer unit derived from acrylic acid and one kind of monomer unit derived from the compound represented by the general formula (I-II) is more preferable. More specifically, a combination of a monomer unit derived from acrylic acid and one kind of monomer unit derived from a compound included in the specific examples particularly preferred as the compound represented by the general formula (I) is preferable.

| | | Compound from which monomer unit is derived | |
|---|---|---|---|
| Combination 1 | Acrylic acid | One kind of compound represented by general formula (I) | — |
| Combination 2 | Acrylic acid | One kind of compound represented by general formula (II) | — |
| Combination 3 | Acrylic acid | Two kinds of compounds represented by general formula (I) | |
| Combination 4 | Acrylic acid | One kind of compound represented by general formula (I) | One kind of compound represented by general formula (II) |
| Combination 5 | Acrylic acid | Two kinds of compounds represented by general formula (II) | |

In the copolymer according to the present invention, the mass ratio of the monomer unit derived from acrylic acid to the monomer unit derived from the compound represented by the general formula (I) or the general formula (II), that is represented by monomer unit derived from acrylic acid/monomer unit derived from compound represented by general formula (I) or general formula (II), is generally 30/70 to 70/30, and preferably 40/60 to 60/40.

In (A) one or more kinds of polymers containing polyacrylic acid, the content of the polyacrylic acid with respect to the total mass of (A) is 50% to 100% by mass, preferably 70% to 100% by mass, and more preferably 75% to 100% by mass. It should be noted that "100% by mass" mentioned herein represents a case where (A) one or more kinds of polymers containing polyacrylic acid are constituted by (A1) polyacrylic acid only.

(A) one or more kinds of polymers containing polyacrylic acid may be neutralized polymers. In other words, among (A) one or more kinds of polymers containing polyacrylic acid, in a polymer containing a monomer unit having carboxy groups as a constituent component, some or all of carboxy groups may have turned into a salt. For (A) one or more kinds of polymers containing polyacrylic acid, it is preferable that any one or more kinds of polymers among the polymers are neutralized, it is more preferable that at least the polyacrylic acid in the polymers is neutralized, and it is even more preferable that all the polymers are neutralized. In a case where (A) one or more kinds of polymers containing polyacrylic acid are constituted by (A1) polyacrylic acid only, a neutralized polyacrylic acid is preferable. In a case where (A) one or more kinds of polymers containing polyacrylic acid are (A2) polymer group including polyacrylic acid and one or more kinds of polymers other than the polyacrylic acid, it is preferable that at least one kind of polymer in the polymer group is neutralized, it is more preferable that at least the polyacrylic acid is neutralized, and it is even more preferable that all the polymers in the polymer group are neutralized. As the neutralized polymer, a polymer neutralized by an alkali metal such as sodium hydroxide, lithium hydroxide, or potassium hydroxide is preferable, and a polymer neutralized by sodium hydroxide is more preferable. In a case where the neutralized polymer is used, the dispersibility of an electrode member is improved, and hence an active material and a conductive compound can be evenly distributed onto a current collector. Accordingly, the electric characteristics of the electrode can be further improved. In this case, a degree of neutralization is generally 60% to 100%, preferably 70% to 100%, and more preferably 70% to 90%.

(A) one or more kinds of polymers containing polyacrylic acid may be crosslinked. For (A) one or more kinds of polymers containing polyacrylic acid, it is preferable that any one or more kinds of polymers among the polymers are crosslinked, it is more preferable that at least the polyacrylic acid among the polymers is crosslinked, and it is even more preferable that all the polymers are crosslinked. In a case where (A) one or more kinds of polymers containing polyacrylic acid are constituted by (A1) polyacrylic acid only, a crosslinked polyacrylic acid is preferable. In a case where (A) one or more kinds of polymers containing polyacrylic acid are (A2) polymer group including polyacrylic acid and one or more kinds of polymers other than the polyacrylic acid, it is preferable that at least one kind of polymer in the polymer group is crosslinked, it is more preferable that at least the polyacrylic acid is crosslinked, and it is even more preferable that all the polymers in the polymer group are crosslinked. Examples of a crosslinking agent used for crosslinking the polymer include a crosslinking agent selected from compounds described in general formulae [1] to [13] and a polymer described in a general formula [14] that will be described later (hereinafter, the crosslinking agent will be simply described as a crosslinking agent according to the present invention in some cases). The crosslinked polymer may also be neutralized.

Provided that the rotation speed of a rotational viscometer is 12 rpm, the viscosity of the crosslinked polymer is generally 500 to 50,000 mPa·s, and preferably 1,000 to 50,000 mPa·s. It should be noted that as the rotational viscometer, a viscometer capable of measuring a viscosity of up to 50,000 mPa·s at a rotation speed of 12 rpm was used. The viscosity is a value of viscosity of a substance, which was obtained by dispersing (suspending) each polymer in water at a concentration of 1% by mass, and measured at a temperature of 20° C. to 25° C. by using a B type rotational viscometer.

For (A) one or more kinds of polymers containing polyacrylic acid, it is preferable that any one or more kinds of polymers among the polymers are crosslinked by the crosslinking agent according to the present invention; it is more preferable that at least the polyacrylic acid among the polymers are crosslinked by the crosslinking agent according to the present invention; it is even more preferable that all the polymers are crosslinked by the crosslinking agent according to the present invention; and it is particularly preferable that all the polymers are crosslinked by the crosslinking agent according to the present invention and neutralized.

In a case where (A) one or more kinds of polymers containing polyacrylic acid are constituted by (A1) polyacrylic acid only, polyacrylic acid crosslinked by the crosslinking agent according to the present invention is preferable; and polyacrylic acid crosslinked by the crosslinking agent according to the present invention and neutralized is more preferable. In a case where (A) one or more kinds of polymers containing polyacrylic acid are (A2) polymer group including polyacrylic acid and one or more kinds of polymers other than the polyacrylic acid, it is preferable that at least one kind of polymer in the polymer group is crosslinked by the crosslinking agent according to the present invention; it is more preferable that at least the polyacrylic acid is crosslinked by the crosslinking agent according to the present invention; it is even more preferable that all the polymers in the polymer group are crosslinked by the crosslinking agent according to the present invention; and it is still more preferable that all the polymers in the polymer group are crosslinked by the crosslinking agent according to the present invention and neutralized.

The weight-average molecular weight of each of (A) one or more kinds of polymers containing polyacrylic acid is generally 1,000 to 10,000,000, and preferably 10,000 to 5,000,000.

In a case where (A) one or more kinds of polymers containing polyacrylic acid are constituted by (A1) polyacrylic acid only, (A1) is preferably (A1-1) polyacrylic acid crosslinked by the crosslinking agent according to the present invention, and more preferably (A1-2) polyacrylic acid crosslinked by the crosslinking agent according to the present invention and neutralized.

In a case where (A) one or more kinds of polymers containing polyacrylic acid are (A2) polymer group including polyacrylic acid and one or more kinds of polymers other than the polyacrylic acid, (A2) is preferably (A2-1) polymer group including polyacrylic acid and one or more kinds of polymers other than the polyacrylic acid in which the polymers other than the polyacrylic acid contain a monomer unit having a carboxy group as a constituent component, more preferably (A2-2) polymer group including polyacrylic acid and one or more kinds of copolymers in which the copolymers contain a monomer unit having a carboxy group as a constituent component, even more preferably (A2-3) polymer group including polyacrylic acid and one or more kinds of copolymers in which the copolymers contain a monomer unit derived from acrylic acid as a constituent component, particularly preferably (A2-4) polymer group including polyacrylic acid and one or more kinds of copolymers in which the copolymers contain a monomer unit derived from acrylic acid as a constituent component, and at least the copolymer according to the present invention is included in the polymer group, and most preferably (A2-5) polyacrylic acid and the copolymers according to the present invention.

(A2-5) polyacrylic acid and the copolymer according to the present invention are preferably (A2-5-1) polyacrylic acid and the copolymer according to the present invention in which either or both of the polyacrylic acid and the copolymer according to the present invention are crosslinked by the crosslinking agent according to the present invention; more preferably (A2-5-2) polyacrylic acid and the copolymer according to the present invention in which at least the polyacrylic acid is crosslinked by the crosslinking agent according to the present invention; even more preferably (A2-5-3) polyacrylic acid and the copolymer according to the present invention in which the polyacrylic acid and the copolymer according to the present invention are crosslinked by the crosslinking agent according to the present invention; even more preferably (A2-5-4) polyacrylic acid and the copolymer according to the present invention, in which the polyacrylic acid and the copolymer according to the present invention are crosslinked by the crosslinking agent according to the present invention, and at least the polyacrylic acid is neutralized; and particularly preferably (A2-5-5) polyacrylic acid that is crosslinked by the crosslinking agent according to the present invention and neutralized and the copolymer according to the present invention that is crosslinked by the crosslinking agent according to the present invention and neutralized.

As (A) one or more kinds of polymers containing polyacrylic acid, (A1) and (A2-5) are preferable, (A1-1) and (A2-5-1) are more preferable, (A1-1) and (A2-5-2) are even more preferable, (A1-1) and (A2-5-3) are particularly preferable, and (A1-2) and (A2-5-5) are most preferable.

Crosslinking Agent According to the Present Invention

Examples of the crosslinking agent used for crosslinking (A) one or more kinds of polymers containing polyacrylic acid include a crosslinking agent selected from compounds described in the following general formulae [1] to [13] and a polymer described in the following general formula [14].

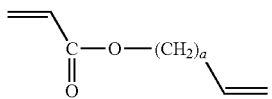

[1]

(In the formula, a represents an integer of 1 to 6.)

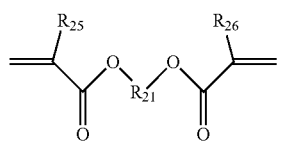

[2]

[In the formula, $R_{25}$ and $R_{26}$ each independently represent a hydrogen atom or a methyl group, and $R_{21}$ represents an alkylene group having 1 to 20 carbon atoms, a group represented by the following general formula [2-1]

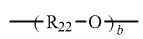

[2-1]

(in the formula, $R_{22}$ represents an alkylene group having 1 to 6 carbon atoms, and b represents an integer of 1 to 6.), or a group represented by the following general formula [2-2]

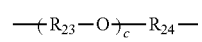

[2-2]

(in the formula, $R_{23}$ and $R_{24}$ each independently represent an alkylene group having 1 to 6 carbon atoms, and c represents an integer of 1 to 22.).]

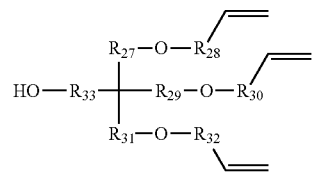

[3]

(in the formula, $R_{27}$ to $R_{33}$ each independently represent an alkylene group having 1 to 3 carbon atoms.)

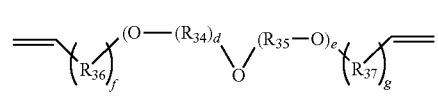

[4]

(in the formula, $R_{34}$ to $R_{37}$ each independently represent an alkylene group having 1 to 6 carbon atoms, d represents an integer of 1 to 6, e represents an integer of 0 to 6, and f and g each independently represent an integer of 0 or 1.)

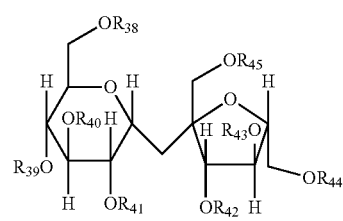

[5]

(in the formula, $R_{38}$ to $R_{45}$ each independently represent a hydrogen atom, a vinyl group, or a vinyl ketone group, and at least two or more groups among $R_{38}$ to $R_{45}$ are vinyl groups or vinyl ketone groups.)

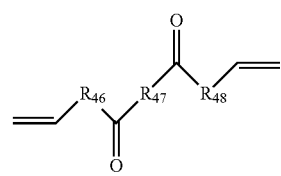

[6]

(in the formula, $R_{46}$ to $R_{48}$ each independently represent an alkylene group having 1 to 6 carbon atoms.)

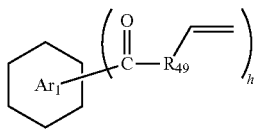
[7]

(in the formula, a ring $Ar_1$ represents a benzene ring or a naphthalene ring, $R_{49}$ represents an alkylene group having 1 to 6 carbon atoms, and h represents an integer of 2 to 4.)

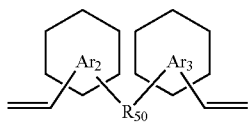
[8]

(in the formula, a ring $Ar_2$ and a ring $Ar_3$ each independently represent a benzene ring or a naphthalene ring, and $R_{50}$ represents an alkylene group having 1 to 6 carbon atoms.)

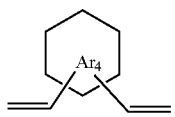
[9]

(in the formula, a ring $Ar_4$ represents a benzene ring or a naphthalene ring.)

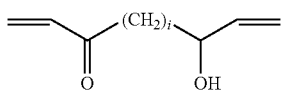
[10]

(in the formula, i represents an integer of 0 to 6.)

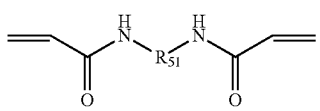
[11]

(in the formula, $R_{51}$ represents an alkylene group having 1 to 6 carbon atoms.)

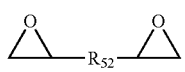
[12]

[in the formula, $R_{52}$ represents an alkylene group having 1 to 6 carbon atoms that has a substituent or is unsubstituted, an arylene group having 6 to 10 carbon atoms that has a substituent or is unsubstituted, a group represented by the following general formula [12-1]

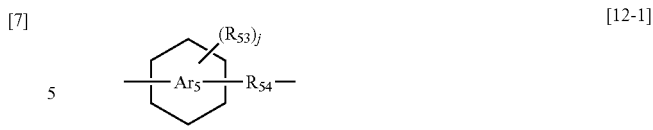
[12-1]

(in the formula, $R_{53}$ represents an alkyl group having 1 to 6 carbon atoms, $R_{54}$ represents an alkylene group having 1 to 6 carbon atoms, a ring $Ar_5$ represents a benzene ring or a naphthalene ring, and j represents an integer of 0 to 4.), or a group represented by the following general formula [12-2]

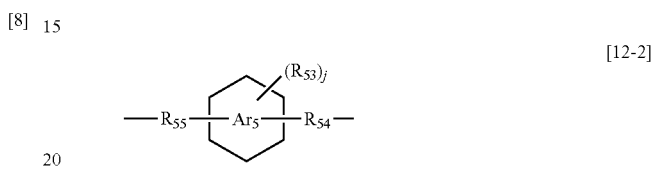
[12-2]

(in the formula, $R_{55}$ represents an alkylene group having 1 to 6 carbon atoms, and $R_{53}$, $R_{54}$, a ring $Ar_5$, and j are the same as $R_{53}$, $R_{54}$, the ring $Ar_5$, and j described above.).]

$$R_{56}-N=C=N-R_{57} \quad [13]$$

[In the formula, $R_{56}$ and $R_{57}$ each independently represent an alkyl group having 1 to 6 carbon atoms that has a substituent or is unsubstituted, an aryl group having 6 to 10 carbon atoms that has a substituent or is unsubstituted, or a group represented by the following general formula [13-1]

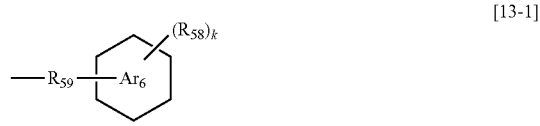
[13-1]

(in the formula, $R_{58}$ represents an alkyl group having 1 to 6 carbon atoms, $R_{59}$ represents an alkylene group having 1 to 6 carbon atoms, a ring $Ar_6$ represents a benzene ring or a naphthalene ring, and k represents an integer of 0 to 5.).]

$$-(N=C=N-R_{60})_m- \quad [14]$$

[In the formula, $R_{60}$ represents an alkylene group having 1 to 6 carbon atoms that has a substituent or is unsubstituted, an arylene group having 6 to 10 carbon atoms that has a substituent or is unsubstituted, a group represented by the following general formula [14-1] or

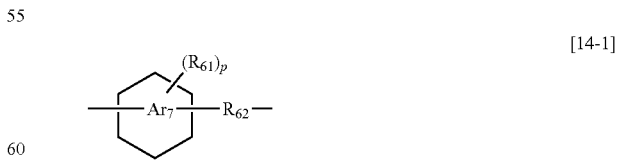
[14-1]

[14-2]

(in the formulae, $R_{61}$ represents an alkyl group having 1 to 6 carbon atoms, $R_{62}$ represents an alkylene group having 1 to 6 carbon atoms, a ring $Ar_7$ represents a benzene ring or a naphthalene ring, and p represents an integer of 0 to 4.), or a group represented by the following general formula [14-3]

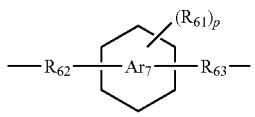

[14-3]

(in the formula, $R_{63}$ represents an alkylene group having 1 to 6 carbon atoms, and $R_{61}$, $R_{62}$, a ring $Ar_7$, and p are the same as $R_{61}$, $R_{62}$, the ring $Ar_7$, and p described above.), and m represents an integer of 10 to 10,000.]

In the general formula [1], a is preferably an integer of 1 to 3, and more preferably 1.

Specific examples of the compound described in the general formula [1] include (2-propenyl acrylate) allyl acrylate, 3-butenyl acrylate, 4-pentenyl acrylate, 5-hexenyl acrylate, 6-heptenyl acrylate, 7-octenyl acrylate, and the like. Among these, the allyl acrylate is preferable.

The alkylene group having 1 to 20 carbon atoms represented by $R_{21}$ in the general formula [2] preferably has 1 to 12 carbon atoms, and more preferably has 1 to 6 carbon atoms. Furthermore, the alkylene group may be any of a linear, branched, or cyclic alkylene group, and is preferably a linear alkylene group. Specifically, examples thereof include a methylene group, an ethylene group, a methyl methylene group, a trimethylene group, a propylene group, a dimethyl methylene group, an ethyl methylene group, a tetramethylene group, a 1-methyl trimethylene group, a 2-methyl trimethylene group, a 1,2-dimethyl ethylene group, a 1,1-dimethyl ethylene group, an ethyl ethylene group, an ethyl methyl methylene group, a propyl methylene group, a pentamethylene group, a 1-methyl tetramethylene group, a 2-methyl tetramethylene group, a 1-ethyl trimethylene group, a 2-ethyl trimethylene group, a n-propyl ethylene group, an isopropyl ethylene group, a n-butyl methylene group, an isobutyl methylene group, a tert-butyl methylene group, a hexamethylene group, a 1-methyl pentamethylene group, a 2-methyl pentamethylene group, a 3-methyl pentamethylene group, a 1-ethyl tetramethylene group, a 2-ethyl tetramethylene group, a 1-n-propyl trimethylene group, a 1-isopropyl trimethylene group, a 2-n-propyl trimethylene group, a 2-isopropyl trimethylene group, a n-butyl ethylene group, an isobutyl ethylene group, a tert-butyl ethylene group, a n-pentyl methylene group, an isopentyl methylene group, a heptamethylene group, an octamethylene group, a nonamethylene group, a decamethylene group, an undecamethylene group, a dodecamethylene group, a tridecamethylene group, a tetradecamethylene group, a pentadecamethylene group, a hexadecamethylene group, a heptadecamethylene group, an octadecamethylene group, a nonadecamethylene group, an eicosamethylene group, a cyclopropylene group, a cyclopentylene group, a cyclohexylene group, a cycloheptylene group, a cyclooctylene group, a cyclononylene group, a cyclodecylene group, a cycloundecylene group, a cyclododecylene group, a cyclotridecylene group, a cyclohexadecylene group, a cyclooctadecylene group, a cycloeicosylene group, a —$C_6H_{10}$—$CH_2$— group, a —$C_6H_{10}$—$C_2H_4$— group, a —$C_6H_{10}$—$C_3H_6$— group, a —$C_6H_{10}$—$C_4H_8$— group, a —$C_6H_{10}$—$C_5H_{10}$— group, a —$C_6H_{10}$—$C_6H_{12}$— group, and the like. Among these, the methylene group, the ethylene group, the trimethylene group, the tetramethylene group, the pentamethylene group, the hexamethylene group, the heptamethylene group, the octamethylene group, the nonamethylene group, the decamethylene group, the undecamethylene group, and the dodecamethylene group are preferable, and the methylene group, the ethylene group, the trimethylene group, the tetramethylene group, the pentamethylene group, and the hexamethylene group are more preferable.

The alkylene group having 1 to 6 carbon atoms represented by $R_{22}$ in the general formula [2-1] preferably has 1 to 3 carbon atoms, and more preferably has 2 or 3 carbon atoms. Furthermore, the alkylene group may be any of a linear, branched, or cyclic alkylene group, and is preferably a linear alkylene group. Specifically, examples thereof include a methylene group, an ethylene group, a methyl methylene group, a trimethylene group, a propylene group, a dimethyl methylene group, an ethyl methylene group, a tetramethylene group, a 1-methyl trimethylene group, a 2-methyl trimethylene group, a 1,2-dimethyl ethylene group, a 1,1-dimethyl ethylene group, an ethyl ethylene group, an ethyl methyl methylene group, a propyl methylene group, a pentamethylene group, a hexamethylene group, a cyclopropylene group, a cyclopentylene group, a cyclohexylene group, and the like. Among these, the methylene group, the ethylene group, and the trimethylene group are preferable, the ethylene group and the trimethylene group are more preferable, and the ethylene group is particularly preferable.

In the general formula [2-1], b is preferably an integer of 2 to 6, and more preferably an integer of 4 to 6. In a case where b is equal to or greater than 2, b pieces of —($R_{22}$—O)— group may be the same as or different from each other. It is preferable that all the —($R_{22}$—O)— groups are the same as each other.

Preferred specific examples of the group represented by the general formula [2-1] include groups represented by the following general formulae [2-1-1] to [2-1-3] and the like.

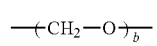

[2-1-1]

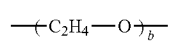

[2-1-2]

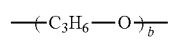

[2-1-3]

(In the formulae, b is the same as b described above.)

Examples of the alkylene group having 1 to 6 carbon atoms represented by $R_{23}$ and $R_{24}$ in the general formula [2-2] are the same as the examples of the alkylene group having 1 to 6 carbon atoms represented by $R_{22}$ in the general formula [2-1]. Furthermore, those preferred as the alkylene group represented by $R_{22}$ are also preferred as the alkylene group represented by $R_{23}$ and $R_{24}$.

In the general formula [2-2], c is preferably an integer of 2 to 13, and more preferably an integer of 3 to 8. In a case where c is equal to or greater than 2, c pieces of —($R_{23}$—O)— group may be the same as or different from each other. It is preferable that all the —($R_{23}$—O)— groups are the same as each other.

Preferred specific examples of the group represented by the general formula [2-2] include groups represented by the following general formulae [2-2-1] to [2-2-3] and the like. Among these, the group represented by the general formula [2-2-2] is preferable.

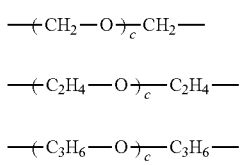

[2-2-1]
[2-2-2]
[2-2-3]

(In the formulae, c is the same as c described above.)

Preferred specific examples of the compound described in the general formula [2] include compounds described in the following general formulae [2-01] to [2-14] and the like. Among these, the compounds described in the general formulae [2-09] to [2-14] are preferable, the compounds described in the general formulae [2-11] and [2-12] are more preferable, and the compound described in the general formula [2-11] is particularly preferable.

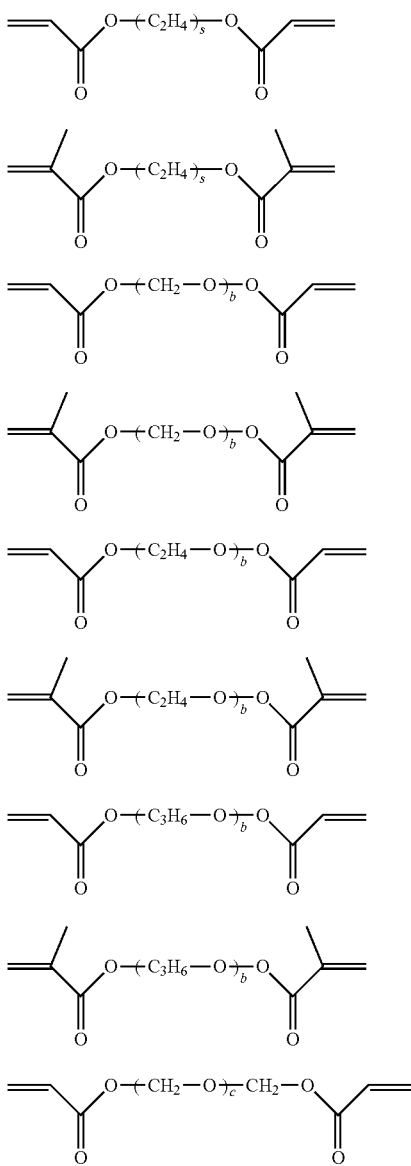

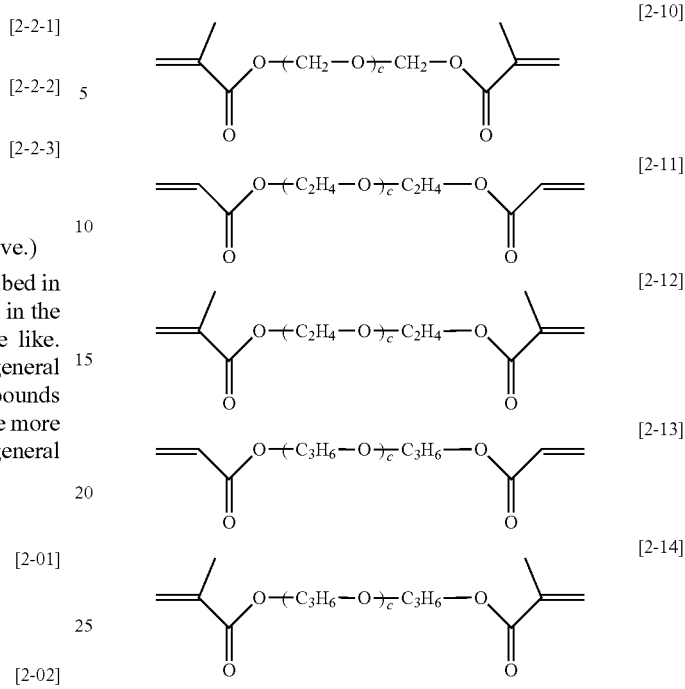

(In the formulae, b and c are the same as b and c described above, and s represents an integer of 1 to 6. As s, an integer of 4 to 6 is preferably, and 6 is more preferably.)

Examples of the alkylene group having 1 to 3 carbon atoms represented by $R_{27}$ to $R_{33}$ in the general formula [3] include a methylene group, an ethylene group, a trimethylene group, and the like. Among these, the methylene group and the ethylene group are preferable, and the methylene group is more preferable.

Preferred specific examples of the compound described in the general formula [3] include compounds described in the following formulae [3-01] to [3-03] and the like. Among these, the compound described in the formula [3-01] is preferable.

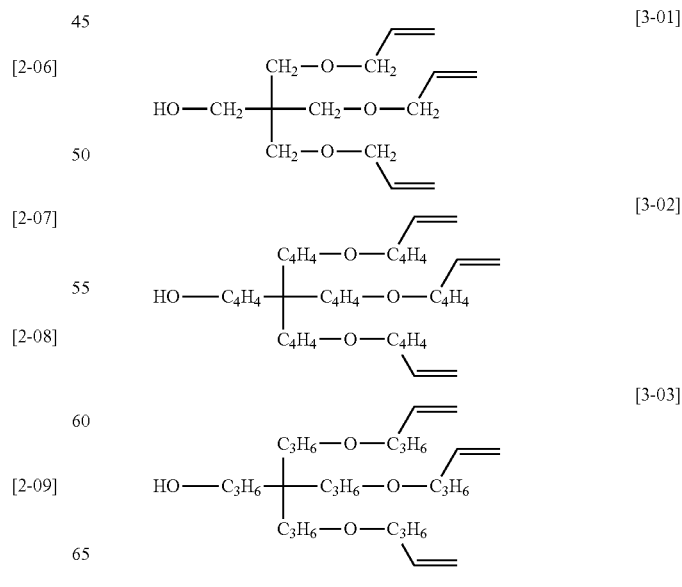

Examples of the alkylene group having 1 to 6 carbon atoms represented by $R_{34}$ to $R_{37}$ in the general formula [4] are the same as the examples of the alkylene group having 1 to 6 carbon atoms represented by $R_{22}$ in the general formula [2-1]. Furthermore, those preferred as the alkylene group represented by $R_{22}$ are also preferred as the alkylene group represented by $R_{34}$ to $R_{37}$.

In the general formula [4], d is preferably an integer of 1 to 4, and more preferably 1 or 2. In a case where d is equal to or greater than 2, d pieces of —(O—$R_{34}$)— group may be the same as or different from each other. It is preferable that all the —(O—$R_{34}$)— groups are the same as each other.

In the general formula [4], e is preferably an integer of 0 to 2. In a case where e is equal to or greater than 2, e pieces of —($R_{35}$—O)— group may be the same as or different from each other. It is preferable that all the —($R_{35}$—O)— groups are the same as each other. It should be noted that in a case where e is 0, —($R_{35}$—O)— represents a bond. That is, in a case where e is 0, —O— and —($R_{37}$)$_g$— adjacent to each other are directly bonded to each other. Hereinafter, a bond has the same definition.

In the general formula [4], f and g each independently represent an integer of 0 or 1. It is preferable that f and g are the same as each other. It should be noted that in a case where f is 0, —$R_{36}$— represents a bond, and in a case where g is 0, —$R_{37}$— represents a bond.

Preferred specific examples of the compound described in the general formula [4] include a compound described in the following general formula [4-1] or [4-2] and the like. Among these, the compound described in the general formula [4-1] is preferable.

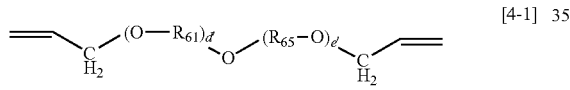

[4-1]

(In the formula, $R_{64}$ and $R_{65}$ each independently represent a methylene group, an ethylene group, or a trimethylene group, d' represents 1 or 2, and e' represents an integer of 0 to 2.)

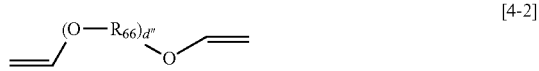

[4-2]

(In the formula, $R_{66}$ represents a methylene group, an ethylene group, a trimethylene group, a tetramethylene group, a pentamethylene group, or a hexamethylene group, and d" represents an integer of 1 to 4.)

As $R_{64}$ and $R_{65}$ in the general formula [4-1], an ethylene group is preferable.

It is preferable that d' and e' in the general formula [4-1] are the same as each other. In a case where d' is 2, d' pieces of —(O—$R_{64}$)— group may be the same as or different from each other. It is preferable that all the —(O—$R_{64}$)— groups are the same as each other. In a case where e' is 2, e' pieces of —($R_{65}$—O)— group may be the same as or different from each other. It is preferable that all the —($R_{65}$—O)— groups are the same as each other. It should be noted that in a case where e' is 0, —($R_{65}$—O)— represents a bond.

As $R_6$ in the general formula [4-2], an ethylene group, a tetramethylene group, and a hexamethylene group are preferable.

As d" in the general formula [4-2], 1 or 2 is preferable. In a case where d" is equal to or greater than 2, d" pieces of —(O—$R_{65}$)— group may be the same as or different from each other. It is preferable that all the —(O—$R_{65}$)— groups are the same as each other.

More preferred specific examples of the compound described in the general formula [4] include compounds described in the following formulae [4-01] to [4-10] and the like. Among these, the compounds described in the formulae [4-02] to [4-05] are preferable.

[4-01]

[4-02]

[4-03]

[4-04]

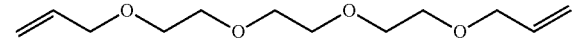

[4-05]

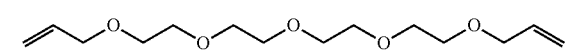

[4-06]

[4-07]

[4-08]

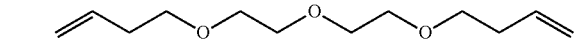

[4-09]

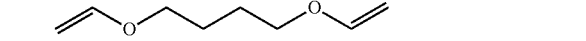

[4-10]

In the general formula [5], at least two or more groups among $R_{38}$ to $R_{45}$ are vinyl groups or vinyl ketone groups. It is preferable that at least 5 to 8 groups among $R_{38}$ to $R_{45}$ are vinyl groups or vinyl ketone groups. It is more preferable at least 5 to 7 groups among $R_{38}$ to $R_{45}$ are vinyl groups or vinyl ketone groups.

Preferred specific examples of the compound described in the general formula [5] include compounds described in the following formulae [5-01] to [5-06] and the like.

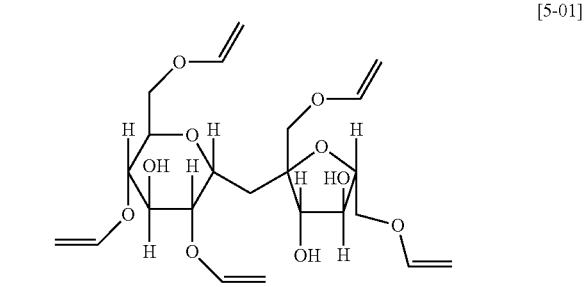

[5-01]

[5-02]
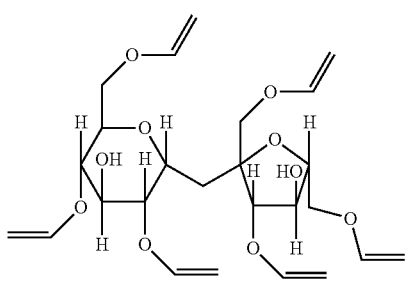

[5-03]
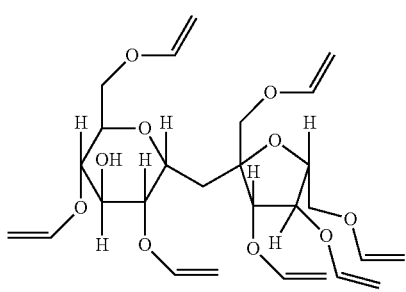

[5-04]
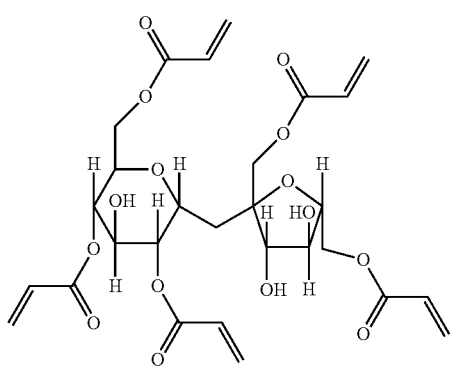

[5-05]
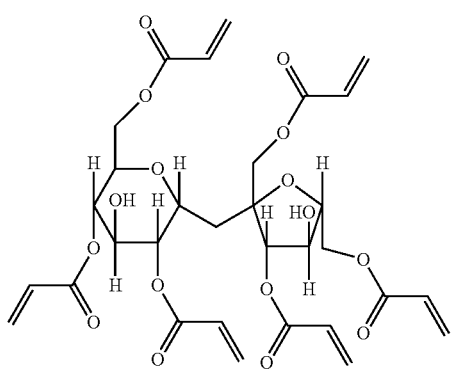

[5-06]
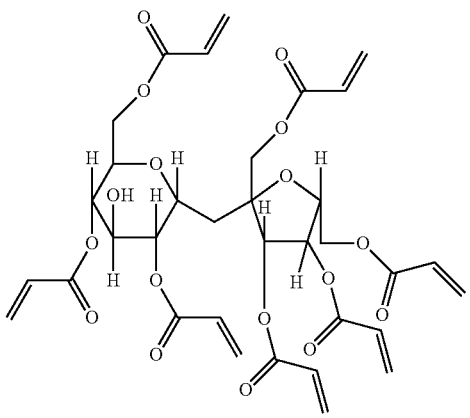

Examples of the alkylene group having 1 to 6 carbon atoms represented by $R_{46}$ to $R_{48}$ in the general formula [6] are the same as the examples of the alkylene group having 1 to 6 carbon atoms represented by $R_{22}$ in the general formula [2-1].

As $R_{46}$ and $R_{48}$ in the general formula [6], a methylene group, an ethylene group, a trimethylene group, a propyl methylene group, a pentamethylene group, and a hexamethylene group are preferable, and the methylene group, the ethylene group, and the trimethylene group are more preferable.

As $R_{47}$ in the general formula [6], a cyclopentylene group and a cyclohexylene group are preferable, and the cyclohexylene group is more preferable.

Preferred specific examples of the compound described in the general formula [6] include compounds described in the following formulae [6-01] to [6-03] and the like.

[6-01]
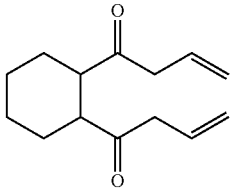

[6-02]
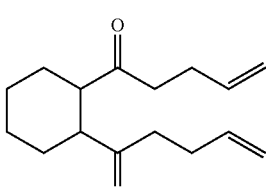

[6-03]
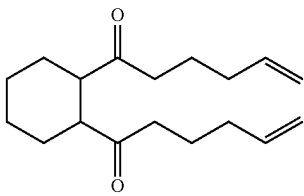

Examples of the alkylene group having 1 to 6 carbon atoms represented by $R_{49}$ in the general formula [7] are the same as the examples of the alkylene group having 1 to 6 carbon atoms represented by $R_{22}$ in the general formula [2-1]. Among these, a methylene group and an ethylene group are preferable, and the methylene group is more preferable.

As the ring $Ar_1$ in the general formula [7], a benzene ring is preferable.

As h in the general formula [7], an integer of 3 or 4 is preferable, and h pieces of group represented by the following formula may be the same as or different from each other. It is preferable that all the groups represented by the following formula are the same as each other.

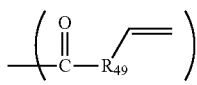

(In the formula, $R_{49}$ is the same as $R_{49}$ described above.)

Preferred specific examples of the compound described in the general formula [7] include compounds described in the following formulae [7-01] and [7-02] and the like.

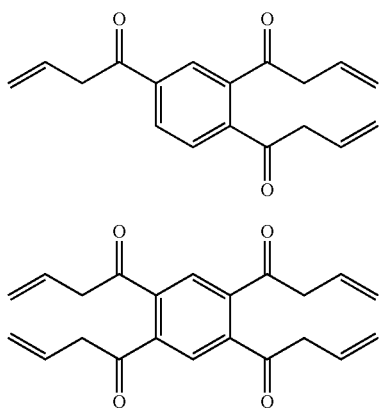

[7-01]

[7-02]

As the ring $Ar_2$ and the ring $Ar_3$ in the general formula [8], a benzene ring is preferable.

Examples of the alkylene group having 1 to 6 carbon atoms represented by $R_{50}$ in the general formula [8] are the same as the examples of the alkylene group having 1 to 6 carbon atoms represented by $R_{22}$ in the general formula [2-1]. Among these, a methylene group, an ethylene group, and a trimethylene group are preferable, and the trimethylene group is more preferable.

Preferred specific examples of the compound described in the general formula [8] include compounds described in the following formulae [8-01] to [8-03] and the like. Among these, the compound described in the formula [8-03] is preferable.

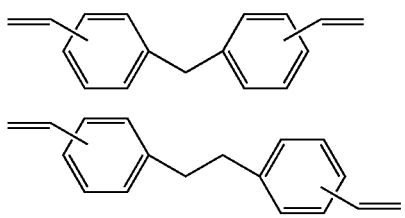

[8-01]

[8-02]

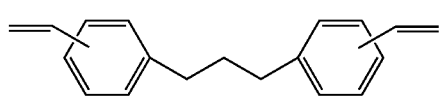

[8-03]

As the ring $Ar_4$ in the general formula [9], a benzene ring is preferable.

Preferred specific examples of the compound described in the general formula [9] include compounds described in the following formulae [9-01] and [9-02] and the like. Among these, the compound described in the formula [9-01] is preferable.

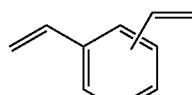

[9-01]

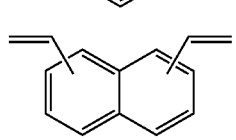

[9-02]

As i in the general formula [10], an integer of 0 to 3 is preferable, and 0 is more preferable.

Preferred specific examples of the compound described in the general formula [10] include divinyl ethylene glycol (1,5-hexadiene-3,4-diol), 1,6-heptadiene-3,5-diol, 1,7-octadiene-3,6-diol, 1,8-nonadiene-3,7-diol, and the like are preferable. Among these, the divinyl ethylene glycol is preferable.

Examples of the alkylene group having 1 to 6 carbon atoms represented by $R_{51}$ in the general formula [11] are the same as the examples of the alkylene group having 1 to 6 carbon atoms represented by $R_{22}$ in the general formula [2-1]. Among these, a methylene group, an ethylene group, and a trimethylene group are preferable, and the methylene group is more preferable.

Preferred specific examples of the compound described in the general formula [11] include N,N'-methylenebisacrylamide, N,N'-ethylenebisacrylamide, N,N'-trimethylenebisacrylamide, and the like are preferable. Among these, the N,N'-methylenebisacrylamide is preferable.

Examples of the alkylene group having 1 to 6 carbon atoms in "alkylene group having 1 to 6 carbon atoms that has a substituent or is unsubstituted" represented by $R_{52}$ in the general formula [12] are the same as the examples of the alkylene group having 1 to 6 carbon atoms represented by $R_{22}$ in the general formula [2-1]. Among these, a methylene group, an ethylene group, a trimethylene group, a tetramethylene group, a pentamethylene group, and a hexamethylene group are preferable. It should be noted that the number of carbon atoms in the substituent is not included in the 1 to 6 carbon atoms. Likewise, hereinafter, the number of carbon atoms in a group having a substituent does not include the number of carbon atoms in the substituent.

Specifically, examples of the arylene group having 6 to 10 carbon atoms in "arylene group having 6 to 10 carbon atoms that has a substituent or is unsubstituted" represented by $R_{52}$ in the general formula [12] include a phenylene group, a naphthylene group, and the like. Among these, the phenylene group is preferable.

It is preferable that the alkylene group having 1 to 6 carbon atoms having a substituent and the arylene group having 6 to 10 carbon atoms having a substituent that are represented by $R_{52}$ in the general formula [12] have 1 or 2 substituents. Examples of the substituents include an alkyl group having 1 to 6 carbon atoms such as a methyl group, an ethyl group, a n-propyl group, an isopropyl group, a n-butyl group, an isobutyl group, a tert-butyl group, a n-pentyl group, or a n-hexyl group; a halogen atom such as a fluorine atom, a chlorine atom, a bromine atom, or an iodine atom; an alkoxy group having 1 to 6 carbon atoms such as a methoxy group, an ethoxy group, a propoxy group, a butoxy group, a tert-butoxy group, a propoxy group, or a hexyloxy group; an aryl group having 6 to 10 carbon atoms such as a phenyl group; a hydroxyalkyl group having 1 to 6 carbon atoms such as a hydroxyethyl group or a hydroxypropyl group; an alkoxyalkyl group having 2 to 7 carbon atoms such as a methoxyethyl group, an ethoxyethyl group, an ethoxypropyl group, or a butoxyethyl group; a hydroxyalkoxy group having 1 to 6 carbon atoms such as a 2-hydroxyethoxy group; an alkoxyalkoxy group having 2 to 7 carbon atoms such as a 2-methoxyethoxy group or a 2-ethoxyethoxy group; a sulfoalkyl group having 1 to 6 carbon atoms such as a 2-sulfoethyl group; a carboxyalkyl group having 2 to 7 carbon atoms such as a carboxymethyl group, a carboxyethyl group, a carboxypropyl group, a carboxybutyl group, a carboxypentyl group, or a carboxyhexyl group; a cyanoalkyl group having 2 to 7 carbon atoms such as a cyanomethyl group, a cyanoethyl group, a cyanopropyl group, a cyanobutyl group, a cyanopentyl group, or a cyanohexyl group; a sulfo group, and the like. Among these, the alkyl group having 1 to 6 carbon atoms is preferable.

As $R_{52}$ in the general formula [12], an unsubstituted alkylene group having 1 to 6 carbon atoms and a phenylene group that has an alkyl group having 1 to 6 carbon atoms as a substituent or is unsubstituted are preferable, and a linear alkylene group having 1 to 6 carbon atoms is more preferable.

Examples of the alkyl group having 1 to 6 carbon atoms represented by $R_{53}$ in the general formulae [12-1] and [12-2] are the same as the examples of the alkyl group having 1 to 6 carbon atoms represented by $R_4$ in the general formula (IV). Furthermore, those preferred as the alkyl group represented by $R_4$ are also preferred as the alkyl group represented by $R_{53}$.

Examples of the alkylene group having 1 to 6 carbon atoms represented by $R_{54}$ in the general formulae [12-1] and [12-2] and represented by $R_{55}$ in the general formula [12-2] are the same as the examples of the alkylene group having 1 to 6 carbon atoms represented by $R_{22}$ in the general formula [2-1]. Furthermore, those preferred as the alkylene group represented by $R_{22}$ are also preferred as the alkylene group represented by $R_{44}$ and $R_{55}$.

As the ring $Ar_5$ in the general formulae [12-1] and [12-2], a benzene ring is preferable.

As j in the general formulae [12-1] and [12-2], 0 or 1 is preferable. In a case where j is 0, the benzene ring or the naphthalene ring as the ring $Ar_5$ does not have a substituent.

Preferred specific examples of the compound described in the general formula [12] include compounds described in the following general formulae [12-3] to [12-6] and the like are preferable. Among these, the compound described in the general formula [12-6] is preferable.

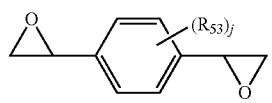

[12-3]

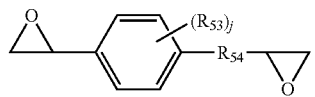

[12-4]

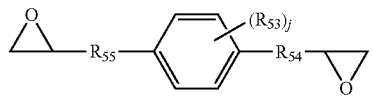

[12-5]

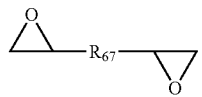

[12-6]

(In the formulae, $R_{67}$ represents an unsubstituted alkylene group having 1 to 6 carbon atoms, and $R_{53}$ to $R_{55}$ and j are the same as $R_{53}$ to $R_{55}$ and j described above.)

Examples of the unsubstituted alkylene group having 1 to 6 carbon atoms represented by $R_{67}$ in the general formula [12-6] are the same as the examples of the alkylene group having 1 to 6 carbon atoms represented by $R_{22}$ in the general formula [2-1]. Among these, a methylene group, an ethylene group, a trimethylene group, a tetramethylene group, a pentamethylene group, and a hexamethylene group are preferable.

Preferred specific examples of the compound described in the general formula [12-6] include 1,2:4,5-diepoxypentane, 1,2:5,6-diepoxyhexane, 1,2:6,7-diepoxyheptane, 1,2:7,8-diepoxyoctane, 1,2:8,9-diepoxynonane, 1,2:9,10-diepoxydecane, and the like.

Examples of the alkyl group having 1 to 6 carbon atoms in "alkyl group having 1 to 6 carbon atoms that has a substituent or is unsubstituted" represented by $R_{56}$ and $R_{57}$ in the general formula [13] are the same as the examples of the alkyl group having 1 to 6 carbon atoms represented by $R_4$ in the general formula (IV). Furthermore, those preferred as the alkyl group represented by $R_4$ are also preferred as the alkyl group represented by $R_{56}$ and $R_{57}$.

Specifically, examples of the aryl group having 6 to 10 carbon atoms in "aryl group having 6 to 10 carbon atoms that has a substituent or is unsubstituted" represented by $R_{56}$ and $R_{57}$ in the general formula [13] include a phenyl group, a naphthyl group, and the like. Among these, the phenyl group is preferable.

The alkyl group having 1 to 6 carbon atoms having a substituent and the aryl group having 6 to 10 carbon atoms having a substituent that are represented by $R_{56}$ and $R_{57}$ in the general formula [13] preferably have 1 to 3 substituents, and more preferably have 2 substituents. Examples of the substituents are the same as the specific examples of the substituents of "the alkylene group having 1 to 6 carbon atoms having a substituent and the arylene group having 6 to 10 carbon atoms having a substituent" represented by $R_{52}$ in the general formula [12].

Examples of the alkyl group having 1 to 6 carbon atoms represented by $R_{58}$ in the general formula [13-1] are the same as the examples of the alkyl group having 1 to 6 carbon atoms represented by $R_4$ in the general formula (IV). Furthermore, those preferred as the alkyl group represented by $R_4$ are also preferred as the alkyl group represented by $R_{58}$.

Examples of the alkylene group having 1 to 6 carbon atoms represented by $R_{59}$ in the general formula [13-1] are the same as the examples of the alkylene group having 1 to 6 carbon atoms represented by $R_{22}$ in the general formula [2-1]. Furthermore, those preferred as the alkylene group represented by $R_{22}$ are also preferred as the alkylene group represented by $R_{59}$.

As the ring $Ar_6$ in the general formula [13-1], a benzene ring is preferable.

As k in the general formula [13-1], an integer of 1 to 3 is preferable, and 2 is more preferable. In a case where k is 0, the benzene ring or the naphthalene ring as the ring $Ar_6$ does not have a substituent.

It is preferable that $R_{56}$ and $R_{57}$ in the general formula [13] are the same as each other. As $R_{56}$ and $R_{57}$, a phenyl group which has an alkyl group having 1 to 6 carbon atoms as a substituent or is unsubstituted and the group represented by the general formula [13-1] are preferable.

Preferred specific examples of the compound described in the general formula [13] include compounds described in the following general formulae [13-2] and [13-3] and the like. Among these, the compound described in the general formula [13-2] is preferable.

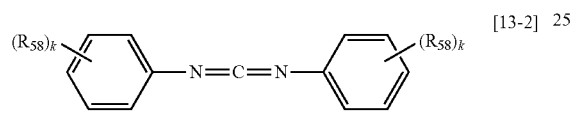

[13-2]

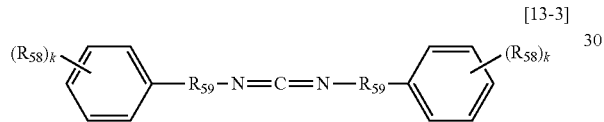

[13-3]

(In the formulae, $R_{58}$, $R_{59}$, and k are the same as $R_{58}$, $R_{59}$, and k described above, and two $R_{58}$'s and two $R_{59}$'s may be the same as or different from each other respectively.)

Preferred specific examples of the compound described in the general formula [13-2] include compounds described in the following formulae [13-01] to [13-12] and the like.

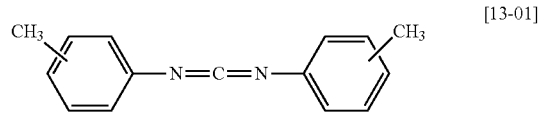

[13-01]

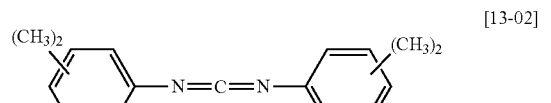

[13-02]

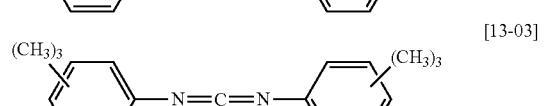

[13-03]

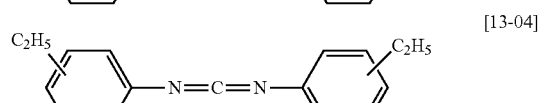

[13-04]

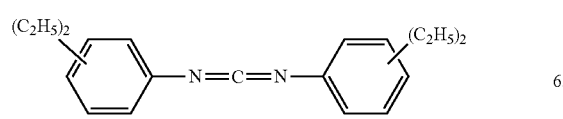

[13-05]

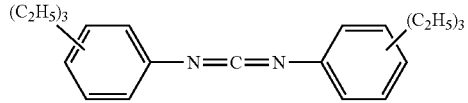

[13-06]

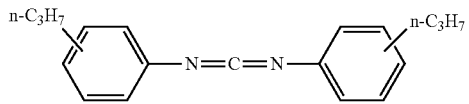

[13-07]

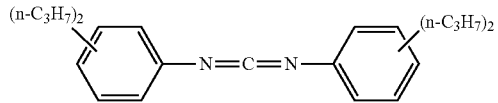

[13-08]

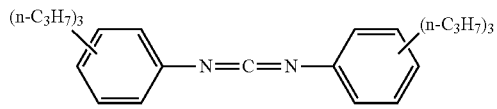

[13-09]

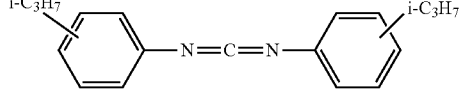

[13-10]

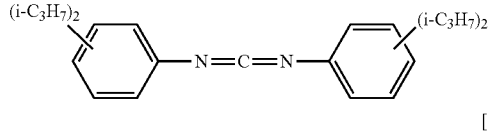

[13-11]

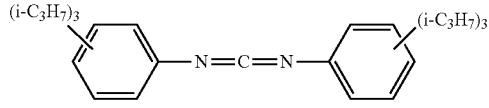

[13-12]

Examples of the alkylene group having 1 to 6 carbon atoms that is represented by $R_{60}$ in the general formula [14] and has a substituent or is unsubstituted and the arylene group having 6 to 10 carbon atoms that is represented by $R_{60}$ in the general formula [14] and has a substituent or is unsubstituted are the same as the examples of the alkylene group and the arylene group represented by $R_{52}$ in the general formula [12].

Examples of the alkyl group having 1 to 6 carbon atoms represented by $R_{61}$ in the general formulae [14-1] to [14-3] are the same as the examples of the alkyl group having 1 to 6 carbon atoms represented by $R_4$ in the general formula (IV).

Examples of the alkylene group having 1 to 6 carbon atoms represented by $R_{62}$ in the general formulae [14-1] to [14-3] and represented by $R_{63}$ in the general formula [14-3] are the same as the examples of the alkylene group having 1 to 6 carbon atoms represented by $R_{22}$ in the general formula [2-1].

As the ring $Ar_7$ in the general formulae [14-1] to [14-3], a benzene ring is preferable.

As p in the general formulae [14-1] to [14-3], 0 or 1 is preferable. In a case where p is 0, the benzene ring or the naphthalene ring as the ring $Ar_7$ does not have a substituent.

As $R_{60}$ in the general formula [14], an alkylene group having 1 to 6 carbon atoms that has a substituent or is unsubstituted and a phenylene group that has a substituent or is unsubstituted are preferable, the unsubstituted alkylene group having 1 to 6 carbon atoms and the phenylene group having a substituent are more preferable, and a phenylene group having an alkyl group having 1 to 6 carbon atoms as a substituent is particularly preferable.

As m in the general formula [14], an integer of 10 to 1,000 is preferable, and an integer of 10 to 100 is more preferable.

Preferred specific examples of the polymer described in the general formula [14] include polymers described in the following general formulae [14-4] to [14-8] and the like. Among these, the polymer described in the general formula [14-5] is preferable.

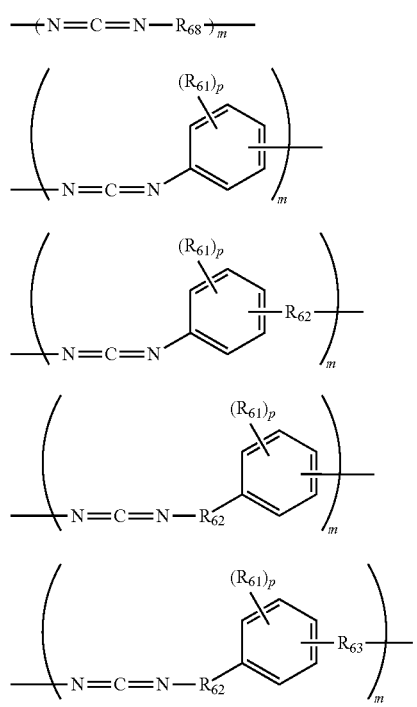

(In the formulae, $R_{61}$ to $R_{63}$, p, and m are the same as $R_{61}$ to $R_{63}$, p, and m described above, and $R_{68}$ represents an unsubstituted alkylene group having 1 to 6 carbon atoms.)

Examples of the unsubstituted alkylene group having 1 to 6 carbon atoms represented by $R_{61}$ in the general formula [14-2] are the same as the examples of the unsubstituted alkylene group having 1 to 6 carbon atoms represented by $R_{67}$ in the general formula [12-6]. Furthermore, those preferred as the unsubstituted alkylene group represented by $R_{67}$ are also preferred as the unsubstituted alkylene group represented by $R_{61}$.

Preferred specific examples of the polymer described in the general formula [14-5] include polymers described in the following general formulae [14-01] to [14-04] and the like. Among these, the polymer described in the general formula [14-01] is preferable.

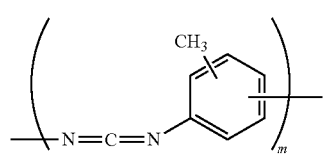

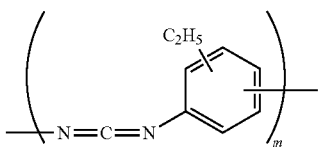

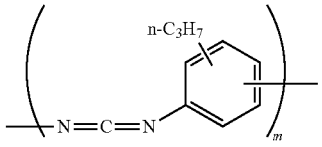

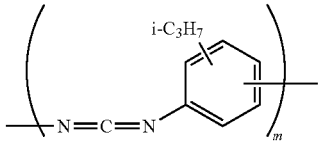

(In the formulae, m is the same as m described above.)

As the crosslinking agent according to the present invention, the compounds described in the general formulae [2], [3], [4], [9], [10], and [11] and the polymer described in the general formula [14] are preferable, the compounds described in the general formulae [2], [3], [4], and [10] are more preferable, the compounds described in the general formulae [2] and [4] are even more preferable, and the compound described in the general formula [2] is particularly preferable. The crosslinking agent may be a commercial crosslinking agent or a crosslinking agent appropriately synthesized by a known method.

Method for Manufacturing (A) One or More Kinds of Polymers Containing Polyacrylic Acid (A) one or more kinds of polymers containing polyacrylic acid may be manufactured by performing a polymerization reaction based on a known method. For example, by performing a polymerization reaction of acrylic acid in the presence of, if necessary, a polymerization initiator, the polyacrylic acid can be manufactured.

The polymerization reaction may be performed based on a known method. Specifically, in an appropriate solvent, the polymerization reaction may be performed at a temperature of 30° C. to 200° C., preferably at a temperature of 70° C. to 180° C., and more preferably at a temperature of 80° C. to 150° C., generally for 0.1 to 24 hours and preferably for 1 to 10 hours.

The polymerization initiator is not particularly limited as long as it is generally used in the field of the related art. Examples thereof include 2,2'-azobis(isobutyronitrile), 2,2'-azobis(2,4-dimethylvaleronitrile), 2,2'-azobis(2-methylpropionate), 2,2'-azobis(2-methylbutyronitrile), benzoyl peroxide, lauroyl peroxide, and the like. Among these, the 2,2'-azobis(isobutyronitrile) is preferable. One kind of each of these compounds may be used singly, or two or more kinds of these compounds may be used in combination. The amount of the polymerization initiator used is generally 0.01% to 30% by mass with respect to the total amount of the reactants.

The solvent is not particularly limited as long as it is generally used in the field of the related art. Examples thereof include toluene, 1,4-dioxane, tetrahydrofuran, isopropanol, methyl ethyl ketone, propylene glycol monomethyl ether acetate, and the like. Among these, the propylene glycol monomethyl ether acetate is preferable. One kind of each of these solvents may be used singly, or two or more kinds of these solvents may be used in combination. The amount of the solvent used is, based on volume, 100% to 1,000% of the total volume of the reactants.

If necessary, general post-treatment operation and purification operation that are commonly carried out in the field of the related art may be performed on a product obtained after the polymerization reaction. Specifically, for example, filtration, rinsing, extraction, concentration under reduced pressure, recrystallization, distillation, column chromatography, and the like may be performed.

The polymer other than the polyacrylic acid in (A2) may be manufactured by appropriately setting a monomer according to the desired polymer and performing the same reaction as the polymerization reaction of the polyacrylic acid.

For example, by adding one or two kinds of compounds represented by the general formula (I) or (II) in addition to the acrylic acid in the polymerization reaction, the copolymer according to the present invention can be manufactured. At this time, the reaction conditions (the type and used amount of the polymerization initiator, the type and used amount of the solvent, the reaction temperature, the reaction time, and the like) may be set to be the same as those of the polymerization reaction.

The amount of the compound represented by the general formula (I) or the general formula (II) used in the polymerization reaction of the copolymer according to the present invention may be appropriately set such that the mass ratio of the monomer unit derived from acrylic acid to the monomer unit derived from the compound represented by the general formula (I) or the general formula (II) in the copolymer according to the present invention is achieved.

In a case where (A) one or more kinds of polymers containing polyacrylic acid are neutralized, (A) may be neutralized based on a known method. For example, (A) may be neutralized by a method of adding an alkali metal such as sodium hydroxide to a carboxy group-containing polymer among (A) one or more kinds of polymers containing polyacrylic acid, in an amount of 0.5 to 1 mol with respect to 1 mol of the carboxy group in the polymer. The polymer to be neutralized may be a crosslinked polymer or may be crosslinked after being neutralized. Examples of solvents used at the time of neutralization are the same as the examples of solvents used in the polymerization reaction.

In a case where (A) one or more kinds of polymers containing polyacrylic acid are crosslinked, (A) may be crosslinked based on a known method by using the crosslinking agent according to the present invention.

For example, by adding a crosslinking agent selected from the compounds described in the general formulae [1] to [11] in the polymerization reaction, the polymerization reaction and the crosslinking reaction may be simultaneously performed. Alternatively, the polymer obtained after the polymerization reaction and the compound described in the general formula [12] or [13] or the polymer described in the general formula [14] may be subjected to the crosslinking reaction under the same reaction conditions (the type and used amount of the solvent, the reaction temperature, the reaction time, and the like) as those in the polymerization reaction.

The amount of the compounds used that are described in the general formulae [1] to [11] is generally 0.001 to 10 mol %, preferably 0.005 to 1 mol %, and even more preferably 0.01 to 0.5 mol % with respect to 1 mol of the monomer to be used.

The amount of the compound used that is described in the general formula [12] or [13] or the amount of the polymer used that is described in the general formula [14] is generally 0.01% to 40% by mass, preferably 0.05% to 20% by mass, and more preferably 0.1% to 10% by mass with respect to the mass of the polymer to be crosslinked.

Specifically, the crosslinked polyacrylic acid is prepared as below.

That is, acrylic acid and a crosslinking agent, which is used in an amount of 0.01 to 0.5 mol % with respect to 1 mol of the acrylic acid and is selected from the compounds described in the general formulae [1] to [11], are dissolved or dispersed in a solvent such as propylene glycol monomethyl ether acetate, which is used in an amount of, based on volume, 100% to 1,000% of the total volume, in the presence of a polymerization initiator such as 2,2'-azobis(isobutyronitrile). Then, a polymerization reaction and a crosslinking reaction are performed for 0.1 to 10 hours at a temperature of 80° C. to 150° C., thereby preparing a crosslinked polyacrylic acid. If necessary, an alkali metal such as sodium hydroxide may be added in an amount of 0.5 to 1 mol with respect to 1 mol of carboxy groups in the obtained crosslinked polyacrylic acid so as to obtain a crosslinked polyacrylic acid salt.

Alternatively, polyacrylic acid having a weight-average molecular weight of 10,000 to 5,000,000 and the compound described in the general formula [12] or [13] or the polymer described in the general formula [14] that is used in an amount of 0.1% to 10% by mass with respect to the mass of the polyacrylic acid are dissolved or dispersed in a solvent such as propylene glycol monomethyl ether acetate which is used in an amount of, based on volume, 100% to 1,000% with respect to the total volume. Then, a crosslinking reaction is performed for 0.1 to 10 hours at a temperature of 80° C. to 150° C., thereby preparing a crosslinked polyacrylic acid. If necessary, an alkali metal such as sodium hydroxide may be added in an amount of 0.5 to 1 mol with respect to 1 mol of carboxy groups in the obtained crosslinked polyacrylic acid so as to obtain a crosslinked polyacrylic acid salt.

Specifically, the crosslinked copolymer according to the present invention is prepared as below.

That is, acrylic acid, one or two kinds of compounds represented by the general formula (I) or (II) that are used in an amount of 70 to 30 parts by mass with respect to 30 to 70 parts by mass of the acrylic acid, and a crosslinking agent selected from the compounds described in the general formulae [1] to [11] that is used in an amount of 0.01 to 0.5 mol % with respect to 1 mol of the monomer to be used are dissolved or dispersed in a solvent such as propylene glycol monomethyl ether acetate, which is used in an amount of, based on volume, 100% to 1,000% of the total volume, in the presence of a polymerization initiator such as 2,2'-azobis (isobutyronitrile). Then, a polymerization reaction and a crosslinking reaction are performed for 0.1 to 10 hours at a temperature of 80° C. to 150° C., thereby preparing the crosslinked copolymer according to the present invention. If necessary, an alkali metal such as sodium hydroxide may be added in an amount of 0.5 to 1 mol with respect to 1 mol of carboxy groups in the obtained crosslinked copolymer according to the present invention so as to obtain a salt of the crosslinked copolymer according to the present invention.

Alternatively, acrylic acid and one or two kinds of compounds represented by the general formula (I) or the general formula (II) that are used in an amount of 70 to 30 parts by mass with respect to 30 to 70 parts by mass of the acrylic acid are dissolved or dispersed in a solvent such as propylene glycol monomethyl ether acetate, which is used in an amount of, based on volume, 100% to 1,000% of the total volume, in the presence of a polymerization initiator such as 2,2'-azobis(isobutyronitrile). Then, a polymerization reaction is performed for 0.1 to 10 hours at a temperature of 80° C. to 150° C., thereby preparing the copolymer according to the present invention. Thereafter, the obtained copolymer according to the present invention and the compound described in the general formula [12] or [13] or the polymer described in the general formula [14] that is used in an amount of 0.1% to 10% by mass with respect to the mass of the copolymer are dissolved or dispersed in a solvent such as propylene glycol monomethyl ether acetate, which is used in an amount of, based on volume, 100% to 1,000% of the total volume. Subsequently, a crosslinking reaction is performed for 0.1 to 10 hours at a temperature of 80° C. to 150° C., thereby preparing the crosslinked copolymer according to the present invention. If necessary, an alkali metal such as sodium hydroxide may be added in an amount of 0.5 to 1 mol with respect to 1 mol of carboxy groups in the obtained crosslinked copolymer according to the present invention so as to obtain a salt of the crosslinked copolymer according to the present invention.

(B) Bivalent to Decavalent Alcohol (B) bivalent to decavalent alcohol in the binder agent composition of the present invention (hereinafter, the bivalent to decavalent alcohol will be simply described as an alcohol according to the present invention in some cases) may be a conventionally known alcohol that is generally used in the field of the related art. As the bivalent to decavalent alcohol, a bivalent to hexavalent alcohol is preferable, and a bivalent to tetravalent alcohol is more preferable.

Specific examples of the alcohol according to the present invention include a compound represented by the following general formula (B1).

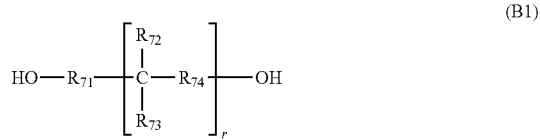

(B1)

(In the formula, $R_{71}$ represents an alkylene group having 1 to 6 carbon atoms, $R_{72}$ represents a hydroxy group or a hydroxyalkyl group having 1 to 6 carbon atoms, $R_{73}$ represents a hydrogen atom, an alkyl group having 1 to 6 carbon atoms, or a hydroxyalkyl group having 1 to 6 carbon atoms, $R_{74}$ represents an alkylene group having 1 to 6 carbon atoms that may have —O— in a chain, and r represents an integer of 0 to 4. Here, a plurality of $R_{72}$'s, a plurality of $R_{73}$'s, and a plurality of $R_{74}$'s may be the same as or different from each other respectively.)

In a case where r is 0, the alkylene group having 1 to 6 carbon atoms represented by $R_{71}$ in the general formula (B1) preferably has 3 to 6 carbon atoms. In a case where r is an integer of 1 to 4, the alkylene group preferably has 1 to 4 carbon atoms. The alkylene group may be any of a linear, branched, or cyclic alkylene group. Among these, the linear and branched alkylene groups are preferable, and the linear alkylene group is more preferable. Specifically, examples thereof include a methylene group, an ethylene group, a methyl methylene group, a trimethylene group, a propylene group, a dimethyl methylene group, an ethyl methylene group, a tetramethylene group, a 1-methyl trimethylene group, a 2-methyl trimethylene group, a 1,2-dimethyl ethylene group, a 1,1-dimethyl ethylene group, an ethyl ethylene group, an ethyl methyl methylene group, a propyl methylene group, a pentamethylene group, a hexamethylene group, a cyclopropylene group, a cyclopentylene group, a cyclohexylene group, and the like. Among these, the methylene group, the ethylene group, the trimethylene group, the tetramethylene group, the pentamethylene group, and the hexamethylene group are preferable. In a case where r is 0, the trimethylene group, the tetramethylene group, the pentamethylene group, and the hexamethylene group are preferable. In a case where r is an integer of 1 to 4, the methylene group, the ethylene group, the trimethylene group, and the tetramethylene group are more preferable.

Examples of the hydroxyalkyl group having 1 to 6 carbon atoms represented by $R_{72}$ and $R_{73}$ in the general formula (B1) are the same as the examples of the hydroxyalkyl group having 1 to 6 carbon atoms represented by $R_{13}$ in the general formula (II). Among these, a hydroxymethyl group, a hydroxyethyl group, a hydroxypropyl group, and a hydroxybutyl group are preferable, and the hydroxymethyl group and the hydroxyethyl group are more preferable.

Examples of the alkyl group having 1 to 6 carbon atoms represented by $R_{73}$ in the general formula (B1) are the same as the examples of the alkyl group having 1 to 6 carbon atoms represented by $R_4$ in the general formula (IV). Among these, a methyl group, an ethyl group, a n-propyl group, and a n-butyl group are preferable, and the methyl group and the ethyl group are more preferable.

Examples of the alkylene group having 1 to 6 carbon atoms that does not have —O— in a chain and is represented by $R_{74}$ in the general formula (B1) are the same as the examples of the alkylene group having 1 to 6 carbon atoms represented by $R_{71}$ in the general formula (B1). Among these, a methylene group, an ethylene group, a trimethylene group, a tetramethylene group, a pentamethylene group, and a hexamethylene group are preferable, the methylene group, the ethylene group, the trimethylene group, and the tetramethylene group are more preferable, and the methylene group and the ethylene group are particularly preferable.

Examples of the alkylene group having 1 to 6 carbon atoms that has —O— in a chain and is represented by $R_{74}$ in the general formula (B1) include a group represented by the following general formula (B1-1) and the like.

(B1-1)

(In the formula, $R_{75}$ and $R_{76}$ each independently represent a linear or branched alkylene group having 1 to 5 carbon atoms, and t represents an integer of 1 to 5. Here, the total number of carbon atoms in the formula is 2 to 6, and t pieces of $R_{75}$ may be the same as or different from each other.)

It is preferable that the alkylene group having 1 to 5 carbon atoms represented by $R_{75}$ and $R_{76}$ in the general formula (B1-1) has 1 to 3 carbon atoms. The alkylene group may be any of a linear, branched, or cyclic alkylene group, and is more preferably a linear alkylene group. Specifically, examples thereof include a methylene group, an ethylene group, a methyl methylene group, a trimethylene group, a propylene group, a dimethyl methylene group, an ethyl methylene group, a tetramethylene group, a 1-methyl trimethylene group, a 2-methyl trimethylene group, a 1,2-dimethyl ethylene group, a 1,1-dimethyl ethylene group, an ethyl ethylene group, an ethyl methyl methylene group, a propyl methylene group, a pentamethylene group, and the like. Among these, the methylene group, the ethylene group, the trimethylene group, the tetramethylene group, and the pentamethylene group are preferable, and the methylene group and the ethylene group are more preferable.

As t in the general formula (B1-1), 1 or 2 is preferable, and 1 is more preferable.

Preferred specific examples of the group represented by the general formula (B1-1) include a group represented by the following general formula (B1-2).

(In the formula, $R_{75}'$ and $R_{76}'$ each independently represent a linear alkylene group having 1 to 5 carbon atoms. Here, the total number of carbon atoms in the formula is 2 to 6.)

Specifically, examples of the linear alkylene group having 1 to 5 carbon atoms represented by $R_{75}'$ and $R_{76}'$ in the general formula (B1-2) include a methylene group, an ethylene group, a trimethylene group, a tetramethylene group, and a pentamethylene group. Among these, the methylene group and the ethylene group are preferable.

Specifically, examples of the group represented by the general formula (B1-2) include —$CH_2$—O—$CH_2$—, —$CH_2$—O—$CH_2CH_2$—, —$CH_2$—O—$CH_2CH_2CH_2$—, —$CH_2$—O—$CH_2CH_2CH_2CH_2$—, —$CH_2$—O—$CH_2CH_2CH_2CH_2CH_2$—, —$CH_2CH_2$—O—$CH_2$—, —$CH_2CH_2$—O—$CH_2CH_2$—, —$CH_2CH_2$—O—$CH_2CH_2CH_2$—, —$CH_2CH_2$—O—$CH_2CH_2CH_2CH_2$—, —$CH_2CH_2CH_2$—O—$CH_2$—, —$CH_2CH_2CH_2$—O—$CH_2CH_2$—, —$CH_2CH_2CH_2$—O—$CH_2CH_2CH_2$—, —$CH_2CH_2CH_2CH_2$—O—$CH_2$—, —$CH_2CH_2CH_2CH_2$—O—$CH_2CH_2$—, —$CH_2CH_2CH_2CH_2CH_2$—O—$CH_2$—, and the like. Among these, —$CH_2$—O—$CH_2$—, —$CH_2$—O—$CH_2CH_2$—, —$CH_2CH_2$—O—$CH_2$—, and —$CH_2CH_2$—O—$CH_2CH_2$— are preferable, —$CH_2$—O—$CH_2$— and —$CH_2CH_2$—O—$CH_2CH_2$— are more preferable, and —$CH_2$—O—$CH_2$— is particularly preferable.

As $R_{72}$ in the general formula (B1), a hydroxy group and a linear hydroxyalkyl group having 1 to 6 carbon atoms are preferable, the hydroxy group and a linear hydroxyalkyl group having 1 to 6 carbon atoms in which one hydrogen atom in a terminal portion is substituted with a hydroxy group are more preferable, and the linear hydroxyalkyl group having 1 to 6 carbon atoms in which one hydrogen atom in a terminal portion is substituted with a hydroxy group is particularly preferable. Specifically, a hydroxy group, a hydroxymethyl group, a hydroxyethyl group, a hydroxypropyl group, and a hydroxybutyl group are preferable, the hydroxy group, the hydroxymethyl group, and the hydroxyethyl group are more preferable, and the hydroxymethyl group and the hydroxyethyl group are particularly preferable.

As $R_{73}$ in the general formula (B1), a hydrogen atom, a linear alkyl group having 1 to 6 carbon atoms, and a linear hydroxyalkyl group having 1 to 6 carbon atoms are preferable, the hydrogen atom, the linear alkyl group having 1 to 6 carbon atoms, and a linear hydroxyalkyl group having 1 to 6 carbon atoms in which one hydrogen atom in a terminal portion is substituted with a hydroxy group are more preferable, and the linear hydroxyalkyl group having 1 to 6 carbon atoms in which one hydrogen atom in a terminal portion is substituted with a hydroxy group is particularly preferable. Specifically, a hydrogen atom, a methyl group, an ethyl group, a n-propyl group, a n-butyl group, a hydroxymethyl group, a hydroxyethyl group, a hydroxypropyl group, and a hydroxybutyl group are preferable, the hydrogen atom, the methyl group, the ethyl group, the hydroxymethyl group, and the hydroxyethyl group are more preferable, and the hydroxymethyl group and the hydroxyethyl group are particularly preferable.

As $R_{74}$ in the general formula (B1), a linear or branched alkylene group having 1 to 6 carbon atoms and the group represented by the general formula (B1-1) are preferable, the linear alkylene group having 1 to 6 carbon atoms and the group represented by the general formula (B1-2) are more preferable, and the linear alkylene group having 1 to 6 carbon atoms is particularly preferable. Specifically, a methylene group, an ethylene group, a trimethylene group, a tetramethylene group, a pentamethylene group, a hexamethylene group, —$CH_2$—O—$CH_2$—, —$CH_2$—O—$CH_2CH_2$—, —$CH_2CH_2$—O—$CH_2$—, and —$CH_2CH_2$—O—$CH_2CH_2$— are preferable, the methylene group, the ethylene group the trimethylene group, the tetramethylene group, —$CH_2$—O—$CH_2$—, and —$CH_2CH_2$—O—$CH_2CH_2$— are more preferable, the methylene group, the ethylene group, and —$CH_2$—O—$CH_2$— are even more preferable, and the methylene group and the ethylene group are particularly preferable.

As r in the general formula (B1), an integer of 0 to 2 is preferable, and 0 or 1 is more preferable.

Preferred specific examples of the compound represented by the general formula (B1) include a compound represented by the following general formula (B2).

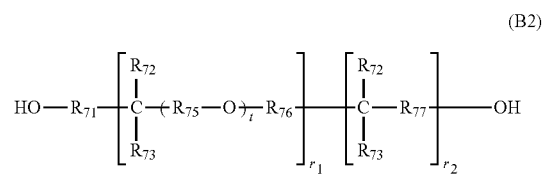

(In the formula, $R_{71}$ to $R_{73}$, $R_{75}$, $R_{76}$, and t are the same as $R_{71}$ to $R_{73}$, $R_{75}$, $R_{76}$, and t described above, $R_{77}$ represents a linear or branched alkylene group having 1 to 6 carbon atoms, $r_2$ represents 0 or 1, in a case where $r_2$ is 0, $r_1$ represents 0, and in a case where $r_2$ is 1, $r_1$ represents an integer of 0 to 3. Here, a plurality of $R_{72}$'s, $R_{73}$'s, $R_{75}$'s, $R_{76}$'s, and t's may be the same as or different from each other respectively.)

Examples of the linear or branched alkylene group having 1 to 6 carbon atoms represented by $R_{77}$ in the general formula (B2) include linear or branched alkylene groups among the specific examples of the alkylene group having 1 to 6 carbon atoms represented by $R_{71}$ in the general formula (B1). Among these, a methylene group, an ethylene group, a trimethylene group, a tetramethylene group, a pentamethylene group, and a hexamethylene group are preferable, the methylene group, the ethylene group, the trimethylene group, and the tetramethylene group are more preferable, and the methylene group and the ethylene group are particularly preferable.

As $r_2$ in the general formula (B2), 0 or 1 is preferable.

Preferred specific examples of the compound represented by the general formula (B2) include compounds represented by the following general formulae (B3) to (B5).

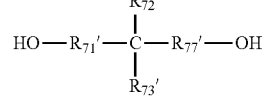

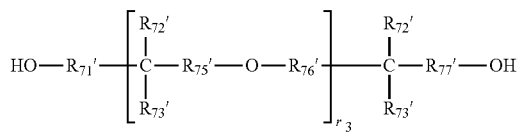

(In the formulae, $R_{75}'$ and $R_{76}'$ are the same as $R_{75}'$ and $R_{76}'$ described above, $R_{71}'$ and $R_{77}'$ each represent a linear alkylene group having 1 to 6 carbon atoms, $R_{72}$'s represents a hydroxy group or a linear hydroxyalkyl group having 1 to 6 carbon atoms in which one hydrogen atom in a terminal portion is substituted with a hydroxy group, $R_{73}'$ represents a hydrogen atom, a linear alkyl group having 1 to 6 carbon atoms, or a linear hydroxyalkyl group having 1 to 6 carbon atoms in which one hydrogen atom in a terminal portion is substituted with a hydroxy group, and $r_3$ represents an integer of 1 to 3. Here, the total number of carbon atoms in $R_{75}'$ and $R_{76}'$ is 2 to 6, and a plurality of $R_{72}''$s, $R_{73}''$s, $R_{75}''$s, and $R_{76}''$s may be the same as or different from each other respectively.)

Specifically, examples of the linear alkylene group having 1 to 6 carbon atoms represented by $R_{71}'$ in the general formulae (B3) to (B5) include a methylene group, an ethylene group, a trimethylene group, a tetramethylene group, a pentamethylene group, and a hexamethylene group. In the general formula (B3), a trimethylene group, a tetramethylene group, a pentamethylene group, and a hexamethylene group are preferable. In the general formula (B4), a methylene group, an ethylene group, a trimethylene group, and a tetramethylene group are preferable. In the general formula (B5), a methylene group and an ethylene group are preferable.

Specifically, examples of the linear alkylene group having 1 to 6 carbon atoms represented by $R_{77}'$ in the general formulae (B4) and (B5) include a methylene group, an ethylene group, a trimethylene group, a tetramethylene group, a pentamethylene group, and a hexamethylene group. Among these, the methylene group, the ethylene group, the trimethylene group, and the tetramethylene group are preferable, and the methylene group and the ethylene group are more preferable.

Specifically, examples of the linear hydroxyalkyl group having 1 to 6 carbon atoms in which one hydrogen atom in a terminal portion is substituted with a hydroxy group represented by $R_{72}'$ and $R_{73}'$ in the general formulae (B4) and (B5) include a hydroxymethyl group, a hydroxyethyl group, a hydroxypropyl group, a hydroxybutyl group, a hydroxypentyl group, and a hydroxyhexyl group. Among these, the hydroxymethyl group, the hydroxyethyl group, the hydroxypropyl group, and the hydroxybutyl group are preferable, and the hydroxymethyl group and the hydroxyethyl group are more preferable.

Specifically, examples of the linear alkyl group having 1 to 6 carbon atoms represented by $R_{73}'$ in the general formulae (B4) and (B5) include a methyl group, an ethyl group, a n-propyl group, a n-butyl group, a n-pentyl group, and a n-hexyl group. Among these, the methyl group, the ethyl group, the n-propyl group, and the n-butyl group are preferable, and the methyl group and the ethyl group are more preferable.

As $R_{72}'$ in the general formula (B4), a hydroxy group, a hydroxymethyl group, a hydroxyethyl group, a hydroxypropyl group, and a hydroxybutyl group are preferable, the hydroxy group, the hydroxymethyl group, and the hydroxyethyl group are more preferable, and the hydroxymethyl group and the hydroxyethyl group are particularly preferable.

As $R_{73}'$ in the general formula (B4), a hydrogen atom, a methyl group, an ethyl group, a n-propyl group, a n-butyl group, a hydroxymethyl group, a hydroxyethyl group, a hydroxypropyl group, and a hydroxybutyl group are preferable, the hydrogen atom, the methyl group, the ethyl group, the hydroxymethyl group, and the hydroxyethyl group are more preferable, and the hydroxymethyl group and the hydroxyethyl group are particularly preferable.

As $R_{72}'$ and $R_{73}'$ in the general formula (B5), a linear hydroxyalkyl group having 1 to 6 carbon atoms in which one hydrogen atom in a terminal portion is substituted with a hydroxy group is preferable. Specifically, a hydroxymethyl group and a hydroxyethyl group are preferable.

As $r_3$ in the general formula (B5), 1 is preferable.

Preferred specific examples of the compound represented by the general formula (B3) include 1,3-propanediol, 1,4-butanediol, 1,5-pentanediol, and 1,6-hexanediol.

Preferred specific examples of the compound represented by the general formula (B4) include compounds represented by the following formulae.

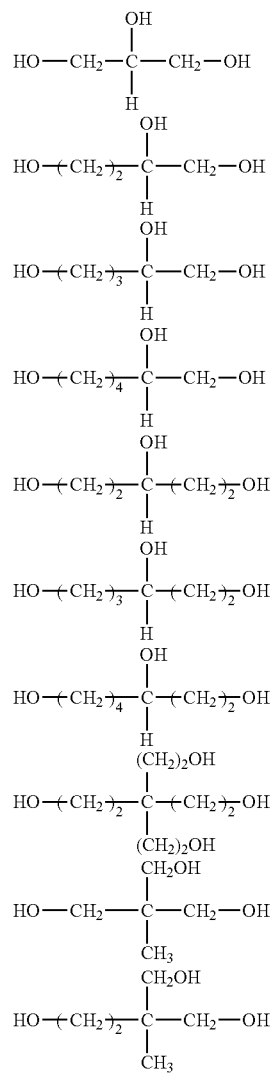

-continued

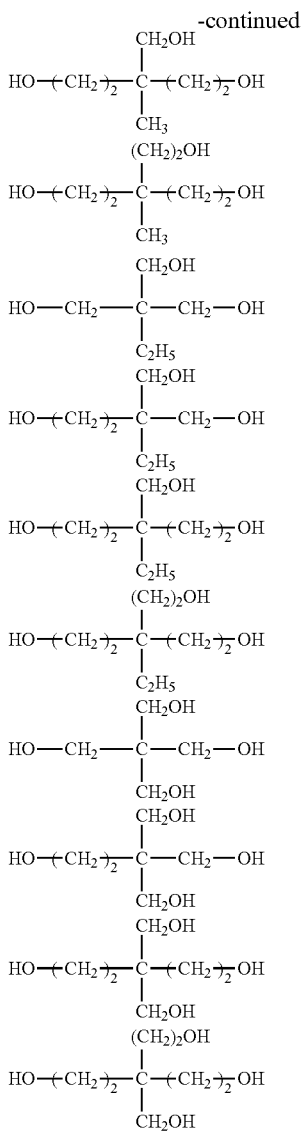

Among the following specific examples, 1,2,4-butanetriol, 1,2,5-pentanetriol, 1,2,6-hexanetriol, trimethylolethane, trimethylolpropane, and pentaerythritol are preferable, the 1,2,6-hexanetriol, the trimethylolpropane, and the pentaerythritol are more preferable, and the pentaerythritol is particularly preferable.

Preferred specific examples of the compound represented by the general formula (B5) include dipentaerythritol, tripentaerythritol, and tetrapentaerythritol. Among these, the dipentaerythritol is preferable.

As the alcohol according to the present invention, among the specific examples preferred as the compounds represented by the general formulae (B3) to (B5), 1,3-propanediol, 1,4-butanediol, 1,5-pentanediol, 1,6-hexanediol, 1,2,6-hexanetriol, trimethylolpropane, pentaerythritol, and dipentaerythritol are preferable, the 1,3-propanediol, the 1,4-butanediol, the 1,6-hexanediol, the 1,2,6-hexanetriol, and the pentaerythritol are more preferable, and the pentaerythritol is particularly preferable. The alcohol according to the present invention may be a commercial alcohol or an alcohol appropriately synthesized by a known method.

Binder Agent Composition of the Present Invention

The binder agent composition of the present invention contains (A) one or more kinds of polymers containing polyacrylic acid, (B) the bivalent to decavalent alcohol, and (C) water. It should be noted that one kind of (B) the bivalent to decavalent alcohol may be used singly, or two or more kinds of (B) may be used in combination. It is preferable to use one kind of (B) singly.

In the binder agent composition of the present invention, the content of (A) one or more kinds of polymers containing polyacrylic acid with respect to the total mass of (A) and (B) in the binder agent composition of the present invention is 70% to 99% by mass, preferably 75% to 99% by mass, and more preferably 80% to 99% by mass. It should be noted that in a case where (A) is two or more kinds of polymers, the total mass thereof equal the content.

In the binder agent composition of the present invention, the content of (B) the bivalent to decavalent alcohol with respect to the total mass of (A) and (B) in the binder agent composition of the present invention is 1% to 30% by mass, preferably 1% to 25% by mass, and more preferably 1% to 20% by mass. It should be noted that in a case where two or more kinds of (B) are used in combination, the total mass thereof equal the content.

In the binder agent composition of the present invention, the content of (C) water is set such that the total mass of (A) and (B) in the binder agent composition of the present invention becomes 1% to 50% by mass of the total mass of the composition, and preferably becomes 1% to 20% by mass of the total mass of the composition. At this time, the concentration of (A) one or more kinds of polymers containing polyacrylic acid in the binder agent composition of the present invention may be appropriately set according to the concentration used for preparing an electrode. The concentration of (A) is generally 1% to 30%, and preferably 1% to 20%.

The binder agent composition of the present invention can be manufactured by mixing together (A) one or more kinds of polymers containing polyacrylic acid, (B) the bivalent to decavalent alcohol, and (C) water such that the content of each of (A), (B), and (C) becomes as described above. At this time, the polymerization reaction, the neutralization treatment, and the crosslinking reaction in the method for manufacturing (A) one or more kinds of polymers containing polyacrylic acid need to be performed before the manufacturing of the binder agent composition of the present invention. That is, the polymerization reaction and either or both of the neutralization treatment and the crosslinking reaction, which are carried out if necessary, is performed so as to manufacture (A) one or more kinds of desired polymers containing polyacrylic acid, and then the polymers need to be mixed with (B) the bivalent to decavalent alcohol and (C) water to manufacture the binder agent composition of the present invention. The reason is as below. For example, in the method for manufacturing (A) one or more kinds of polymers containing polyacrylic acid, in a case where the polymerization reaction is performed by adding (B) the bivalent to decavalent alcohol, unfortunately, the obtained polymers are not dissolved in various solvents including water, and accordingly, the polymers cannot be used for preparing an electrode.

It is considered that at the time of preparing an electrode, (A) one or more kinds of polymers containing polyacrylic acid in the binder agent composition of the present invention may be bonded to each other through (B) the bivalent to decavalent alcohol (due to the action of the alcohol as a linking agent), and the polymers may be evenly disposed on the electrode and cover the surface of the active material.

Particularly, it is considered that in a case where (A) one or more kinds of polymers containing polyacrylic acid are (A2) polymer group including polyacrylic acid and one or more kinds of polymers other than the polyacrylic acid, (B) the bivalent to decavalent alcohol may bind different polymers (for example, the polyacrylic acid and the copolymer according to the present invention), and consequently, the occurrence of phase separation at the time of preparing an electrode can be prevented. Therefore, in a case where an electrode is prepared using the binder agent composition of the present invention, it is possible to obtain an electrode having excellent cycle characteristics in which substantially the entire surface of the active material can be utilized for charge and discharge.

Silicon-Containing Active Material

The silicon-containing active material in the slurry composition of the present invention may contain at least silicon. The active material may be constituted only with silicon or with silicon and an active material other than the silicon.

Examples of the silicon include a silicon oxide such as SiO or $SiO_2$, a metal-bonded silicon (SiM: M represents a metal such as magnesium, iron, calcium, cobalt, nickel, boron, copper, manganese, silver, vanadium, cerium, or zinc), and the like, besides silicon. Among these, silicon and the silicon oxide are preferable, and silicon is more preferable.

The surface of the silicon may be partially or fully coated with carbon. Specifically, examples of such a material include silicon whose surface is coated with carbon, a silicon oxide whose surface is coated with carbon, a metal-bonded silicon whose surface is coated with carbon, and the like.

Examples of the active material other than silicon include carbon, germanium, tin, lead, zinc, aluminum, indium, antimony, bismuth, and the like. Among these, the carbon is preferable.

Examples of the carbon include a graphite-based carbon material (graphite) such as natural graphite, artificial graphite, or expanded graphite, carbon black, activated carbon, carbon fiber, cokes, soft carbon, hard carbon, and the like. Among these, the graphite such as the natural graphite, the artificial graphite, or the expanded graphite is preferable. Examples of the natural graphite include flake graphite, lump graphite, and the like. Examples of the artificial graphite include lump graphite, vapor-grown graphite, flake graphite, fibrous graphite, and the like.

Examples of the silicon-containing active material in the slurry composition of the present invention include silicon; a silicon oxide; a metal-bonded silicon; a material obtained by mixing together two or more kinds of materials selected from the above materials; and an active material containing a material obtained by mixing at least one kind of material among the above with one or more kinds of materials selected from carbon, germanium, tin, lead, zinc, aluminum, indium, antimony, and bismuth. Among these, silicon; the silicon oxide; the metal-bonded silicon; the material obtained by mixing together two or more kinds of materials selected from the above materials; or an active material containing a material obtained by mixing at least one kind of material among the above with carbon and/or tin is preferable, silicon; the silicon oxide; the metal-bonded silicon; or an active material containing a material obtained by mixing together at least two or more kinds of materials among carbon, silicon, a silicon oxide, and a metal-bonded silicon is more preferable, silicon; the silicon oxide; or an active material containing a material obtained by mixing together at least two or more kinds of materials among carbon, silicon, or a silicon oxide is even more preferable, and an active material containing silicon and/or a silicon oxide is particularly preferable.

The average particle size of the silicon-containing active material in the slurry composition of the present invention varies with the type of the active material. The average particle size of the silicon-containing active material is generally 1 nm to 100 μm, preferably 1 nm to 50 μm, and more preferably 1 nm to 20 μm.

In the slurry composition of the present invention, the content of silicon in the silicon-containing active material is generally 10% to 100% by mass, preferably 40% to 100% by mass, and more preferably 50% to 100% by mass.

Conductive Assistant

Examples of the conductive assistant in the slurry composition of the present invention include carbon black such as acetylene black, Ketjen black, furnace black, or thermal black. Among these, the acetylene black and the Ketjen black are preferable, and the acetylene black is more preferable.

Slurry Composition of the Present Invention

The slurry composition of the present invention is a composition for preparing an electrode that contains 1) the silicon-containing active material, 2) the conductive assistant, and 3) the binder agent composition of the present invention. The slurry composition of the present invention may be used for preparing a positive electrode or a negative electrode, but is preferably used for preparing a negative electrode.

In the slurry composition of the present invention, the content of the silicon-containing active material with respect to the mass of the slurry composition which does not contain a solvent is 1% to 98% by mass, and preferably 10% to 98% by mass.

In the slurry composition of the present invention, the content of the conductive assistant with respect to the mass of the slurry composition which does not contain a solvent is 1% to 40% by mass, preferably 1% to 30% by mass, and even more preferably 1% to 20% by mass.

In the slurry composition of the present invention, the content of the binder agent composition of the present invention with respect to the mass of the slurry composition which does not contain a solvent is 1% to 30% by mass, more preferably 1% to 25% by mass, and even more preferably 1% to 20% by mass. In a case where the binder agent composition of the present invention is incorporated into the slurry composition within the above range, the active material and the conductive assistant can be evenly dispersed on a current collector at the time of preparing an electrode, and the electrode structure can be maintained even though silicon expands.

The slurry composition of the present invention may contain, for example, a supporting salt, an ion-conductive polymer, a binder polymer, and the like (except for those included in (A) one or more kinds of polymers containing polyacrylic acid in the binder agent composition of the present invention), in addition to 1) the silicon-containing active material, 2) the conductive assistant, and 3) the binder agent composition of the present invention. Examples of the supporting salt include $Li(C_2F_5SO_2)_2N$ (LiBETI), $LiPF_6$, $LiBF_4$, $LiClO_4$, $LiAsF_6$, $LiCF_3SO_3$, and the like. Examples of the ion-conductive polymer include a polyethylene oxide (PEO)-based polymer, a polypropylene oxide (PPO)-based polymer, and the like. Examples of the binder polymer include polyvinylidene fluoride (PVDF), polytetrafluoroethylene (PTFE), carboxymethyl cellulose (CMC), a styrene-butadiene copolymer (SBR), an acrylonitrile-butadiene copolymer (NBR), polyacrylonitrile (PAN), an ethylene-vinyl alcohol copolymer (EVOH), polyurethane, polyacrylate, polyvinyl ether, polyimide, and the like. The content of the supporting salt, the ion-conductive polymer, and the binder polymer may be set based on the amount generally used in the field of the related art.

The slurry composition of the present invention is obtained by mixing together 1) the silicon-containing active material, 2) the conductive assistant, and 3) the binder agent composition of the present invention in an appropriate solvent such that the concentration range of each of these becomes described above. Examples of the solvent include water, N-methyl-2-pyrrolidone (NMP), dimethylformamide, dimethylacetamide, methylformamide, dimethyl sulfoxide, acetonitrile, tetrahydrofuran, γ-butyrolactone, toluene, methyl ethyl ketone, ethyl acetate, dioxane, and the like. Among these, water is preferable.

Current Collector

The current collector according to the present invention is constituted with a foil, a mesh, an expanded grid (expanded metal), a punched metal, and the like, in which a conductive material such as nickel, copper, or stainless steel (SUS) is used. The opening size and the wire diameter of the mesh, the number of meshes, and the like are not particularly limited, and conventionally known meshes can be used. The thickness of the current collector is preferably 5 to 30 μm. Here, a current collector having a thickness out of the range may also be used.

The size of the current collector is determined according to the use of the battery. In order to prepare a large electrode used in a large battery, a current collector with a large area is used. In order to prepare a small electrode, a current collector with a small area is used.

Electrode of the Present Invention

The electrode of the present invention has 1) the silicon-containing active material, 2) the conductive assistant, 3) the binder agent derived from the binder agent composition of the present invention, and 4) the current collector. Specifically, the electrode of the present invention has the current collector and an active material layer which is formed on the surface of the current collector and contains the silicon-containing active material, the conductive assistant, and the binder agent derived from the binder agent composition of the present invention. The electrode of the present invention can be used as a negative electrode and a positive electrode. It is preferable that the electrode of the present invention is used as a negative electrode.

In the active material layer, due to the binder agent derived from the binder agent composition of the present invention, the silicon-containing active material and the conductive assistant are evenly dispersed on the current collector, and excellent coating properties are maintained. Therefore, the electrode of the present invention has excellent reversibility.

The thickness of the active material layer (thickness of the coating layer) is generally 1 to 500 μm, preferably 1 to 300 μm, and more preferably 1 to 150 μm.

The method for preparing the electrode of the present invention includes coating the current collector with the slurry composition of the present invention [a composition containing 1) the silicon-containing active material, 2) the conductive assistant, and 3) the binder agent composition of the present invention] and drying the slurry composition. Because of the drying of the slurry composition of the present invention in the preparation method, (A) one or more kinds of polymers containing polyacrylic acid in the binder agent composition of the present invention are bonded to each other through (B) the bivalent to decavalent alcohol, and the binder agent derived from the binder agent composition of the present invention is formed.

In the preparation method, the amount of the slurry composition of the present invention used may be appropriately set such that the thickness of the active material layer becomes the range described above after drying.

In the method for preparing the electrode of the present invention, the current collector can be coated with the slurry composition of the present invention by a method such as a self-propellable coater, an ink jet method, a doctor blade method, a spray method, or a combination of these. Among these, the doctor blade method or the ink jet method which can form a thin layer is preferable, and the doctor blade method is more preferable.

In the method for preparing the electrode of the present invention, the drying method may be performed based on a conventionally known method. Generally, the drying method is performed by a heating treatment. At the time of heating, the drying conditions (whether or not a vacuum is required, the drying time, and the drying temperature) may be appropriately set according to the amount of the slurry composition of the present invention used for coating or the volatilization rate or the slurry composition. Specifically, for example, the slurry composition may be dried in a vacuum generally at a temperature of 80° C. to 150° C. and preferably at a temperature of 120° C. to 150° C., generally for 5 to 20 hours and preferably for 6 to 12 hours.

In the method for preparing the electrode of the present invention, if necessary, a pressing treatment may be performed after drying. The pressing method may be performed based on a conventionally known method. Examples thereof include a calendar roll method, flat plate pressing, and the like. Among these, the calendar roll method is preferable.

The electrode of the present invention can be used in lithium batteries. The electrode of the present invention can be used in any of general batteries constituted with a positive electrode, an electrolyte, and a negative electrode.

As the electrolyte, electrolytes having additives such as vinylene carbonate, fluorovinylene carbonate, methyl vinylene carbonate, fluoromethyl vinylene carbonate, ethyl vinylene carbonate, propyl vinylene carbonate, butyl vinylene carbonate, dipropyl vinylene carbonate, 4,5-dimethylvinylene carbonate, 4,5-diethylvinylene carbonate, vinyl ethylene carbonate, divinyl ethylene carbonate, phenyl ethylene carbonate, diallyl carbonate, fluoroethylene carbonate (FEC), catechol carbonate, 1,3-propanesultone, and butane sultone are preferable. Among these, electrolytes having fluoroethylene carbonate (FEC) are more preferable. The content of the additives in the electrolyte is generally 0.5% to 15%, and preferably 0.5% to 5%.

Hereinafter, the present invention will be specifically described based on examples, but the present invention is not limited thereto.

EXAMPLES

Synthesis Example 1 Synthesis of Crosslinked Copolymer C-1

Propylene glycol monomethyl ether acetate (70 g, 530 mmol, manufactured by Wako Pure Chemical Industries, Ltd.) was put into a 200 mL round bottom flask comprising a stirring device, a cooling pipe, a thermometer, a nitrogen introduction pipe, and a dripping device, and the flask was heated under a nitrogen stream until the internal temperature thereof became 90° C. Then, a solution, which was obtained by mixing together 9.2 g of acrylic acid (128 mmol, manufactured by Wako Pure Chemical Industries, Ltd.), 9.2 g of 2-hydroxyethyl acrylate (HEA, 79 mmol, manufactured by Wako Pure Chemical Industries, Ltd.), 0.06 g of polyethylene glycol diacrylate (0.2 mmol, manufactured by SHIN-NAKAMURA CHEMICAL CO., LTD.), 0.04 g of 2,2'-azobis(isobutyronitrile) (0.2 mmol, manufactured by Wako Pure Chemical Industries, Ltd.), and 30 g of propylene glycol monomethyl ether acetate (227 mmol), was added dropwise to the round bottom flask for 2 hours. Thereafter, the obtained solution was reacted for 5 hours at 90° C. After the reaction, the solution was cooled to room temperature, thereby obtaining a crosslinked copolymer. From the copolymer obtained under pressure reduced to 25 mmHg (about 33.3 hPa), propylene glycol monomethyl ether acetate was removed, thereby obtaining solid substances. The solid substances were then dried in a vacuum, thereby obtaining solid contents in which a compositional ratio between monomers of acrylic acid:HEA=1:1. The solid contents were named crosslinked copolymer C-1.

Synthesis Example 2 Synthesis of Non-Crosslinked Copolymer C-2

A non-crosslinked copolymer C-2 was obtained by performing a polymerization reaction according to the same method as in Synthesis Example 1, except that polyethylene glycol diacrylate was not added.

Synthesis Example 3 Synthesis of Crosslinked Homopolymer A-1

A crosslinked homopolymer A-1 was obtained by performing a polymerization reaction according to the same method as in Synthesis Example 1, except that 2-hydroxyethyl acrylate was not added, and the amount of the acrylic acid used was changed to 18.4 g (255 mmol) from 9.2 g (128 mmol).

Synthesis Example 4 Synthesis of Crosslinked Homopolymer A-2

A crosslinked homopolymer A-2 was obtained by performing a polymerization reaction according to the same method as in Synthesis Example 1, except that 2-hydroxyethyl acrylate was not added, the amount of the acrylic acid used was changed to 18.4 g (255 mmol) from 9.2 g (128 mmol), and the amount of the 2,2'-azobis(isobutyronitrile) used was changed to 0.2 g (1 mmol) from 0.04 g (0.2 mmol).

Synthesis Example 5 Preparation of Crosslinked Copolymer Solution H-5

The crosslinked copolymer C-1 (4.6 g) and 30 mL of deionized water were added to a 100 mL glass beaker and dispersed by being stirred for 2 hours. A 50% sodium hydroxide solution (manufactured by Wako Pure Chemical Industries, Ltd.) was added to the obtained dispersion liquid so as to adjust the pH to be 6.8. Then, deionized water was added thereto so as to adjust the total amount thereof to be 50 g. In this way, 50 g of a crosslinked copolymer solution was obtained in which 10 wt % of the solid contents were neutralized (degree of neutralization: 80%). The solution was named crosslinked copolymer solution H-5.

Synthesis Example 6 Preparation of Non-Crosslinked Copolymer Solution H-6

A neutralized non-crosslinked copolymer solution was obtained (degree of neutralization: 80%) by the same method as in Synthesis Example 5, except that 4.6 g of the non-crosslinked copolymer C-2 was used instead of 4.6 g of the crosslinked copolymer C-1. The solution was named non-crosslinked copolymer solution H-6.

Synthesis Example 7 Preparation of Crosslinked Homopolymer Solution H-2

The crosslinked homopolymer A-1 (3.8 g) and 20 mL of deionized water were added to a 100 mL glass beaker and dispersed by being stirred for 2 hours. A 50% sodium hydroxide solution (manufactured by Wako Pure Chemical Industries, Ltd.) was added to the obtained dispersion liquid so as to adjust the pH to be 6.8. Then, deionized water was added thereto so as to adjust the total amount thereof to be 50 g. In this way, 50 g of a crosslinked homopolymer solution was obtained in which 10 wt % of the solid contents were neutralized (degree of neutralization: 80%). The solution was named crosslinked homopolymer solution H-2. The weight-average molecular weight (Mw) of the crosslinked homopolymer solution H-2 measured by gel permeation chromatography (GPC) was 1,100,000.

The measurement by GPC was performed under the following conditions.
  Measurement apparatus: pump LC-20AB (manufactured by Shimadzu Corporation)
    RI detector RID-10A (manufactured by Shimadzu Corporation)
  Column: OHpak SB-807 HQ×1 column
    +OHpak SB-806M HQ×2 columns
  Mobile phase: $Na_2HPO_4$ 50 mmol/l aqueous solution
  Standard substance for calibration curve: polyacrylic acid Synthesis Example 8 Preparation of Crosslinked Homopolymer Solution H-1

A neutralized crosslinked homopolymer solution (degree of neutralization: 80%) was obtained by the same method as in Synthesis Example 7, except that 3.8 g of the crosslinked homopolymer A-2 was used instead of 3.8 g of the crosslinked homopolymer A-1. The solution was named crosslinked homopolymer solution H-1. The weight-average molecular weight (Mw) of the crosslinked homopolymer solution H-1 measured by GPC was 300,000.

Synthesis Example 9 Preparation of Non-Crosslinked Homopolymer Solution H-3

Polyacrylic acid (3.8 g, manufactured by Wako Pure Chemical Industries, Ltd.) having a weight-average molecular weight of 250,000 and 20 mL of deionized water were added to a 100 mL glass beaker and dispersed by being stirred for 2 hours. A 50% sodium hydroxide solution (manufactured by Wako Pure Chemical Industries, Ltd.) was added to the obtained dispersion liquid so as to adjust the pH to be 6.8. Then, deionized water was added thereto so as to adjust the total amount thereof to be 50 g. In this way, 50 g of a non-crosslinked homopolymer solution was obtained in which 10 wt % of the solid contents were neutralized (degree of neutralization: 80%). The solution was named non-crosslinked homopolymer solution H-3.

Synthesis Example 10 Preparation of Non-Crosslinked Homopolymer Solution H-4

A neutralized non-crosslinked homopolymer solution (degree of neutralization: 80%) was obtained by the same method as in Synthesis Example 9, except that 3.8 g of polyacrylic acid having a weight-average molecular weight of 1,000,000 (manufactured by Wako Pure Chemical Industries, Ltd.) was used instead of 3.8 g of the polyacrylic acid having a weight-average molecular weight of 250,000. The solution was named non-crosslinked homopolymer solution H-4.

Experimental Example 1 Measurement of Viscosity of Each Polymer Solution

For each of the polymer solutions (the crosslinked homopolymer solutions H-1 and H-2, the non-crosslinked homopolymer solutions H-3 and H-4, the crosslinked copolymer solution H-5, and the non-crosslinked copolymer solution H-6) obtained in Synthesis Examples 5 to 10, the viscosity was measured using a B type rotational viscometer (trade name: B8L, manufactured by TOKYO KEIKI) and a No. 4 rotor at a rotation speed of 12 rpm and a measurement temperature of 20° C.

The obtained results are shown in Table 1 together with the weight-average molecular weight and the degree of neutralization.

12, except that instead of 0.1 g of the pentaerythritol, 1,3-propanediol (manufactured by Wako Pure Chemical Industries, Ltd.), 1,4-butanediol (manufactured by Wako Pure Chemical Industries, Ltd.), 1,6-hexanediol (manufactured by Wako Pure Chemical Industries, Ltd.), or 1,2,6-hexanetriol (manufactured by Wako Pure Chemical Industries, Ltd.) was used in an amount of 0.1 g.

Synthesis Example 17 Preparation of Binder Solution K-7

The crosslinked homopolymer solution H-2 (7 g, 0.7 g as solid contents), 1 g of the crosslinked copolymer solution H-5 (0.1 g as solid contents), 0.2 g of 1,4-butanediol, and 1,800 µL of deionized water were added to a 10 mL beaker made of TEFLON (registered trademark), and stirred until a transparent solution was obtained. In this way, a binder solution K-7 with 10 wt % solid contents was obtained.

Synthesis Example 18 Preparation of Binder Solution K-8

The crosslinked homopolymer solution H-2 (9 g, 0.9 g as solid contents), 0.1 g of 1,3-propanediol, and 1,800 µL of

TABLE 1

| | Polymer solution | | | | | |
|---|---|---|---|---|---|---|
| | Homopolymer (acrylic acid) | | | | Copolymer acrylic acid/HEA) | |
| | H-1 Crosslinked | H-2 Crosslinked | H-3 Non-crosslinked | H-4 Non-crosslinked | H-5 Crosslinked | H-6 Non-crosslinked |
| Weight-average molecular weight (Mw) | 300,000 | 1,100,000 | 250,000 | 1,000,000 | — | — |
| Degree of neutralization (%) | 80 | 80 | 80 | 80 | 80 | 80 |
| Viscosity (mPa/s) | 3,000 | 10,000 | 3,000 | 9,000 | 3,000 | 2,800 |

Synthesis Example 11 Preparation of Binder Solution K-1

The crosslinked homopolymer solution H-2 (8.9 g, 0.89 g as solid contents), 1 g of the crosslinked copolymer solution H-5 (0.1 g as solid contents), 0.01 g of pentaerythritol (manufactured by Wako Pure Chemical Industries, Ltd.), and 90 µL of deionized water were added to a 10 mL beaker made of TEFLON (registered trademark), and stirred until a transparent solution was obtained. In this way, a binder solution K-1 with 10 wt % solid contents was obtained.

Synthesis Example 12 Preparation of Binder Solution K-2

The crosslinked homopolymer solution H-2 (8 g, 0.8 g as solid contents), 1 g of the crosslinked copolymer solution H-5 (0.1 g as solid contents), 0.1 g of pentaerythritol, and 900 µL of deionized water were added to a 10 mL beaker made of TEFLON (registered trademark), and stirred until a transparent solution was obtained. In this way, a binder solution K-2 with 10 wt % solid contents was obtained.

Synthesis Examples 13 to 16 Preparation of Binder Solutions K-3 to K-6

Binder solutions K-3 to K-6 with 10 wt % solid contents were obtained by the same method as in Synthesis Example deionized water were added to a 10 mL beaker made of TEFLON (registered trademark), and stirred until a transparent solution was obtained. In this way, a binder solution K-8 with 10 wt % solid contents was obtained.

Synthesis Example 19 Preparation of Binder Solution K-9

A binder solution K-9 with 10 wt % solid contents was obtained by the same method as in Synthesis Example 12, except that 8 g of the non-crosslinked homopolymer solution H-3 (0.8 g as solid contents) was used instead of 8 g of the crosslinked homopolymer solution H-2.

Synthesis Example 20 Preparation of Binder Solution K-10

A binder solution K-10 with 10 wt % solid contents was obtained by the same method as in Synthesis Example 12, except that 8 g of the crosslinked homopolymer solution H-1 (0.8 g as solid contents) was used instead of 8 g of the crosslinked homopolymer solution H-2, and 1 g of the non-crosslinked copolymer solution H-6 (0.1 g as solid contents) was used instead of 1 g of the crosslinked copolymer solution H-5.

Synthesis Example 21 Preparation of Binder Solution K-11

A binder solution K-11 with 10 wt % solid contents was obtained by the same method as in Synthesis Example 12, except that 8 g of the non-crosslinked homopolymer solution H-3 (0.8 g as solid contents) was used instead of 8 g of the crosslinked homopolymer solution H-2, and 1 g of the non-crosslinked copolymer solution H-6 (0.1 g as solid contents) was used instead of 1 g of the crosslinked copolymer solution H-5.

Synthesis Example 22 Preparation of Binder Solution K-12

A binder solution K-12 with 10 wt % solid contents was obtained by the same method as in Synthesis Example 12, except that 8 g of the non-crosslinked homopolymer solution H-4 (0.8 g as solid contents) was used instead of 8 g of the crosslinked homopolymer solution H-2.

Synthesis Example 23 Preparation of Binder Solution K-13

A binder solution K-13 with 10 wt % solid contents was obtained by the same method as in Synthesis Example 12, except that 1 g of the non-crosslinked copolymer solution H-6 (0.1 g as solid contents) was used instead of 1 g of the crosslinked copolymer solution H-5.

Synthesis Example 24 Preparation of Binder Solution K-14

A binder solution K-14 with 10 wt % solid contents was obtained by the same method as in Synthesis Example 12, except that 8 g of the non-crosslinked homopolymer solution H-4 (0.8 g as solid contents) was used instead of 8 g of the crosslinked homopolymer solution H-2, and 1 g of the non-crosslinked copolymer solution H-6 (0.1 g as solid contents) was used instead of 1 g of the crosslinked copolymer solution H-5.

Synthesis Example 25 Preparation of Binder Solution J-1

A binder solution J-1 with 10 wt % solid contents was obtained by the same method as in Synthesis Example 12, except that 0.1 g of propanediamine (manufactured by Wako Pure Chemical Industries, Ltd.) was used instead of 0.1 g of pentaerythritol.

Synthesis Example 24 Preparation of Binder Solution J-2

A binder solution J-2 with 10 wt % solid contents was obtained by the same method as in Synthesis Example 11, except that 0.01 g of sodium oxalate (manufactured by Wako Pure Chemical Industries, Ltd.) was used instead of 0.01 g of pentaerythritol.

Example 1 Manufacturing of Battery by Using Electrode of Embodiment of the Present Invention (1) Manufacturing of Slurry Composition of Embodiment of the Present Invention Silicon powder (8 g, particle size: average particle size of 2.4 μm, trade name: Silgrain, manufactured by Elkem) and 1 g of acetylene black (AB) (trade name: DENKA BLACK, manufactured by Denka Company Limited.) were weighed and mixed together for 10 minutes by using a rotation/revolution foam removing stirrer (trade name: AWATORI RENTARO, model: AR-250, manufactured by Thinky Corporation) at a rotation speed of 2,000 rpm. Then, 10 g of the binder solution K-1 was added thereto and mixed for 3 hours by using the rotation/revolution foam removing stirrer at 2,000 rpm. Thereafter, 4 g of deionized water was added thereto and mixed for 10 minutes by using the rotation/revolution foam removing stirrer at 2,000 rpm. Subsequently, foam was removed for 5 minutes by using the rotation/revolution foam removing stirrer, and the obtained mixture (mass ratio of solid contents of Si:AB:binder solution=80:10:10) was used as a slurry composition. By being applied onto a current collector and then dried, the slurry composition becomes a coating film containing 80 wt % of silicon, 10 wt % of AB, and 10 wt % of a binder.

(2) Preparation of Electrode for Lithium Battery of Embodiment of the Present Invention By using a doctor blade (manufactured by TESTER SANGYO CO., LTD.) and a coater (trade name: MINI-COATER MC-20, manufactured by Hohsen Corp.), a copper foil current collector having a thickness of 20 μm was coated with the slurry composition obtained in (1) such that the mass of Si in the active material became 3 mg/cm$^2$. Then, the slurry composition was dried at 80° C. in the air and then dried for 12 hours at 150° C. in a vacuum. The thickness of the film on the current collector measured using a caliper was about 40 to 20 μm. The obtained current collector was pressed using a roll press machine (trade name: HSR-60150, manufactured by Hohsen Corp.), thereby preparing an electrode for lithium batteries in which the density of the silicon active material was 1.4 mg/cm$^3$.

(3) Manufacturing of Coin Type Battery

A coin type battery including the electrode obtained in (2), a lithium foil electrode, an ethylene carbonate (EC)/dimethyl carbonate (DMC) (volume ratio: 1:1) solution containing 1 M LiPF$_6$, and a separator was assembled in a glovebox filled with argon.

Examples 2 to 14 Manufacturing of Battery by Using Electrode of Embodiment of the Present Invention A slurry composition, an electrode for lithium batteries, and a coin type battery were manufactured by the same method as in Example 1, except that 10 g of each of the binder solutions K-2 to K-14 was used instead of 10 g of the binder solution K-1.

Comparative Examples 1 and 2 Manufacturing of Battery

A slurry composition, an electrode for lithium batteries, and a coin type battery were manufactured by the same method as in Example 1, except that 10 g of the binder solution J-1 or J-2 was used instead of 10 g of the binder solution K-1.

Comparative Example 3 Manufacturing of Battery

A slurry composition, an electrode for lithium batteries, and a coin type battery were manufactured by the same method as in Example 1, except that 10 g of the crosslinked homopolymer solution H-2 was used instead of 10 g of the binder solution K-1.

Experimental Example 2 Measurement of Slurry Dispersibility by Using Each Slurry Composition Each of the slurry compositions (5 g) prepared in Examples 1 to 14 and Comparative Examples 1 to 3 was added to a 50 mL graduated centrifuge tube made of glass, and then 20 mL of deionized water was added thereto. The solution was stirred for 10 minutes by using a shaker and then left to stand for 60 minutes, and blue paper was installed on the rear surface of the centrifuge tube. In a case where blue as background color was not seen in the entire range of 0 to 20 mL indicated by the gradations on the centrifuge tube, the slurry was denoted by A (dispersibility was excellent). In a case where blue as background color was not seen in a range of 0 to 15 mL but seen in a range of 15 to 20 mL, the slurry was denoted by B (precipitates slightly occurred). In a case where blue as background color was seen in a range of 5 to 20 mL, the slurry was denoted by C (dispersibility was poor).

The obtained results are shown in Table 2.

Experimental Example 3 Measurement of Peel Strength by Using Each Electrode

Each of the electrodes prepared in Examples 1 to 14 and Comparative Examples 1 to 3 was cut with a cutter in the form of a rectangle having a width of 5 mm and a length of about 50 mm. Except for the edge of the electrode that was 5 mm long, the electrode was bonded to slide glass on which a double-sided tape was stuck. Kapton tape was bonded to the non-bonded edge of the electrode that was 5 mm long, the edge opposite to the edge of the electrode was set in a peel tester (trade name: FGS-TV, model number: digital force gauge FGP-0.5, manufactured by NIDEC-SHIMPO CORPORATION) such that the peel angle became 90°, and the electrode was pulled up at a speed of 10 mm/min. The average of the data obtained while the electrode was being pulled up to 30 mm was taken as peel strength (unit: N). The obtained results are shown in Table 2.

It should be noted that the obtained data represents a force required mainly for peeling the active material layer from the copper foil. Accordingly, high peel strength means that the active material layer formed of the slurry composition (here, containing silicon, AB, and a binder) is strongly bonded to the copper foil of the current collector.

Experimental Example 4 Charge/Discharge Test by Using Each Battery

By using each of the coin type batteries prepared in Examples 1 to 14 and Comparative Examples 1 to 3, a constant current charge/discharge test was performed under the following conditions. The conditions of charge and discharge are as below.
Counter electrode: Li foil
Electrolytic solution: 1 M $LiPF_6$ EC/DMC mixed solution (volume ratio: 1:1)
Measurement apparatus: ABE1024-5V 0.1A-4 charge/discharge tester (manufactured by ELECTRO FIELD)
Potential and current density
Potential range 2.0 to 0.0 V (vs. $Li/Li^+$)
Current density 50 mA/g for the first test, 50 mA/g from the second test From the values of discharge capacity of the negative electrode obtained in the initial charge and discharge by using each battery and the discharge capacity of the negative electrode obtained after the $5^{th}$ cycle, a capacity retention rate (%) was calculated using the following equation.

Capacity retention rate (%)=discharge capacity after $5^{th}$ cycle÷initial discharge capacity×100

The obtained results are shown in Table 2.

TABLE 2

| | | Amount of polymer solution (wt % in composition for preparing electrode) | | | | | | | | | | |
|---|---|---|---|---|---|---|---|---|---|---|---|---|
| | | Homopolymer (acrylic acid) | | | | Copolymer acrylic acid/HEA | | Bivalent to decavalent alcohol | | | | Capacity |
| | | H-1 | H-2 | H-3 | H-4 | H-5 | H-6 | | | | | |
| Example | Binder solution | Cross-linked | Cross-linked | Non-crosslinked | Non-crosslinked | Cross-linked | Non-crosslinked | Name of alcohol | Amount (wt %) | Slurry dispersibility | Peel strength | retention rate (%) |
| Example 1 | K-1 | — | 8.9 | — | — | 1 | — | Pentaerythritol | 0.1 | A | 0.16 | 77 |
| Example 2 | K-2 | — | 8 | — | — | 1 | — | Pentaerythritol | 1 | A | 0.18 | 81 |
| Example 3 | K-3 | — | 8 | — | — | 1 | — | 1,3-Propanediol | 1 | A | 0.15 | 70 |
| Example 4 | K-4 | — | 8 | — | — | 1 | — | 1,4-Butanediol | 1 | A | 0.14 | 66 |
| Example 5 | K-5 | — | 8 | — | — | 1 | — | 1,6-Hexanediol | 1 | A | 0.13 | 65 |
| Example 6 | K-6 | — | 8 | — | — | 1 | — | 1,2,6-Hexanetriol | 1 | A | 0.13 | 68 |
| Example 7 | K-7 | — | 7 | — | — | 1 | — | 1,4-Butanediol | 2 | A | 0.15 | 65 |
| Example 8 | K-8 | — | 9 | — | — | — | — | 1,3-Propanediol | 1 | A | 0.12 | 65 |
| Example 9 | K-9 | — | — | 8 | — | 1 | — | Pentaerythritol | 1 | A | 0.1 | 50 |
| Example 10 | K-10 | 8 | — | — | — | — | 1 | Pentaerythritol | 1 | A | 0.13 | 65 |
| Example 11 | K-11 | — | — | 8 | — | — | 1 | Pentaerythritol | 1 | A | 0.12 | 42 |
| Example 12 | K-12 | — | — | — | 8 | 1 | — | Pentaerythritol | 1 | A | 0.09 | 53 |
| Example 13 | K-13 | — | 8 | — | — | — | 1 | Pentaerythritol | 1 | A | 0.09 | 62 |
| Example 14 | K-14 | — | — | — | 8 | — | 1 | Pentaerythritol | 1 | A | 0.1 | 47 |
| Comparative Example 1 | J-1 | — | 8 | — | — | 1 | — | Propanediamine | 1 | C | 0.06 | 35 |
| Comparative Example 2 | J-2 | — | 8.9 | — | — | 1 | — | Sodium oxalate | 0.1 | B | 0.04 | 36 |
| Comparative Example 3 | H-2 | — | 10 | — | — | — | — | — | — | B | 0.02 | 35 |

As shown in Table 2, while all of the slurry compositions of the present invention in Examples 1 to 14 exhibited excellent slurry dispersibility, all of the slurry compositions of Comparative Examples 1 to 3 exhibited poor slurry dispersibility. Evenly dispersing an active material or a conductive assistant in slurry is an important factor in preparing an electrode. In a case where AB as a conductive assistant is aggregated without being dispersed in slurry, a conduction path is not formed in an electrode, and the battery performance deteriorates. Therefore, it is considered that because the slurry compositions of Examples 1 to 14 had excellent slurry dispersibility, a conduction path was formed in the electrodes prepared using the slurry compositions, and hence the battery performance was improved.

It was understood that all of the electrodes of the present invention in Examples 1 to 14 had peel strength higher than that of the electrodes of Comparative Examples 1 to 3. It is considered that because the alcohol according to the present invention improved the binding to the current collector, or a homopolymer was bonded to a copolymer or a homopolymer through the alcohol according to the present invention, the polymers were evenly disposed on the electrode, copper atoms of the current collector or active materials were more strongly bonded to each other, and as a result, all of the electrodes of the present invention had higher peel strength.

Furthermore, it was understood that all of the batteries of Examples 1 to 14, in which the electrode of the present invention was used, exhibited a capacity retention rate higher than that of the batteries of Comparative Examples 1 to 3. It is considered that because a homopolymer was bonded to a copolymer or a homopolymer through the alcohol according to the present invention, the polymers were evenly disposed on the electrode and covered the surface of the active material, and as a result, problems such as the separation of a micro-layer in which the polymers are unevenly distributed did not occur, substantially the entire surface of the active material is utilized for charge and discharge.

Synthesis Example 25 Synthesis of Crosslinked Homopolymer A-3

Methyl ethyl ketone (MEK, 20 mL, manufactured by Wako Pure Chemical Industries, Ltd.) was put into a 200 mL round bottom flask comprising a stirring device, a cooling pipe, a thermometer, a nitrogen introduction pipe, and a dripping device. Then, 4 g of acrylic acid (56 mmol, manufactured by Wako Pure Chemical Industries, Ltd.), 0.014 g of polyethylene glycol diacrylate (0.05 mmol, manufactured by SHIN-NAKAMURA CHEMICAL CO., LTD.), and 0.01 g of dimethyl 2,2'-azobis(2-methylpropionate) (0.04 mmol, manufactured by Wako Pure Chemical Industries, Ltd.) were added thereto and stirred. Thereafter, the mixture was reacted for 4 hours at 70° C. under a nitrogen stream. Because a slight amount of MEK was volatilized during the reaction, MEK was added as necessary. After the reaction, the reaction solution was cooled to room temperature, thereby obtaining white solids. The obtained white solids were dried in a vacuum, thereby obtaining crosslinked polyacrylic acid. The obtained polyacrylic acid was named crosslinked homopolymer A-3.

Synthesis Example 26 Synthesis of Crosslinked Homopolymer A-4

A crosslinked homopolymer A-4 was obtained by performing a polymerization reaction according to the same method as in Synthesis Example 25, except that 0.4 g of 1,4-butanediol (manufactured by Wako Pure Chemical Industries, Ltd.) was further added to the reaction system.

Synthesis Example 27 Synthesis of Crosslinked Copolymer C-3

A crosslinked copolymer C-3 was obtained by performing a polymerization reaction according to the same method as in Synthesis Example 25, except that 2 g of acrylic acid (28 mmol) and 2 g of 2-hydroxyethyl acrylate (17 mmol, manufactured by Wako Pure Chemical Industries, Ltd.) were used instead of 4 g of acrylic acid.

Synthesis Example 28 Synthesis of Crosslinked Copolymer C-4

A crosslinked copolymer C-4 was obtained by performing a polymerization reaction according to the same method as in Synthesis Example 27, except that 0.4 g of 1,4-butanediol (manufactured by Wako Pure Chemical Industries, Ltd.) was further added to the reaction system.

Synthesis Example 29 Synthesis of Crosslinked Copolymer C-5

A crosslinked copolymer C-5 was obtained by performing a polymerization reaction according to the same method as in Synthesis Example 27, except that 0.4 g of pentaerythritol (manufactured by Wako Pure Chemical Industries, Ltd.) was further added to the reaction system.

Experimental Example 5 Testing Solubility of Each Polymer

For each of the crosslinked polymers (the crosslinked homopolymers A-3 and A-4 and the crosslinked copolymers C-3 to C-5) obtained in Synthesis Examples 25 to 29, solubility tests described in the following (1) to (3) were performed. A polymer completely dissolved in a solvent was denoted by A, and a polymer insoluble in a solvent was denoted by C.

The obtained results are shown in Table 3 together with the monomer content and the content of the bivalent to decavalent alcohol in each of the crosslinked polymers.

(1) Testing Solubility in Water

Deionized water ($H_2O$) was added in an amount by which the concentration of each of the crosslinked polymers became 5%, and the solubility was tested at room temperature.

(2) Testing Solubility in Aqueous Sodium Hydroxide Solution

An aqueous sodium hydroxide solution (NaOH, manufactured by Wako Pure Chemical Industries, Ltd.) was added in an amount by which the degree of neutralization of each of the crosslinked polymers became 80%, and the solubility was tested at room temperature.

(3) Testing Solubility in N-Methylpyrrolidone

N-methylpyrrolidone (NMP, manufactured by Wako Pure Chemical Industries, Ltd.) was added in an amount by which the concentration of each of the crosslinked polymers became 5%, and the solubility was tested at room temperature.

TABLE 3

|  |  | Crosslinked polymer | | | | |
| --- | --- | --- | --- | --- | --- | --- |
|  |  | A-3 | A-4 | C-3 | C-4 | C-5 |
| Monomer | Acrylic acid | 4 g | 4 g | 2 g | 2 g | 2 g |
|  | 2-Hydroxyethyl acrylate | — | — | 2 g | 2 g | 2 g |
| Bivalent to decavalent alcohol | 1,4-Butanectiol | — | 0.4 g | — | 0.4 g | — |
|  | Pentaerythritol | — | — | — | — | 0.4 g |
| Solubility test | (1) H₂O | C | C | A | C | C |
|  | (2) NaOH | A | C | A | C | C |
|  | (3) NMP | A | C | A | C | C |

From Table 3, it was understood that the polymers (the crosslinked homopolymer A-4 and the crosslinked copolymers C-4 and C-5) subjected to a polymerization reaction together with the bivalent to decavalent alcohol (1,4-butanediol or pentaerythritol) were dissolved in none of the solvents including water, the aqueous sodium hydroxide solution, and N-methylpyrrolidone. That is, it was understood that in a case where a polymerization reaction was performed by adding (B) the bivalent to decavalent alcohol at the time of manufacturing (A) one or more kinds of polymers containing polyacrylic acid (in other words, in a case where the polymerization reaction of the polymers and a binding reaction by the bivalent to decavalent alcohol were simultaneously performed), the obtained polymers were not dissolved in various solvents including water, and accordingly, the polymers could not be used for preparing an electrode.

Accordingly, it was understood that the binder agent composition of the present invention needs to be manufactured by manufacturing desired (A) one or more kinds of polymers containing polyacrylic acid by performing a polymerization reaction and, if necessary, a neutralization treatment and/or a crosslinking reaction, and then mixing the polymers with (B) the bivalent to decavalent alcohol and (C) water.

The invention claimed is:
1. A binder agent composition comprising:
(A) one or more kinds of polymers containing polyacrylic acid;
(B) a bivalent to decavalent alcohol; and
(C) water,
wherein at least one kind of the polymers containing polyacrylic acid is crosslinked by a crosslinking agent selected from the group consisting of compounds described in the following general formulae [1] to [13] and a polymer described in the following general formula [14];

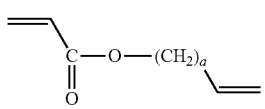

[1]

where a represents an integer of 1 to 6,

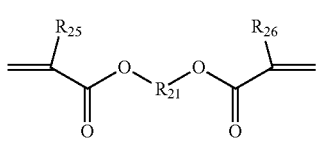

[2]

where $R_{25}$ and $R_{26}$ each independently represent a hydrogen atom or a methyl group, and $R_{21}$ represents an alkylene group having 1 to 20 carbon atoms, a group represented by the following general formula [2-1]

[2-1]

where $R_{22}$ represents an alkylene group having 1 to 6 carbon atoms, and b represents an integer of 1 to 6, or a group represented by the following general formula [2-2]

[2-2]

where $R_{23}$ and $R_{24}$ each independently represent an alkylene group having 1 to 6 carbon atoms, and c represents an integer of 1 to 22,

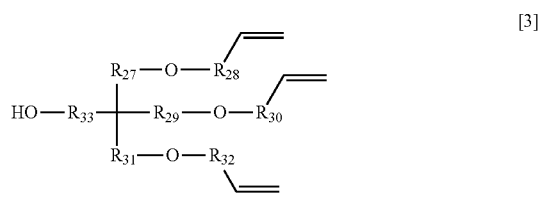

[3]

where $R_{27}$ to $R_{33}$ each independently represent an alkylene group having 1 to 3 carbon atoms,

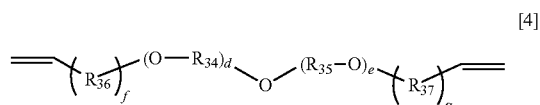

[4]

where $R_{34}$ to $R_{37}$ each independently represent an alkylene group having 1 to 6 carbon atoms, d represents an integer of 1 to 6, e represents an integer of 0 to 6, and f and g each independently represent an integer of 0 or 1,

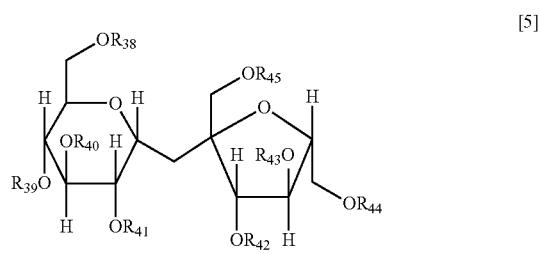

[5]

where $R_{38}$ to $R_{45}$ each independently represent a hydrogen atom, a vinyl group, or a vinyl ketone group, and at least two or more groups among $R_{38}$ to $R_{45}$ are vinyl groups or vinyl ketone groups,

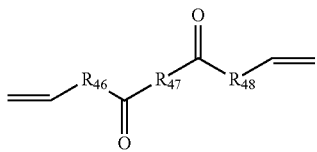
[6]

where $R_{46}$ to $R_{48}$ each independently represent an alkylene group having 1 to 6 carbon atoms,

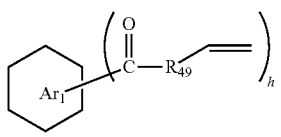
[7]

where a ring $Ar_1$ represents a benzene ring or a naphthalene ring, $R_{49}$ represents an alkylene group having 1 to 6 carbon atoms, and h represents an integer of 2 to 4,

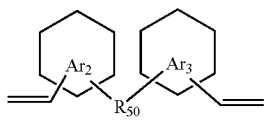
[8]

where a ring $Ar_2$ and a ring $Ar_3$ each independently represent a benzene ring or a naphthalene ring, and $R_{50}$ represents an alkylene group having 1 to 6 carbon atoms,

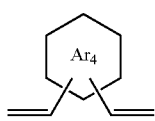
[9]

where a ring $Ar_4$ represents a benzene ring or a naphthalene ring,

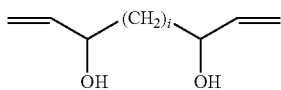
[10]

where i represents an integer of 0 to 6,

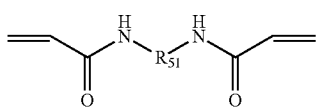
[11]

where $R_{51}$ represents an alkylene group having 1 to 6 carbon atoms,

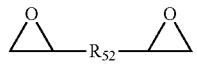
[12]

where $R_{52}$ represents an alkylene group having 1 to 6 carbon atoms that has a substituent or is unsubstituted, an arylene group having 6 to 10 carbon atoms that has a substituent or is unsubstituted, a group represented by the following general formula [12-1]

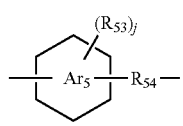
[12-1]

where $R_{53}$ represents an alkyl group having 1 to 6 carbon atoms, $R_{54}$ represents an alkylene group having 1 to 6 carbon atoms, a ring $Ar_5$ represents a benzene ring or a naphthalene ring, and j represents an integer of 0 to 4, or a group represented by the following general formula [12-2]

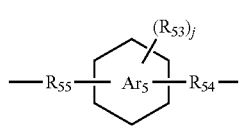
[12-2]

where $R_{55}$ represents an alkylene group having 1 to 6 carbon atoms, and $R_{53}$, $R_{54}$, a ring $Ar_5$, and j are the same as $R_{53}$, $R_{54}$, the ring $Ar_5$, and j described above, $$R_{56}-N=C=N-R_{57} \quad [13]$$

where $R_{56}$ and $R_{57}$ each independently represent an alkyl group having 1 to 6 carbon atoms that has a substituent or is unsubstituted, an aryl group having 6 to 10 carbon atoms that has a substituent or is unsubstituted, or a group represented by the following general formula [13-1]

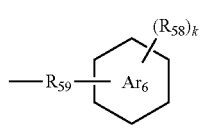
[13-1]

where $R_{58}$ represents an alkyl group having 1 to 6 carbon atoms, $R_{59}$ represents an alkylene group having 1 to 6 carbon atoms, a ring $Ar_6$ represents a benzene ring or a naphthalene ring, and k represents an integer of 0 to 5,

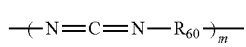
[14]

where $R_{60}$ represents an alkylene group having 1 to 6 carbon atoms that has a substituent or is unsubstituted, an arylene group having 6 to 10 carbon atoms that has a substituent or is unsubstituted, a group represented by the following general formula [14-1] or [14-2]

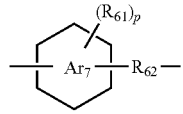
[14-1]

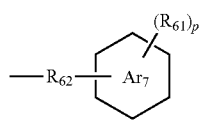
[14-2]

where $R_{61}$ represents an alkyl group having 1 to 6 carbon atoms, $R_{62}$ represents an alkylene group having 1 to 6 carbon atoms, a ring $Ar_7$ represents a benzene ring or a naphthalene ring, and p represents an integer of 0 to 4,
or a group represented by the following general formula [14-3]

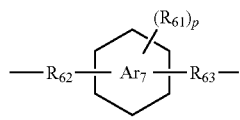
[14-3]

where $R_{63}$ represents an alkylene group having 1 to 6 carbon atoms, and $R_{61}$, $R_{62}$, a ring $Ar_7$, and p are the same as $R_{61}$, $R_{62}$, the ring $Ar_7$, and p described above,
and m represents an integer of 10 to 10,000, and
the (B) alcohol is capable of bonding the crosslinked polymers containing polyacrylic acid to each other.

2. The binder agent composition according to claim 1, wherein (B) the bivalent to decavalent alcohol is a compound represented by the following general formula (B1);

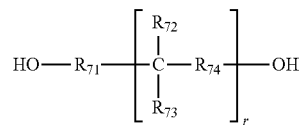
(B1)

where $R_{71}$ represents an alkylene group having 1 to 6 carbon atoms, $R_{72}$ represents a hydroxy group or a hydroxyalkyl group having 1 to 6 carbon atoms, $R_{73}$ represents a hydrogen atom, an alkyl group having 1 to 6 carbon atoms, or a hydroxyalkyl group having 1 to 6 carbon atoms, $R_{74}$ represents an alkylene group having 1 to 6 carbon atoms that may have —O— in a chain, r represents an integer of 0 to 4, and a plurality of $R_{72}$'s, a plurality of $R_{73}$'s, and a plurality of $R_{74}$'s may be the same as or different from each other respectively.

3. The binder agent composition according to claim 1, wherein the polymers containing polyacrylic acid are polyacrylic acid and a copolymer which contains a monomer unit derived from acrylic acid and one or two kinds of monomer units derived from a compound represented by the following general formula (I) or general formula (II) as constituent components;

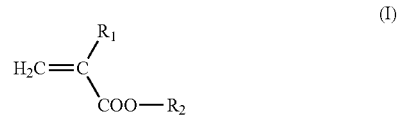
(I)

where $R_1$ represents a hydrogen atom or a methyl group, and in a case where $R_2$ is a hydrogen atom, $R_1$ represents the methyl group, and $R_2$ represents a hydrogen atom; an alkyl group having 1 to 20 carbon atoms; an alkyl group having 1 to 20 carbon atoms substituted with a fluorine atom or a hydroxy group; an aryl group having 6 to 10 carbon atoms; an arylalkyl group having 7 to 13 carbon atoms; an alkoxyalkyl group having 2 to 9 carbon atoms; an alkoxyalkoxyalkyl group having 3 to 9 carbon atoms; an aryloxyalkyl group having 7 to 13 carbon atoms; a morpholinoalkyl group having 5 to 7 carbon atoms; a trialkylsilyl group having 3 to 9 carbon atoms; an alicyclic hydrocarbon group having 6 to 12 carbon atoms that has or does not have an oxygen atom; a dialkylaminoalkyl group having 3 to 9 carbon atoms; a hexahydrophthalimide-N-alkyl group having 9 to 14 carbon atoms; a group represented by the following general formula (IV)

(IV)

where $R_3$ represents an alkylene group having 1 to 6 carbon atoms that has a hydroxy group as a substituent or is unsubstituted, $R_4$ represents a hydrogen atom, an alkyl group having 1 to 6 carbon atoms, or a phenyl group, and v represents an integer of 2 to 20;
or a group represented by the following general formula (V)

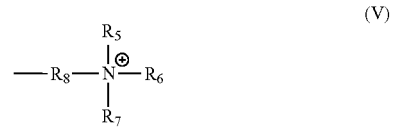
(V)

where $R_5$ to $R_7$ each independently represent an alkyl group having 1 to 3 carbon atoms, and $R_8$ represents an alkylene group having 1 to 3 carbon atoms,

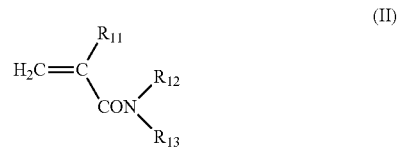
(II)

where, $R_{11}$ represents a hydrogen atom or a methyl group, $R_{12}$ represents a hydrogen atom or an alkyl group having 1 to 6 carbon atoms, and $R_{13}$ represents a hydrogen atom, an alkyl group having 1 to 6 carbon atoms, a dialkylaminoalkyl group having 3 to 9 carbon atoms, or a hydroxyalkyl group having 1 to 6 carbon atoms.

4. The binder agent composition according to claim 3,
wherein the polyacrylic acid is crosslinked by the crosslinking agent selected from the group consisting of the compounds described in the general formulae [1] to [13] and the polymer described in the general formula [14].

5. The binder agent composition according to claim 4,
wherein the polyacrylic acid and the copolymer are crosslinked by a crosslinking agent selected from the group consisting of the compounds described in the general formulae [1] to [13] and the polymer described in the general formula [14].

6. The binder agent composition according to claim 1,
wherein the polyacrylic acid is crosslinked by the crosslinking agent selected from the group consisting of the compounds described in the general formulae [1] to [13] and the polymer described in the general formula [14].

7. A slurry composition for lithium batteries, comprising:
1) a silicon-containing active material;
2) a conductive assistant; and
3) the binder agent composition according to claim 1,
wherein the (B) alcohol of the binder agent composition is capable of bonding the crosslinked polymers containing polyacrylic acid to each other.

8. The slurry composition according to claim 7,
wherein the silicon-containing active material contains silicon; a silicon oxide; a metal-bonded silicon; or a mixture obtained by mixing together at least two or more kinds of components among carbon, silicon, a silicon oxide, or a metal-bonded silicon.

9. The slurry composition according to claim 7, wherein the slurry composition is adapted for preparing a negative electrode.

10. An electrode for lithium batteries, comprising:
1) a silicon-containing active material;
2) a conductive assistant;
3) a binder agent derived from the binder agent composition according to claim 1; and
4) a current collector,
wherein the (B) alcohol of the binder agent composition bonds the crosslinked polymers containing polyacrylic acid to each other in the binder agent.

11. The electrode according to claim 10,
wherein the silicon-containing active material contains silicon; a silicon oxide; a metal-bonded silicon; or a mixture obtained by mixing together at least two or more kinds of components among carbon, silicon, a silicon oxide, or a metal-bonded silicon.

12. The electrode according to claim 10, wherein the electrode is a negative electrode.

13. A lithium battery comprising the electrode of claim 10.

14. A method for preparing an electrode for lithium batteries, comprising:
coating a current collector with the slurry composition according to claim 7; and
drying the slurry composition after the coating.

* * * * *